(12) United States Patent
Hirosawa et al.

(10) Patent No.: US 10,951,139 B2
(45) Date of Patent: Mar. 16, 2021

(54) DRIVING DEVICE, COMPRESSOR, AIR CONDITIONER AND METHOD OF DRIVING INTERIOR PERMANENT MAGNET MOTOR

(71) Applicant: Mitsubishi Electric Corporation, Tokyo (JP)

(72) Inventors: Yuji Hirosawa, Tokyo (JP); Masahiro Nigo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/612,462

(22) PCT Filed: Jul. 28, 2017

(86) PCT No.: PCT/JP2017/027411
§ 371 (c)(1),
(2) Date: Nov. 11, 2019

(87) PCT Pub. No.: WO2019/021452
PCT Pub. Date: Jan. 31, 2019

(65) Prior Publication Data
US 2020/0177114 A1 Jun. 4, 2020

(51) Int. Cl.
*H02P 6/00* (2016.01)
*H02P 27/08* (2006.01)
*H02P 6/04* (2016.01)

(52) U.S. Cl.
CPC .............. *H02P 6/006* (2013.01); *H02P 27/08* (2013.01); *H02P 2006/045* (2013.01)

(58) Field of Classification Search
CPC .... H02P 6/006; H02P 27/08; H02P 2006/045; F25B 13/00
See application file for complete search history.

(56) References Cited

U.S. PATENT DOCUMENTS

2011/0193506 A1   8/2011   Hayashi et al.
2015/0168033 A1*  6/2015   Yamakawa ............. F25B 13/00
                                              62/324.6

FOREIGN PATENT DOCUMENTS

| JP | H03-265486 A  | 11/1991 |
| JP | 2005-162376 A | 6/2005  |
| JP | 2008-148490 A | 6/2008  |
| JP | 2009-216324 A | 9/2009  |

OTHER PUBLICATIONS

European Search Report dated Jul. 10, 2020 in connection with counterpart European Patent Application No. 17919600.1.
Extended European Search Report dated Nov. 19, 2020 in connection with counterpart European Patent Application No. 17919600.1.
Copt Florian et al: "Dynamic winding reconfiguration of a brushless DC motor" 2017 IEEE International Electric Machines and Drives Conference (I EMDC), IEEE, 21, May, 2017, pp. 1-6, XP033137399.

* cited by examiner

*Primary Examiner* — Cortez M Cook
(74) *Attorney, Agent, or Firm* — Posz Law Group, PLC

(57) ABSTRACT

A driving device includes a connection switching unit that switches connection condition of a coil between Y connection and delta connection, an inverter, and a control device that controls a carrier frequency of the inverter. The carrier frequency is set at a first carrier frequency when the connection condition of the coil is the Y connection. The carrier frequency is set at a second carrier frequency when the connection condition of the coil is the delta connection.

15 Claims, 43 Drawing Sheets

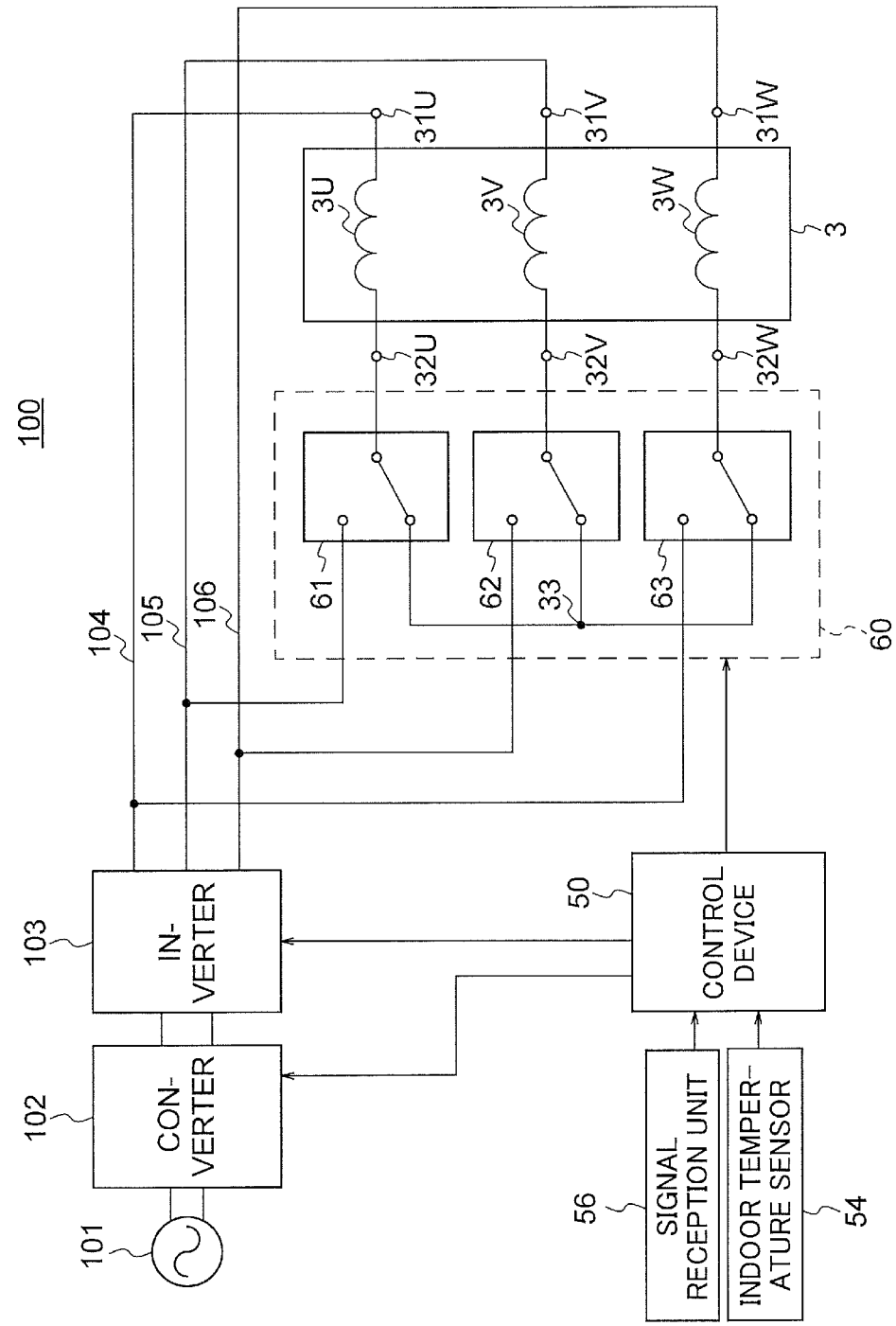

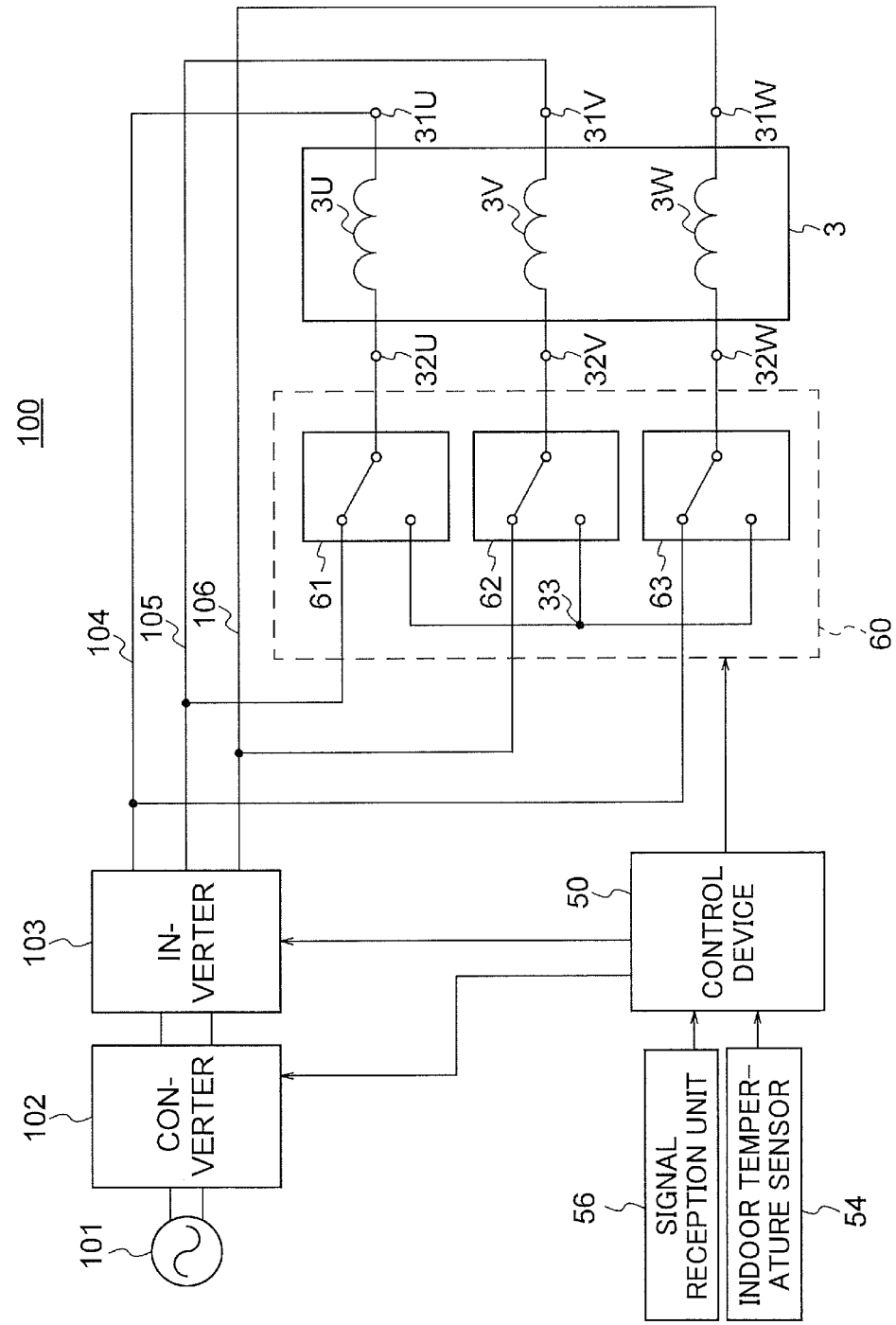

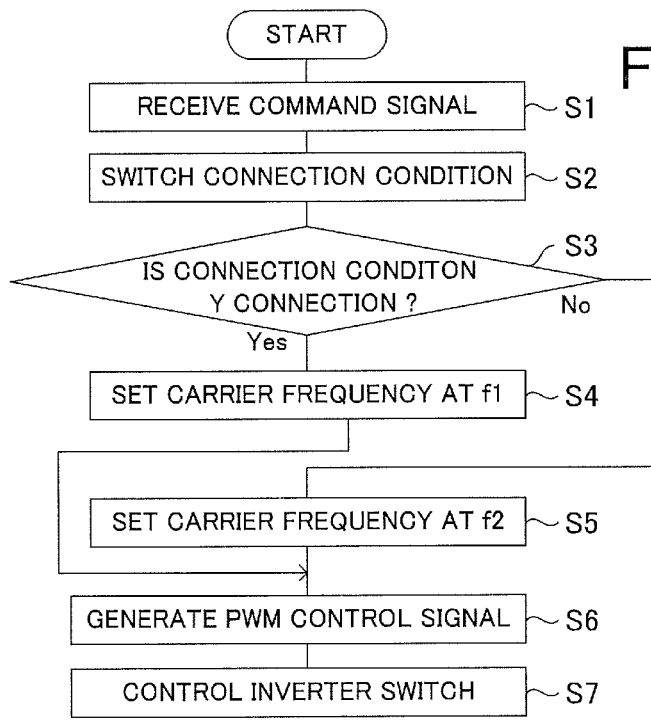
FIG. 12
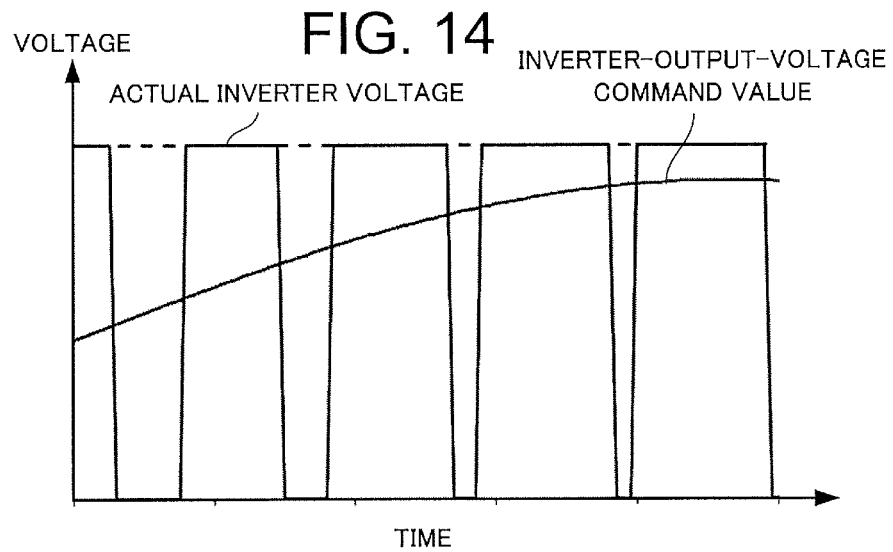
FIG. 13
FIG. 14

DRIVING DEVICE, COMPRESSOR, AIR CONDITIONER AND METHOD OF DRIVING INTERIOR PERMANENT MAGNET MOTOR

CROSS REFERENCE TO RELATED APPLICATION

This application is a U.S. national stage application of International Patent Application No. PCT/JP2017/027411 filed on Jul. 28, 2017, the disclosure of which is incorporated herein by reference.

TECHNICAL FIELD

The present invention relates to a driving device that drives a motor.

BACKGROUND

In regard to motors used for air conditioners and the like, switching of connection condition of the coil of the motor between Y connection (star connection) and delta connection (referred to also as triangle connection or Δ connection) is performed in order to increase operating efficiency at times of low speed rotation and at times of high speed rotation (see Patent Reference 1, for example).

Output power of an inverter for driving a motor is generated by the PWM (Pulse Width Modulation) control method, and a PWM control cycle is determined by the frequency of a carrier wave used as the reference (hereinafter referred to also as a "carrier frequency"). In the case where the connection condition of the coil of a motor is switched between the Y connection and the delta connection, the carrier frequency optimizing the efficiency differs between the Y connection and the delta connection since voltage usage ratio differs between the Y connection and the delta connection.

PATENT REFERENCE

Patent Reference 1: Japanese Patent Application Publication No. 2009-216324

However, in cases of driving a motor by using a single carrier frequency as in conventional technology, there is a problem in that it is impossible to adjust the carrier frequency so as to optimize both of the efficiency in the Y connection and the efficiency in the delta connection.

SUMMARY

An object of the present invention is to increase the efficiency of a motor by driving the motor at a carrier frequency suitable for the connection condition of the coil.

A driving device according to an aspect of the present invention is a driving device to drive an interior permanent magnet motor including a coil, including a connection switching unit to switch connection condition of the coil between first connection condition and second connection condition, the second connection condition lowering line voltage of the coil compared to the first connection condition, an inverter to apply voltage to the coil, and a control device to control a carrier frequency of the inverter for adjusting a control frequency of the voltage applied to the coil. The carrier frequency is set at a first carrier frequency when the connection condition of the coil is the first connection condition. The carrier frequency is set at a second carrier frequency different from the first carrier frequency when the connection condition of the coil is the second connection condition.

According to the present invention, the efficiency of a motor can be increased by driving the motor at a carrier frequency suitable for the connection condition of the coil.

BRIEF DESCRIPTION OF THE DRAWINGS

FIG. 6 is a block diagram showing a configuration of a driving device according to the embodiment.

FIG. 7 is a block diagram showing the configuration of the driving device according to the embodiment.

FIG. 12 is a flowchart showing an example of the operation of the driving device.

FIG. 13 is a diagram showing the relationship among rotation rate of the motor, voltage usage ratio, and harmonic components of the motor current depending on the connection condition of the coil.

FIG. 14 is a diagram for explaining a cause of harmonics of the motor current.

DETAILED DESCRIPTION

Embodiment (Configuration of Motor)

Figure 1:
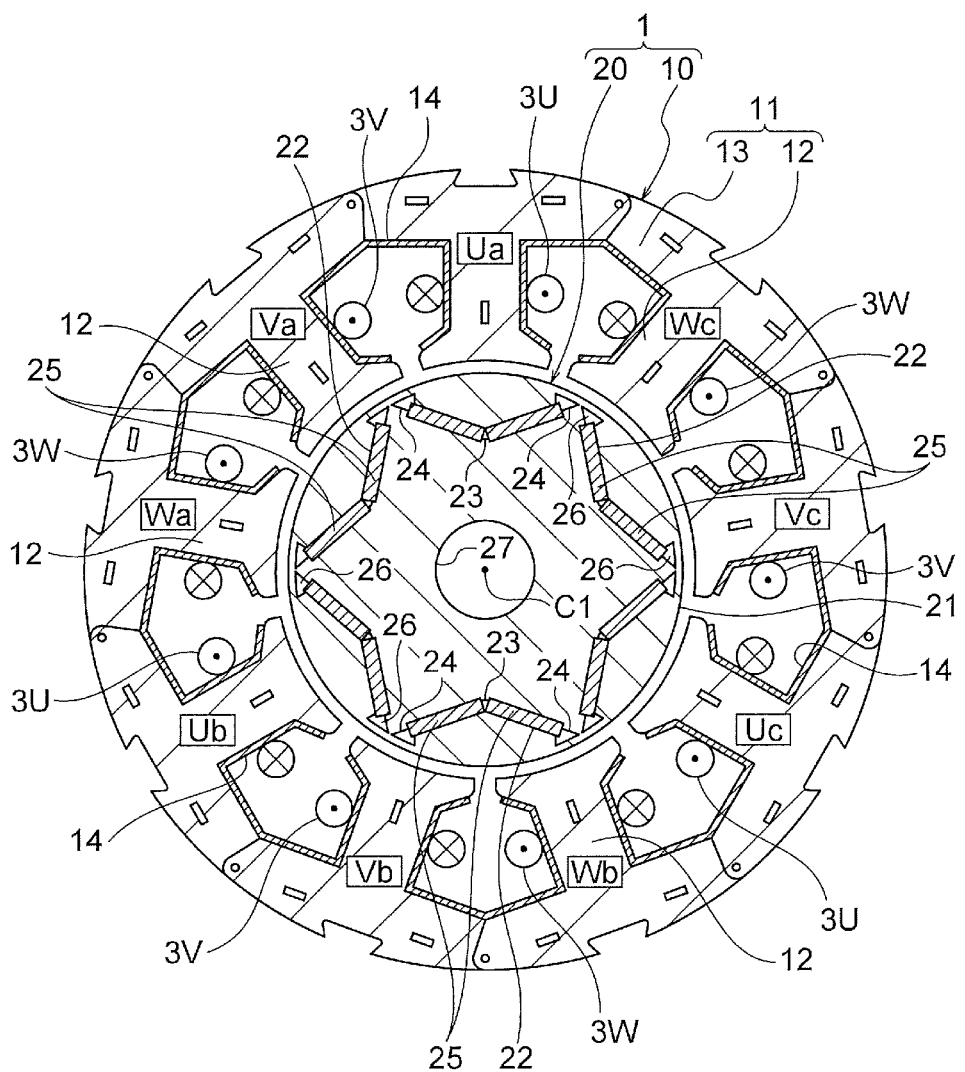
FIG. 1 is a cross-sectional view showing a configuration of a motor according to an embodiment.

An embodiment of the present invention will be described below. FIG. 1 is a cross-sectional view showing a configuration of a motor 1 according to the embodiment of the present invention. The motor 1 is an interior permanent magnet motor and is used for a rotary compressor, for example. The motor 1 includes a stator 10 and a rotor 20 rotatably provided inside the stator 10. Between the stator 10 and the rotor 20, an air gap that is 0.3 to 1 mm thick, for example, is formed. Incidentally, FIG. 1 is a cross-sectional view in a plane orthogonal to a rotation axis of the rotor 20.

In the following description, an axial direction of the rotor 20 (the direction of the rotation axis) will be referred to simply as an "axial direction". Further, a direction along an outer circumference (circumference) of the stator 10 or the rotor 20 will be referred to simply as a "circumferential direction". A radial direction of the stator 10 and the rotor 20 will be referred to simply as a "radial direction".

The stator 10 includes a stator core 11 and a coil 3 wound around the stator core 11. The stator core 11 is formed by stacking a plurality of electromagnetic steel sheets each 0.1 to 0.7 mm (0.35 mm in this example) thick in the rotation axis direction and fastening the electromagnetic steel sheets together by crimping.

The stator core 11 includes a yoke part 13 in a ring-like shape and a plurality of (nine in this example) tooth parts 12 projecting inward in the radial direction from the yoke part 13. A slot is formed between adjacent tooth parts 12. Each tooth part 12 includes a tooth end part having a wide width (dimension in the circumferential direction of the stator core 11) at its tip end inside in the radial direction.

Around each tooth part 12, the coil 3 as a stator winding is wound with an insulator (isolator) 14 in between. As the coil 3, magnet wire with a wire diameter (diameter) of 0.8 mm is wound around each tooth part 12 110 turns (110 times) by means of concentrated winding, for example. The number of turns and the wire diameter of the coil 3 are determined based on properties required of the motor 1 (rotation rate, torque, etc.), supply voltage, or the cross-sectional area of the slot.

The coil 3 is formed of three-phase coils of a U phase, a V phase and a W phase (referred to as coils 3U, 3V and 3W). Both terminals of the coil 3 of each phase are open. Thus, the coil 3 has six terminals in total. The coil 3 is configured so that its connection condition can be switched between the Y connection and the delta connection as will be described later. The insulator 14 is formed of a film made of PET (polyethylene terephthalate) and has a thickness of 0.1 to 0.2 mm, for example.

The stator core 11 has a configuration in which a plurality of (nine in this example) blocks are connected together via thin-wall parts. The magnet wire is wound around each tooth part 12 in a state in which the stator core 11 is extended in a belt-like shape and thereafter the stator core 11 is bent into a ring-like shape and its both ends are welded together.

Forming the insulator 14 with a thin film and employing the stator core 11 having a split structure to facilitate the winding process as above is effective for increasing the number of turns of the coil 3 in the slot. Incidentally, the stator core 11 is not limited to one having the configuration in which a plurality of blocks (split cores) are connected together as above.

The rotor 20 includes a rotor core 21 and permanent magnets 25 attached to the rotor core 21. The rotor core 21 is formed by stacking a plurality of electromagnetic steel sheets each 0.1 to 0.7 mm (0.35 mm in this example) thick in the rotation axis direction and fastening the electromagnetic steel sheets together by crimping.

The rotor core 21 is in a cylindrical shape and a shaft hole 27 (center hole) is formed at the center of the rotor core 21 in the radial direction. To the shaft hole 27, a shaft as the rotation axis of the rotor 20 (e.g., a shaft 90 of a rotary compressor 8) is fixed by means of shrink fitting, press fitting or the like.

A plurality of (six in this example) magnet insertion holes 22 in which the permanent magnets 25 are inserted are formed along an outer peripheral surface of the rotor core 21. The magnet insertion holes 22 are voids, and one magnet insertion hole 22 corresponds to one magnetic pole. In this example, six magnet insertion holes 22 are formed, and thus there are six poles in the whole rotor 20.

The magnet insertion hole 22 in this example has a V-shape in which a central part in the circumferential direction projects inward in the radial direction. Incidentally, the magnet insertion hole 22 is not limited to the V-shape and may also be in a straight shape, for example.

Two permanent magnets 25 are arranged in one magnet insertion hole 22. Namely, two permanent magnets 25 are arranged per magnetic pole. In this example, twelve permanent magnets 25 are arranged in total since the rotor 20 has six poles as mentioned above.

The permanent magnet 25 is a planar member that is elongated in the axial direction of the rotor core 21, having a width in the circumferential direction of the rotor core 21 and a thickness in the radial direction. The permanent magnet 25 is formed of a rare-earth magnet containing neodymium (Nd), iron (Fe) and boron (B) as the principal components, for example.

The permanent magnet 25 has been magnetized in its thickness direction. Further, the two permanent magnets 25 arranged in one magnet insertion hole 22 are magnetized so that magnetic poles identical with each other face the same side in the radial direction.

A flux barrier 26 is formed on each side of the magnet insertion hole 22 in the circumferential direction. The flux barrier 26 is a void formed to be communicated with the magnet insertion hole 22. The flux barrier 26 is a part for restraining leakage flux between adjacent magnetic poles (magnetic flux flowing through a part between poles).

In the rotor core 21, a first magnet holding part 23 as a projection is formed in a central part of each magnet insertion hole 22 in the circumferential direction. Further, in the rotor core 21, a second magnet holding part 24 as a projection is formed in each end part of the magnet insertion hole 22 in the circumferential direction. The first magnet holding part 23 and the second magnet holding parts 24 are parts for positioning and holding the permanent magnet 25 in each magnet insertion hole 22.

As mentioned above, the number of slots (i.e., the number of tooth parts 12) in the stator 10 is nine and the number of poles in the rotor 20 is six. Thus, in the motor 1, the ratio between the number of poles in the rotor 20 and the number of slots in the stator 10 is 2:3.

While the connection condition of the coil 3 is switched between the Y connection and the delta connection in the motor 1, there is a possibility that circulating current flows and the performance of the motor 1 deteriorates when the delta connection is used. The circulating current is caused by the third harmonic occurring in induced voltage in the winding of each phase. In the case of the concentrated winding in which the ratio between the number of poles and the number of slots is 2:3, it is known that if there is no influence of magnetic saturation or the like, no third harmonic occurs in the induced voltage and thus no performance deterioration due to circulating current occurs.

(Configuration of Rotary Compressor)

Figure 2:
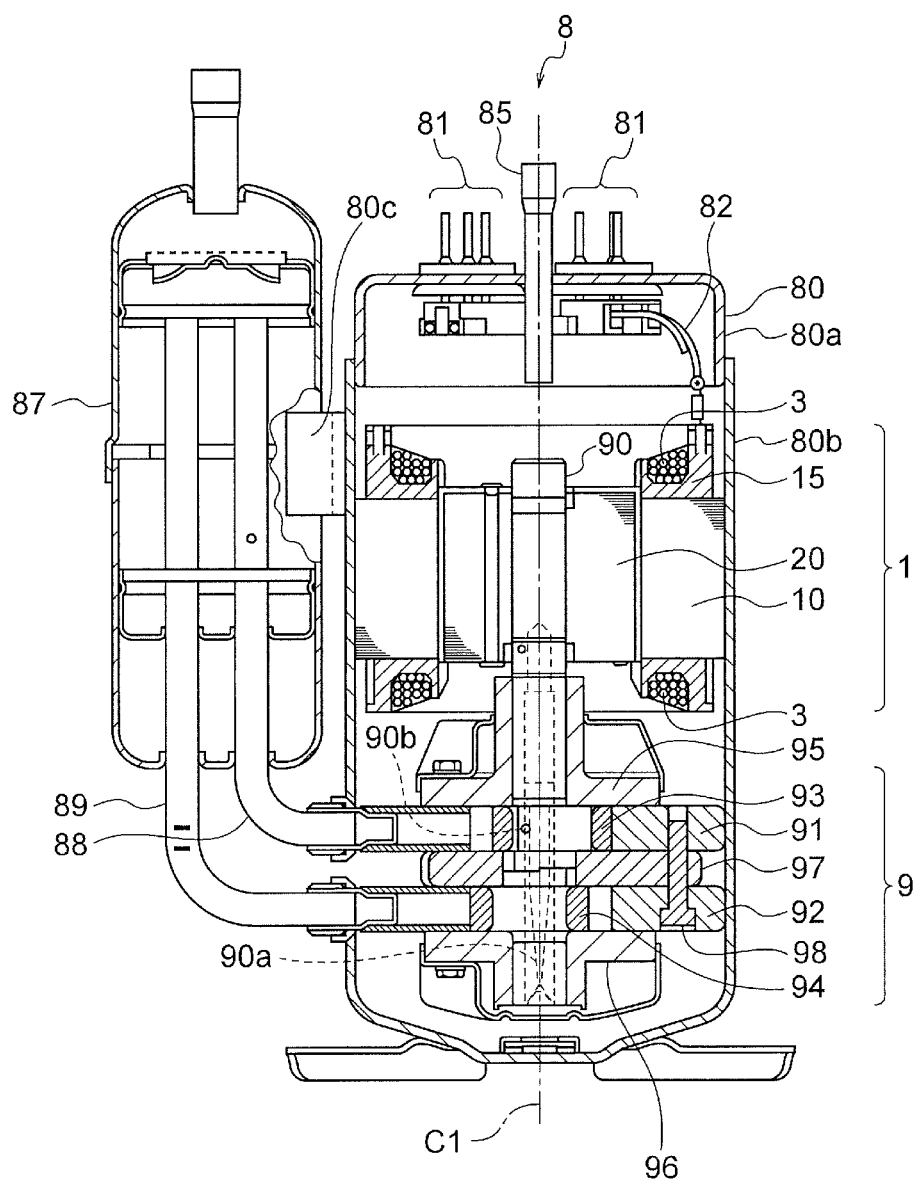
FIG. 2 is a cross-sectional view showing a configuration of a rotary compressor according to the embodiment.

Next, a rotary compressor 8 employing the motor 1 will be described below. FIG. 2 is a cross-sectional view showing a configuration of the rotary compressor 8. The rotary compressor 8 includes a shell 80, a compression mechanism 9 provided in the shell 80, and the motor 1 that drives the compression mechanism 9. The rotary compressor 8 further includes a shaft 90 (crank shaft) that connects the motor 1 and the compression mechanism 9 together so that motive power can be transmitted. The shaft 90 fits in the shaft hole 27 (FIG. 1) of the rotor 20 of the motor 1.

The shell 80 is a hermetic container formed of a steel plate, for example, and covers the motor 1 and the compression mechanism 9. The shell 80 includes an upper shell 80a and a lower shell 80b. Attached to the upper shell 80a are a glass terminal 81 as a terminal part for supplying electric power from the outside of the rotary compressor 8 to the motor 1 and a discharge pipe 85 for discharging a refrigerant compressed in the rotary compressor 8 to the outside. In this example, a total of six lead wires corresponding to two U-phase windings, two V-phase windings and two W-phase windings of the coil 3 of the motor 1 (FIG. 1) are lead out from the glass terminal 81. The lower shell 80b houses the motor 1 and the compression mechanism 9.

The compression mechanism 9 includes ring-shaped first cylinder 91 and second cylinder 92 along the shaft 90. The first cylinder 91 and the second cylinder 92 are fixed to an inner circumferential part of the shell 80 (lower shell 80b). A ring-shaped first piston 93 is arranged on an inner circumferential side of the first cylinder 91, while a ring-shaped second piston 94 is arranged on an inner circumferential side of the second cylinder 92. The first piston 93 and the second piston 94 are rotary pistons rotating together with the shaft 90.

A partition plate 97 is provided between the first cylinder 91 and the second cylinder 92. The partition plate 97 is a disk-shaped member having a through hole at its center. In a cylinder chamber of each of the first cylinder 91 and the second cylinder 92, a vane (not shown) separating the cylinder chamber into an intake side and a compression side is provided. The first cylinder 91, the second cylinder 92 and the partition plate 97 are fixed together by using bolts 98.

An upper frame 95 is arranged on an upper side of the first cylinder 91 to seal the upper side of the cylinder chamber of the first cylinder 91. A lower frame 96 is arranged on a lower side of the second cylinder 92 to seal the lower side of the cylinder chamber of the second cylinder 92. The upper frame 95 and the lower frame 96 support the shaft 90 to be rotatable.

Refrigerator oil (not shown) for lubricating sliding parts of the compression mechanism 9 is stored in a bottom part of the lower shell 80b of the shell 80. The refrigerator oil ascends in a hole 90a formed in the axial direction in the shaft 90 and is supplied to the sliding parts from oil supply holes 90b formed at a plurality of points on the shaft 90.

The stator 10 of the motor 1 is mounted on the inside of the shell 80 by means of shrink fitting. To the coil 3 of the stator 10, electric power is supplied from the glass terminal 81 attached to the upper shell 80a. To the shaft hole 27 (FIG. 1) of the rotor 20, the shaft 90 is fixed.

An accumulator 87 storing a refrigerant gas is attached to the shell 80. The accumulator 87 is held by a holding part 80c provided on an outer surface of the lower shell 80b, for example. A pair of intake pipes 88 and 89 are attached to the shell 80 and the refrigerant gas is supplied from the accumulator 87 to the first cylinder 91 and the second cylinder 92 via the intake pipes 88 and 89.

While R410A, R407C, R22 or the like may be used as the refrigerant, for example, it is desirable to use a low GWP (Global Warming Potential) refrigerant from the viewpoint of preventing global warming. As the low GWP refrigerant, the following refrigerants can be used, for example:

(1) First, halogenated hydrocarbon containing a carbon double bond in the composition, e.g., HFO (Hydro-Fluoro-Orefin)-1234yf ($CF_3CF=CH_2$) can be used. The GWP of HFO-1234yf is 4.

(2) Hydrocarbon containing a carbon double bond in the composition, e.g., R1270 (propylene) may also be used. The GWP of R1270 is 3, which is lower than that of HFO-1234yf, but flammability is higher than that of HFO-1234yf.

(3) It is also possible to use a mixture containing at least either a halogenated hydrocarbon containing a carbon double bond in the composition or a hydrocarbon containing a carbon double bond in the composition, e.g., a mixture of HFO-1234yf and R32. The aforementioned HFO-1234yf is a low-pressure refrigerant, and thus tends to cause great pressure loss and can cause performance deterioration of a refrigeration cycle (especially, an evaporator). Thus, it is desirable from a practical viewpoint to use a mixture with R32 or R41 that is a high-pressure refrigerant relative to HFO-1234yf.

The basic operation of the rotary compressor 8 is as follows: The refrigerant gas supplied from the accumulator 87 passes through the intake pipes 88 and 89 and is supplied to the cylinder chambers of the first cylinder 91 and the second cylinder 92. When the motor 1 is driven and the rotor 20 rotates, the shaft 90 rotates together with the rotor 20. Then, the first piston 93 and the second piston 94 fitted onto the shaft 90 rotate eccentrically in the cylinder chambers and thereby compress the refrigerant in the cylinder chambers. The compressed refrigerant ascends in the shell 80 through a hole (not shown) formed in the rotor 20 of the motor 1 and is discharged to the outside through the discharge pipe 85.

(Configuration of Air Conditioner)

Figure 3:
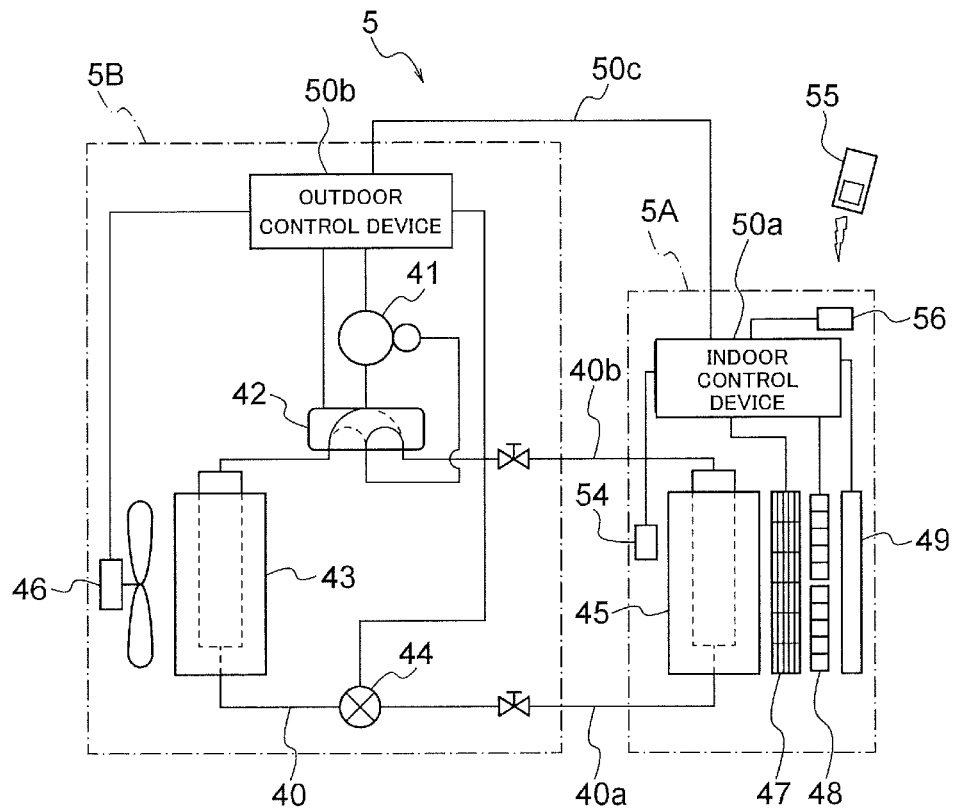
FIG. 3 is a block diagram showing a configuration of an air conditioner according to the embodiment.

Next, an air conditioner 5 (referred to also as a refrigeration air conditioner) including a driving device according to this embodiment will be described below. FIG. 3 is a block diagram showing a configuration of the air conditioner 5. The air conditioner 5 includes an indoor unit 5A installed in a room (air conditioning object space) and an outdoor unit 5B installed outdoors. The indoor unit 5A and the outdoor unit 5B are connected together by connection pipings 40a and 40b in which a refrigerant flows. In the connection piping 40a, a liquid refrigerant after passing through a condenser flows. In the connection piping 40b, a gas refrigerant after passing through an evaporator flows.

The outdoor unit 5B is provided with a compressor 41 that compresses the refrigerant and discharges the compressed refrigerant, a four-way valve (refrigerant channel selector valve) 42 that switches the flow direction of the refrigerant, an outdoor heat exchanger 43 that performs heat exchange between outside air and the refrigerant, and an expansion valve (decompression device) 44 that decompresses the high-pressure refrigerant into low pressure. The compressor 41 is formed with the aforementioned rotary compressor 8 (FIG. 2). The indoor unit 5A includes an indoor heat exchanger 45 that performs heat exchange between indoor air and the refrigerant.

The compressor 41, the four-way valve 42, the outdoor heat exchanger 43, the expansion valve 44 and the indoor heat exchanger 45 are connected together by piping 40 including the aforementioned connection pipings 140a and 140b to form a refrigerant circuit. With these components, a compression refrigeration cycle (compression heat pump cycle) circulating the refrigerant with the compressor 41 is formed.

To control the operation of the air conditioner 5, an indoor control device 50a is arranged in the indoor unit 5A and an outdoor control device 50b is arranged in the outdoor unit 5B. Each of the indoor control device 50a and the outdoor control device 50b includes a control board on which various circuits for controlling the air conditioner 5 have been formed. The indoor control device 50a and the outdoor control device 50b are connected to each other by a communication cable 50c. The communication cable 50c is bundled together with the aforementioned connection pipings 40a and 40b.

In the outdoor unit 5B, an outdoor fan 46 as a blower is arranged to face the outdoor heat exchanger 43. The outdoor fan 46 rotates and thereby generates an air current passing through the outdoor heat exchanger 43. The outdoor fan 46 is formed with a propeller fan, for example.

The four-way valve 42 is controlled by the outdoor control device 50b and switches the direction in which the refrigerant flows. When the four-way valve 42 is at the position indicated by the solid line in FIG. 3, the gas refrigerant discharged from the compressor 41 is sent to the outdoor heat exchanger (condenser) 43. In contrast, when the four-way valve 42 is at the position indicated by the broken line in FIG. 3, the gas refrigerant flowing in from the outdoor heat exchanger (evaporator) 43 is sent to the compressor 41. The expansion valve 44 is controlled by the outdoor control device 50b and decompresses the high-pressure refrigerant into low pressure by changing its opening degree.

In the indoor unit 5A, an indoor fan 47 as a blower is arranged to face the indoor heat exchanger 45. The indoor fan 47 rotates and thereby generates an air current passing through the indoor heat exchanger 45. The indoor fan 47 is formed with a cross flow fan, for example.

The indoor unit 5A is provided with an indoor temperature sensor 54 as a temperature sensor that measures the indoor temperature Ta as the air temperature in the room (air conditioning object space) and sends temperature information (information signal) obtained by the measurement to the indoor control device 50a. The indoor temperature sensor 54 may be formed with a temperature sensor used for standard air conditioners, or it is also possible to use a radiation temperature sensor that detects surface temperature of a wall, a floor or the like in the room.

The indoor unit 5A is further provided with a signal reception unit 56 that receives a command signal (operation command signal) transmitted from a remote control 55 (remote control device) operated by the user. With the remote control 55, the user makes operation inputs (operation start and stop) or issues commands in regard to the operation (set temperature, wind speed, etc.) to the air conditioner 5.

The compressor 41 is configured to be able to vary the operating rotation rate in a range of 20 to 130 rps in normal operation. With the increase in the rotation rate of the compressor 41, refrigerant circulation volume of the refrigerant circuit increases. The rotation rate of the compressor 41 is controlled by a control device 50 (specifically, the outdoor control device 50b) based on the temperature difference $\Delta T$ between the present indoor temperature Ta obtained by the indoor temperature sensor 54 and the set temperature Ts set by the user through the remote control 55. With the increase in the temperature difference $\Delta T$, the compressor 41 rotates at higher rotation rate and increases the circulation volume of the refrigerant.

The rotation of the indoor fan 47 is controlled by the indoor control device 50a. The rotation rate of the indoor fan 47 can be switched in multiple stages. In this example, the rotation rate can be switched among three stages of strong wind, middle wind, and soft wind, for example. When the wind speed setting has been set at an automatic mode by using the remote control 55, the rotation rate of the indoor fan 47 is switched based on the temperature difference $\Delta T$ between the measured indoor temperature Ta and the set temperature Ts.

The rotation of the outdoor fan 46 is controlled by the outdoor control device 50b. The rotation rate of the outdoor fan 46 can be switched in multiple stages. In this example, the rotation rate of the outdoor fan 46 is switched based on the temperature difference $\Delta T$ between the measured indoor temperature Ta and the set temperature Ts.

The indoor unit 5A further includes a lateral wind direction plate 48 and a vertical wind direction plate 49. The lateral wind direction plate 48 and the vertical wind direction plate 49 are parts for changing a blow-out direction of the conditioned air after undergoing the heat exchange by the indoor heat exchanger 45 when the conditioned air is blown out by the indoor fan 47 into the inside of the room. The lateral wind direction plate 48 changes the blowout direction laterally, while the vertical wind direction plate 49 changes the blowout direction vertically. The angle of each of the lateral wind direction plate 48 and the vertical wind direction plate 49, namely, the wind direction of the air stream blown out is controlled by the indoor control device 50a based on a setting made through the remote control 55.

The basic operation of the air conditioner 5 is as follows: In the cooling operation, the four-way valve 42 is switched to the position indicated by the solid line and the high-temperature and high-pressure gas refrigerant discharged from the compressor 41 flows into the outdoor heat exchanger 43. In this case, the outdoor heat exchanger 43 operates as a condenser. When air passes through the outdoor heat exchanger 43 due to the rotation of the outdoor fan 46, the air absorbs condensation heat of the refrigerant by means of heat exchange. The refrigerant is condensed into a high-pressure and low-temperature liquid refrigerant and then adiabatically expanded by the expansion valve 44 into a low-pressure and low-temperature two-phase refrigerant.

The refrigerant that passed through the expansion valve 44 flows into the indoor heat exchanger 45 of the indoor unit 5A. The indoor heat exchanger 45 operates as an evaporator. When air passes through the indoor heat exchanger 45 due to the rotation of the indoor fan 47, evaporation heat is absorbed by the refrigerant by means of heat exchange, and the air cooled down by the heat exchange is supplied to the inside of the room. The refrigerant evaporates into a low-temperature and low-pressure gas refrigerant and is then compressed again by the compressor 41 into the high-temperature and high-pressure refrigerant.

In the heating operation, the four-way valve 42 is switched to the position indicated by the dotted line and the high-temperature and high-pressure gas refrigerant discharged from the compressor 41 flows into the indoor heat exchanger 45. In this case, the indoor heat exchanger 45 operates as a condenser. When air passes through the indoor heat exchanger 45 due to the rotation of the indoor fan 47, the air absorbs condensation heat from the refrigerant by means of heat exchange, and the air heated by the heat exchange is supplied to the inside of the room. The refrigerant is condensed into a high-pressure and low-temperature liquid refrigerant and then adiabatically expanded by the expansion valve 44 into a low-pressure and low-temperature two-phase refrigerant.

The refrigerant that passed through the expansion valve 44 flows into the outdoor heat exchanger 43 of the outdoor unit 5B. The outdoor heat exchanger 43 operates as an evaporator. When air passes through the outdoor heat exchanger 43 due to the rotation of the outdoor fan 46, evaporation heat is absorbed by the refrigerant by means of heat exchange. The refrigerant evaporates into a low-temperature and low-pressure gas refrigerant and is then compressed again by the compressor 41 into the high-temperature and high-pressure refrigerant.

Figure 4:
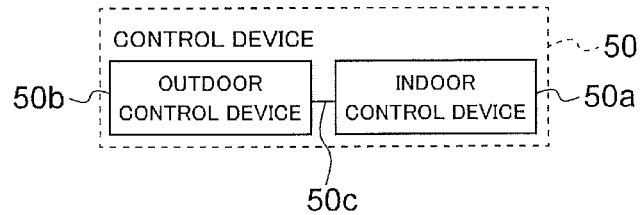
FIG. 4 is a conceptual diagram showing a basic configuration of a control system of the air conditioner according to the embodiment.

FIG. 4 is a conceptual diagram showing a basic configuration of a control system of the air conditioner 5. The aforementioned indoor control device 50a and outdoor control device 50b control the air conditioner 5 while exchanging information with each other via the communication cable 50c. The indoor control device 50a and the outdoor control device 50b will hereinafter be referred to collectively as the control device 50.

Figure 5A:
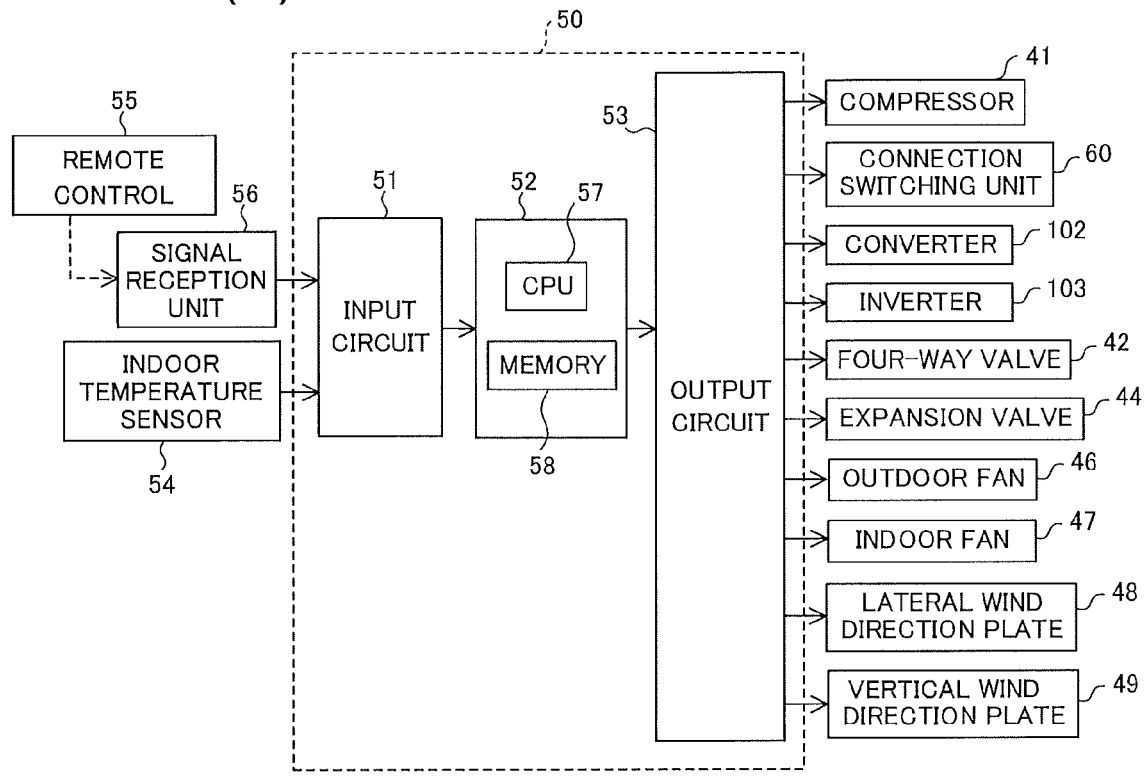
FIG. 5(A) is a block diagram showing the control system of the air conditioner according to the embodiment.

FIG. 5(A) is a block diagram showing the control system of the air conditioner 5. The control device 50 is formed with a microcomputer, for example. An input circuit 51, an arithmetic circuit 52 and an output circuit 53 have been installed in the control device 50.

To the input circuit 51, the command signal received by the signal reception unit 56 from the remote control 55 is inputted. The command signal includes a signal for setting an operation input, an operation mode, the set temperature, an air flow rate or the wind direction, for example. The temperature information indicating the indoor temperature detected by the indoor temperature sensor 54 is also inputted to the input circuit 51. The input circuit 51 outputs these pieces of input information to the arithmetic circuit 52.

The arithmetic circuit 52 includes a CPU (Central Processing Unit) 57 and a memory 58. The CPU 57 performs arithmetic processing and determination processing. The memory 58 stores various types of set values and programs to be used for the control of the air conditioner 5. The arithmetic circuit 52 performs computation and determination based on the information inputted from the input circuit 51 and outputs the result to the output circuit 53.

The output circuit 53 outputs control signals to the compressor 41, a connection switching unit 60 (described later), a converter 102, an inverter 103, the four-way valve 42, the expansion valve 44, the outdoor fan 46, the indoor fan 47, the lateral wind direction plate 48 and the vertical wind direction plate 49 based on the information inputted from the arithmetic circuit 52.

The indoor control device 50a and the outdoor control device 50b are represented collectively as the control device 50 in this description since the indoor control device 50a and the outdoor control device 50b (FIG. 4) control various types of devices in the indoor unit 5A and the outdoor unit 5B while exchanging information with each other via the communication cable 50c as mentioned earlier. Actually, each of the indoor control device 50a and the outdoor control device 50b is formed with a microcomputer. Incidentally, it is also possible to install the control device in only one of the indoor unit 5A and the outdoor unit 5B to control the various types of devices in the indoor unit 5A and the outdoor unit 5B.

Figure 5B:
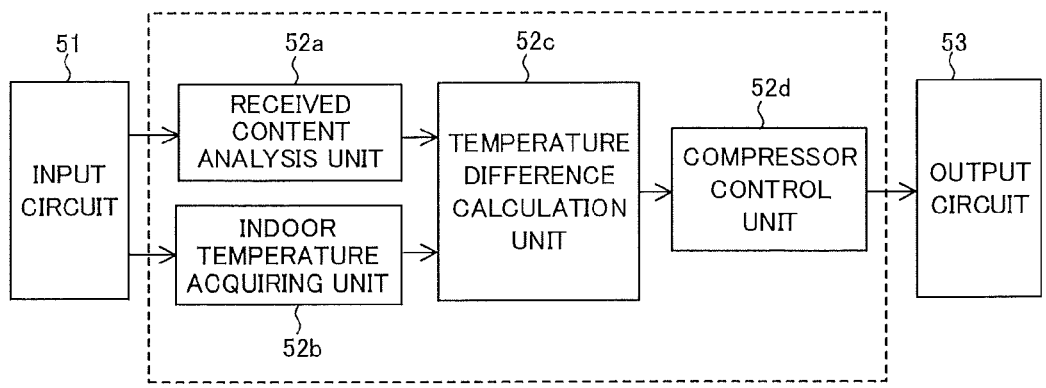
FIG. 5(B) is a block diagram showing a part for controlling a motor of a compressor based on the indoor temperature.

FIG. 5(B) is a block diagram showing a part of the control device 50 for controlling the motor 1 of the compressor 41 based on the indoor temperature Ta. The arithmetic circuit 52 of the control device 50 includes a received content analysis unit 52a, an indoor temperature acquisition unit 52b, a temperature difference calculation unit 52c and a compressor control unit 52d. These units are included in the CPU 57 of the arithmetic circuit 52, for example.

The received content analysis unit 52a analyzes the command signal inputted from the remote control 55 via the signal reception unit 56 and the input circuit 51. Based on the result of the analysis, the received content analysis unit 52a outputs the operation mode and the set temperature Ts, for example, to the temperature difference calculation unit 52c. The indoor temperature acquisition unit 52b acquires the indoor temperature Ta inputted from the indoor temperature sensor 54 via the input circuit 51 and outputs the indoor temperature Ta to the temperature difference calculation unit 52c.

The temperature difference calculation unit 52c calculates the temperature difference $\Delta T$ between the indoor temperature Ta inputted from the indoor temperature acquisition unit 52b and the set temperature Ts inputted from the received content analysis unit 52a. When the operation mode inputted from the received content analysis unit 52a is the heating operation, the temperature difference $\Delta T$ is calculated as $\Delta T = Ts - Ta$. When the operation mode is the cooling operation, the temperature difference $\Delta T$ is calculated as $\Delta T = Ta - Ts$. The temperature difference calculation unit 52c outputs the calculated temperature difference $\Delta T$ to the compressor control unit 52d.

The compressor control unit 52d controls a driving device 100 based on the temperature difference $\Delta T$ inputted from the temperature difference calculation unit 52c and thereby controls the rotation rate of the motor 1 (i.e., the rotation rate of the compressor 41).

(Configuration of Driving Device)

Next, the driving device 100 that drives the motor 1 will be described below. FIG. 6 is a block diagram showing a configuration of the driving device 100. The driving device 100 is configured to include the converter 102 that rectifies output power of a power supply 101, the inverter 103 that applies voltage (specifically, AC voltage) to the coil 3 of the motor 1, the connection switching unit 60 that switches the connection condition of the coil 3, and the control device 50. To the converter 102, electric power is supplied from the power supply 101 that is an alternating current (AC) power supply.

The power supply 101 is an AC power supply of 200 V (effective voltage), for example. The converter 102 is a rectifier circuit and outputs direct current (DC) voltage of 280 V, for example. The voltage outputted from the converter 102 is referred to as bus voltage. The inverter 103 is supplied with the bus voltage from the converter 102 and outputs line voltage (referred to also as motor voltage) to the coil 3 of the motor 1. To the inverter 103, wirings 104, 105 and 106 respectively connected to the coils 3U, 3V and 3W are connected.

As switching elements of the inverter 103, SiC (silicon carbide) elements or GaN (gallium nitride) elements are used, for example. With these elements, switching loss can be reduced.

The coil 3U has terminals 31U and 32U. The coil 3V has terminals 31V and 32V. The coil 3W has terminals 31W and 32W. The wiring 104 is connected to the terminal 31U of the coil 3U. The wiring 105 is connected to the terminal 31V of the coil 3V. The wiring 106 is connected to the terminal 31W of the coil 3W.

The connection switching unit 60 includes switches 61, 62 and 63. The switch 61 connects the terminal 32U of the coil 3U to either the wiring 105 or a neutral point 33. The switch 62 connects the terminal 32V of the coil 3V to either the wiring 106 or the neutral point 33. The switch 63 connects the terminal 32W of the coil 3W to either the wiring 104 or the neutral point 33. The switches 61, 62 and 63 of the connection switching unit 60 are formed with relay contacts in this example. However, the switches 61, 62 and 63 may be formed with semiconductor switches.

The control device 50 controls the converter 102, the inverter 103 and the connection switching unit 60. The configuration of the control device 50 is as described with reference to FIG. 5. The operation command signal from the remote control 55 received by the signal reception unit 56 and the indoor temperature detected by the indoor temperature sensor 54 are inputted to the control device 50. Based on these pieces of input information, the control device 50 outputs a voltage switching signal to the converter 102, outputs an inverter driving signal to the inverter 103, and outputs a connection switching signal to the connection switching unit 60. When the connection switching unit 60 switches the connection condition of the coil 3, the control device 50 controls the inverter 103 so that the rotation of the motor 1 temporarily stops before the completion of the switching.

In the condition shown in FIG. 6, the switch 61 is connecting the terminal 32U of the coil 3U to the neutral point 33, the switch 62 is connecting the terminal 32V of the coil 3V to the neutral point 33, and the switch 63 is connecting the terminal 32W of the coil 3W to the neutral point 33. Namely, the terminals 31U, 31V and 31W of the coils 3U, 3V and 3W are connected to the inverter 103, and the terminals 32U, 32V and 32W of the coils 3U, 3V and 3W are connected to the neutral point 33.

FIG. 7 is a block diagram showing a condition in which the switches 61, 62 and 63 of the connection switching unit 60 in the driving device 100 are switched. In the condition shown in FIG. 7, the switch 61 is connecting the terminal 32U of the coil 3U to the wiring 105, the switch 62 is connecting the terminal 32V of the coil 3V to the wiring 106, and the switch 63 is connecting the terminal 32W of the coil 3W to the wiring 104.

Figure 8B:
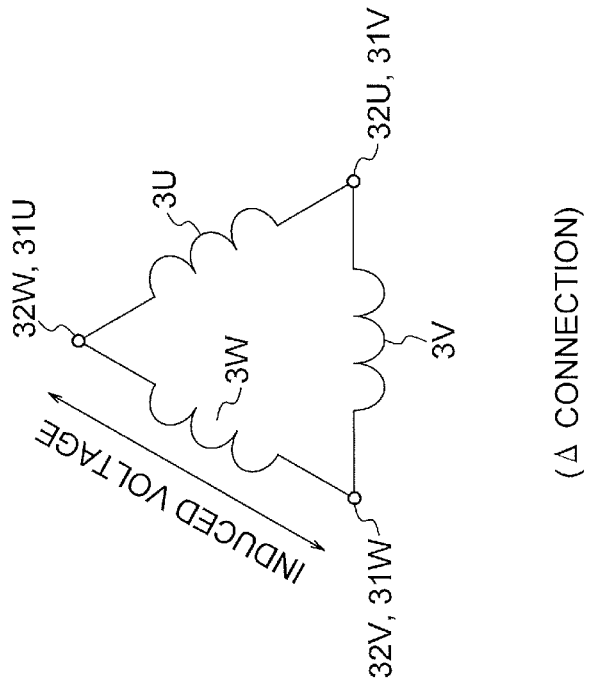
FIGS. 8(A) and 8(B) are schematic diagrams showing a coil connection condition switching operation in the embodiment.
Figure 8A:
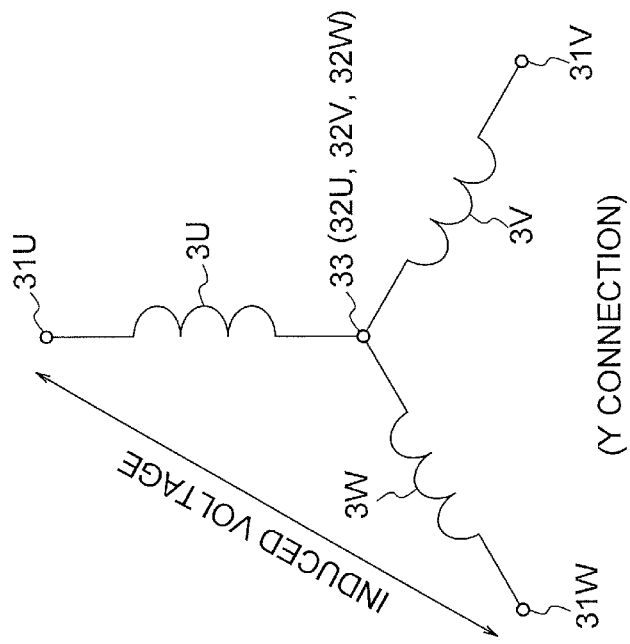

FIG. 8(A) is a schematic diagram showing the connection condition of the coils 3U, 3V and 3W when the switches 61, 62 and 63 are in the condition shown in FIG. 6. The coils 3U, 3V and 3W are connected to the neutral point 33 at their respective terminals 32U, 32V and 32W. Accordingly, the connection condition of the coils 3U, 3V and 3W is set to the Y connection (star connection).

FIG. 8(B) is a schematic diagram showing the connection condition of the coils 3U, 3V and 3W when the switches 61, 62 and 63 are in the condition shown in FIG. 7. The terminal 32U of the coil 3U is connected to the terminal 31V of the coil 3V via the wiring 105 (FIG. 7). The terminal 32V of the coil 3V is connected to the terminal 31W of the coil 3W via the wiring 106 (FIG. 7). The terminal 32W of the coil 3W is connected to the terminal 31U of the coil 3U via the wiring 104 (FIG. 7). Accordingly, the connection condition of the coils 3U, 3V and 3W is set to the delta connection (triangle connection). The delta connection lowers the line voltage of the coil 3 compared to the Y connection.

As above, the connection switching unit 60 is capable of switching the connection condition of the coils 3U, 3V and 3W of the motor 1 between the Y connection (first connection condition) and the delta connection (second connection condition) by the switching of the switches 61, 62 and 63.

Figure 9:
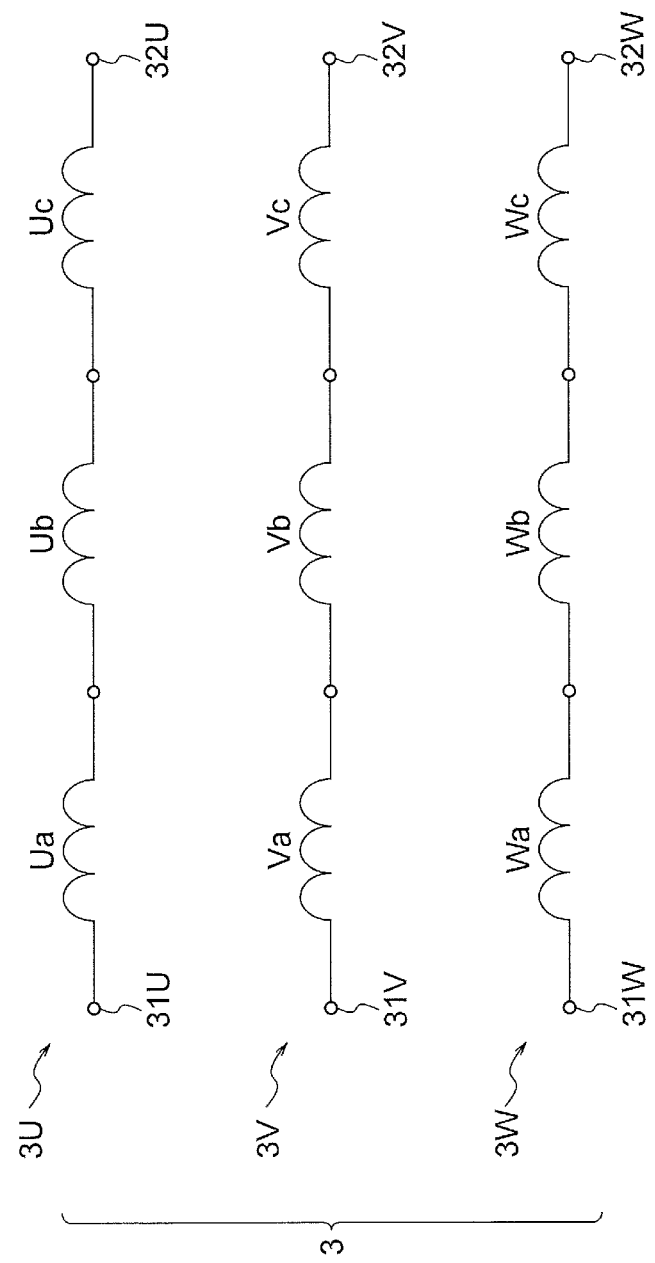
FIG. 9 is a schematic diagram showing connection condition of a coil in the embodiment.

FIG. 9 is a schematic diagram showing coil parts of the coils 3U, 3V and 3W. As mentioned earlier, the motor 1 includes nine tooth parts 12 (FIG. 1) and each coil 3U, 3V, 3W is wound around three tooth parts 12. Namely, the coil 3U is a series connection of U-phase coil parts Ua, Ub and Uc wound around three tooth parts 12. Similarly, the coil 3V is a series connection of V-phase coil parts Va, Vb and Vc wound around three tooth parts 12. Similarly, the coil 3W is a series connection of W-phase coil parts Wa, Wb and Wc wound around three tooth parts 12.

Inverter voltage for driving the motor 1 (i.e., voltage applied to the coil 3) is generated by the PWM control method. In the PWM control method, a waveform of the inverter voltage is generated by controlling ON/OFF time ratios of an inverter switch. By this method, an intended output waveform of the inverter 103 can be obtained. Specifically, when an inverter switch in the inverter 103 is ON, voltage is supplied from the inverter 103 to the coil 3 and an inverter voltage rises. When the inverter switch is OFF, the supply of voltage from the inverter 103 to the coil 3 is interrupted and the inverter voltage drops. The difference between the inverter voltage and induced voltage is supplied to the coil 3, by which motor current is generated and turning force of the motor 1 is caused. An intended output waveform of the inverter 103 can be obtained by controlling the ON/OFF time ratios of the inverter switch to match a targeted motor current value.

Figure 10A:
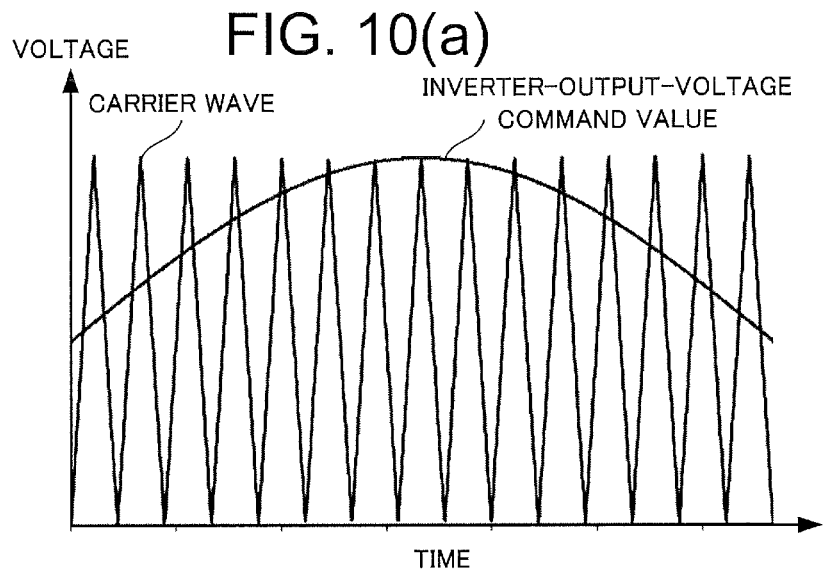
FIG. 10(a) is a diagram showing an example of a carrier wave for generating a PWM control signal and an inverter-output-voltage command value.
Figure 10B:
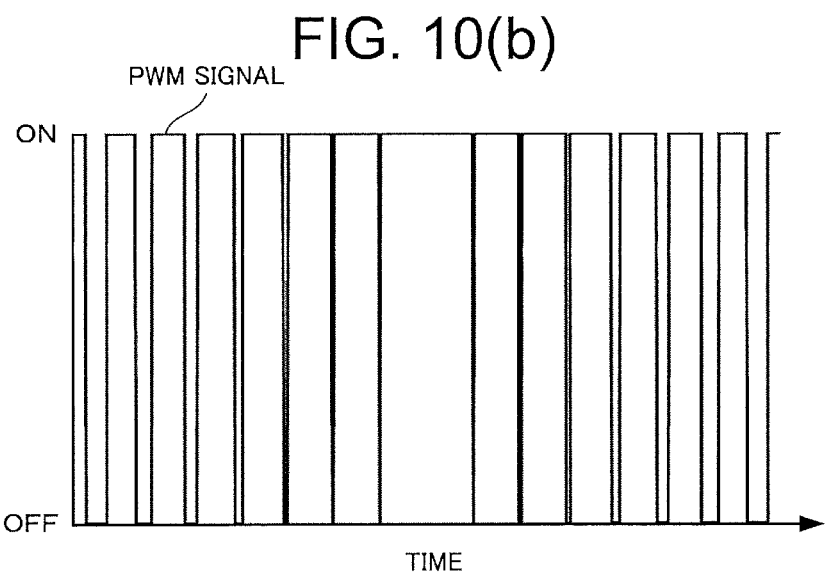
FIG. 10(b) is a diagram showing an example of the PWM control signal generated by a control device.
Figure 10C:
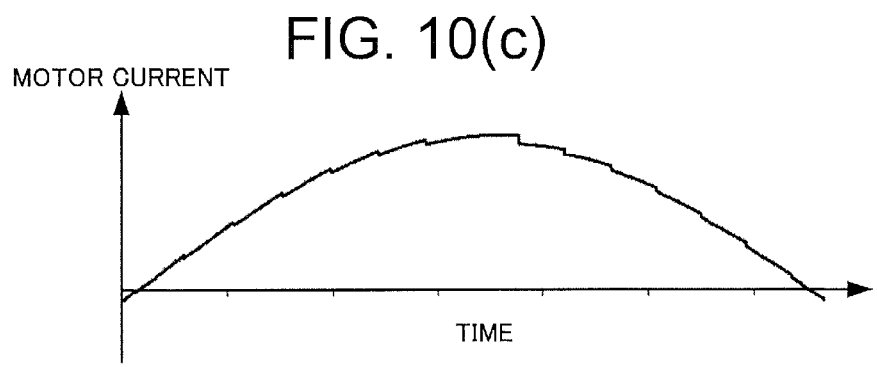
FIG. 10(c) is a diagram showing an example of a motor current generated based on the PWM control signal.

FIG. 10(a) is a diagram showing an example of a carrier wave for generating a PWM control signal and an inverter-output-voltage command value, FIG. 10(b) is a diagram showing an example of the PWM control signal generated by the control device 50, and FIG. 10(c) is a diagram showing an example of a motor current generated based on the PWM control signal.

On-off timing of each inverter switch is determined based on the carrier wave. The carrier wave is formed of triangular waves having constant amplitude. The pulse width modulation cycle in the PWM control method is determined by the carrier frequency as the frequency of the carrier wave.

Specifically, the control device 50 compares the voltage value of the carrier wave with the inverter-output-voltage command value. The inverter-output-voltage command value is calculated by the control device 50 based on the operation command signal outputted from the remote control 55 and a target value of inverter output (target motor current value), for example. When the voltage value of the carrier wave is smaller than the inverter-output-voltage command value, the control device 50 turns on the PWM control signal and thereby controls the inverter 103 so that the inverter switch turns on. When the voltage value of the carrier wave is larger than or equal to the inverter-output-voltage command value, the control device 50 turns off the PWM control signal and thereby controls the inverter 103 so that the inverter switch turns off. With this control, the output of the inverter approaches the target value.

Figure 11:
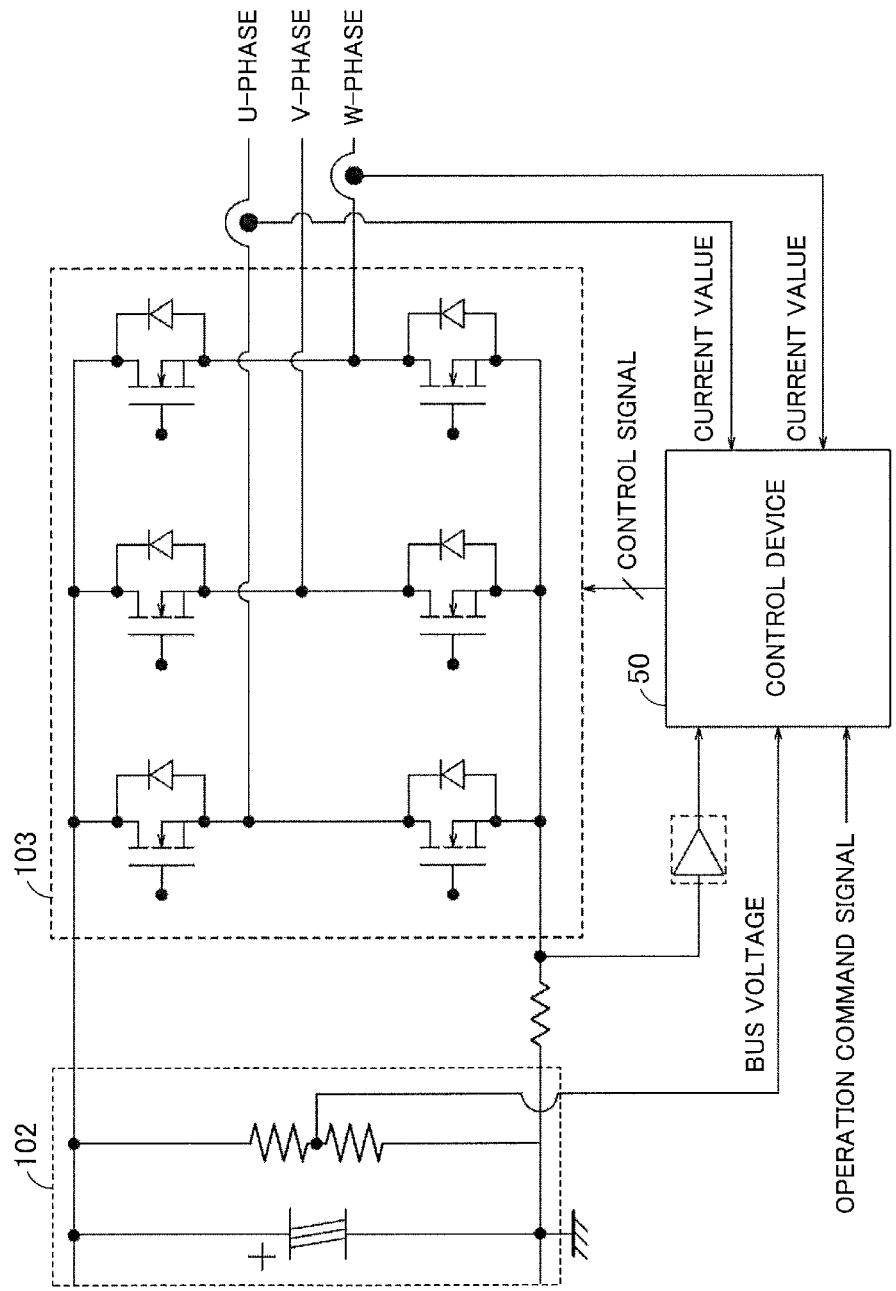
FIG. 11 is a diagram showing an example of various types of signals inputted to the control device and a signal outputted from the control device.

FIG. 11 is a diagram showing an example of various types of signals inputted to the control device 50 and a signal outputted from the control device 50.

FIG. 12 is a flowchart showing an example of the operation of the driving device 100.

An example of a method of driving the motor 1 will be described below.

When the user transmits the operation command signal by using the remote control 55, the control device 50 of the air conditioner 5 receives the operation command signal. Further, information such as a signal indicating the bus voltage is inputted to the control device 50 (step S1). The operation command signal inputted to the signal reception unit 56 is transferred to the control device 50. Furthermore, after the motor 1 drives, the electric current value of the motor current is inputted to the control device 50. In this embodiment, the operation command signal inputted to the signal reception unit 56 is inputted to the indoor control device 50a. Moreover, a signal based on the operation command signal transferred from the signal reception unit 56 is transferred from the indoor control device 50a to the outdoor control device 50b. The signal transferred from the indoor control device 50a may be either the same signal as the operation command signal or a signal obtained by conversion based on the operation command signal.

Based on these pieces of information, the control device 50 calculates the inverter-output-voltage command value suitable for the driving of the motor 1. Further, the control device 50 controls the connection switching unit 60 so as to switch the connection condition of the coil 3 according to the operation command signal or the indoor temperature. When the switching of the connection condition is performed, the control device 50 transmits the connection switching signal to the connection switching unit 60. The connection switching unit 60 switches the connection condition of the coil 3 between the Y connection and the delta connection based on the connection switching signal received from the control device 50 (step S2). When the connection switching unit 60 switches the connection condition of the coil 3, the control device 50 controls the inverter 103 so that the rotation of the motor 1 temporarily stops before the completion of the switching. After the switching is completed, the control device 50 controls the inverter 103 so that the motor 1 drives again.

However, when it is unnecessary to switch the connection condition of the coil 3, the control device 50 controls the connection switching unit 60 so that the connection condition of the coil 3 is maintained.

In step S3, the control device 50 checks the connection condition of the coil 3. In this embodiment, the control device 50 determines whether the connection condition of the coil 3 is the Y connection or not. However, it is also possible for the control device 50 to check whether the connection condition of the coil 3 is the delta connection or not.

When the connection condition of the coil 3 is the Y connection (Yes in the step S3), the control device 50 sets the carrier frequency of the inverter 103, for adjusting the output from the inverter 103 supplied to the coil 3 (specifically, a control frequency of voltage applied to the coil 3), at a carrier frequency f1 (first carrier frequency) (step S4).

When the connection condition of the coil 3 is not the Y connection (No in the step S3), that is, when the connection condition of the coil 3 is the delta connection, the control device 50 sets the carrier frequency at a carrier frequency f2 (second carrier frequency) (step S5). That is, in the step S3 to the step S5, the control device 50 sets the carrier frequency depending on the connection condition of the coil 3. The carrier frequency f2 is a frequency different from the carrier frequency f1. With this operation, the control device 50 controls the carrier frequency.

Specifically, when the connection condition of the coil 3 has been switched, the control device 50 controls the carrier frequency after the motor 1 drives again so that the carrier frequency after the motor 1 drives again differs from the carrier frequency before the motor 1 temporarily stops.

The control device 50 generates the PWM control signal based on the difference between the inverter-output-voltage command value and the voltage value of the carrier wave (step S6).

The control device 50 outputs the inverter driving signal based on the PWM control signal to the inverter 103 and thereby performs the on-off control of the inverter switch (step S7).

The inverter voltage is outputted from the inverter 103 when the inverter switch is on. The inverter voltage is supplied to the coil 3 and the motor current occurs in the motor 1. Accordingly, the inverter voltage is converted into the turning force of the motor 1 (specifically, the rotor 20). The motor current (specifically, U-phase current, V-phase current and W-phase current) is measured by a current sensor or the like and the measurement result (e.g., signal indicating the current values) is transmitted to the control device 50.

FIG. 13 is a diagram showing the relationship among the rotation rate of the motor 1, the voltage usage ratio, and harmonic components of the motor current depending on the connection condition of the coil 3.

FIG. 14 is a diagram for explaining a cause of harmonics of the motor current.

As the carrier frequency increases, the cycle of the PWM control signal becomes shorter, and thus the motor current does not deviate from the target value and waveform generation ratio improves. Namely, the harmonic components of the motor current decrease. Accordingly, harmonic iron loss caused by the harmonic components of the motor current decreases. On the other hand, the switching loss increases due to an increase in the number of times of the switching of the inverter 103. Therefore, it is desirable to determine the carrier frequency that optimizes the efficiency of the motor 1 in consideration of the balance between the harmonic iron loss and the switching loss.

The harmonic components of the motor current vary depending on the voltage usage ratio. The voltage usage ratio is the ratio of the effective value of the inverter voltage multiplied by $\sqrt{2}$ to the bus voltage. Namely, the voltage usage ratio is calculated as (effective value of inverter voltage×$\sqrt{2}$)÷bus voltage. The voltage usage ratio is proportional to the ON-time of the inverter switch. The voltage usage ratio is used as an index indicating how much of the bus voltage is being used.

In general, in an interior permanent magnet motor, induced voltage occurs in the coil due to electromagnetic induction between the permanent magnet and the coil. With the increase in the rotation rate of the motor, the induced voltage increases and the voltage usage ratio also increases. Namely, the difference between the inverter voltage and the induced voltage is converted into the turning force of the motor. Instantaneous inverter output voltage (i.e., actual inverter voltage) is controlled by the on-off action of the inverter switch and thus takes on zero or a value equivalent to the bus voltage. With the decrease in the voltage usage ratio, that is, with the decrease in the effective value of the inverter voltage, the deviation between the actual inverter voltage and the inverter-output-voltage command value when the inverter switch is on increases and the harmonic components of the motor current occur. Accordingly, the harmonic iron loss occurs. Therefore, when the motor 1 is in low speed rotation, the voltage usage ratio drops, and accordingly, the ratio of the harmonic iron loss in the total loss in the motor 1 is high.

As shown in FIG. 13, when the voltage usage ratio is low, it is desirable to increase the carrier frequency. When the voltage usage ratio is low, the ratio of the harmonic iron loss is high, and thus increasing the carrier frequency can reduce the harmonic iron loss and increase the motor efficiency. That is, the carrier frequency optimizing the efficiency increases with the increase in the ratio of the harmonic iron loss.

As shown in FIG. 13, since the voltage usage ratio differs between the Y connection and the delta connection of the coil 3, the carrier frequency optimizing the efficiency of the motor 1 differs between the Y connection and the delta connection. Therefore, the control device 50 sets the carrier frequency depending on the connection condition of the coil 3. Namely, carrier frequencies different from each other are set respectively for the Y connection and the delta connection.

Figure 15A:
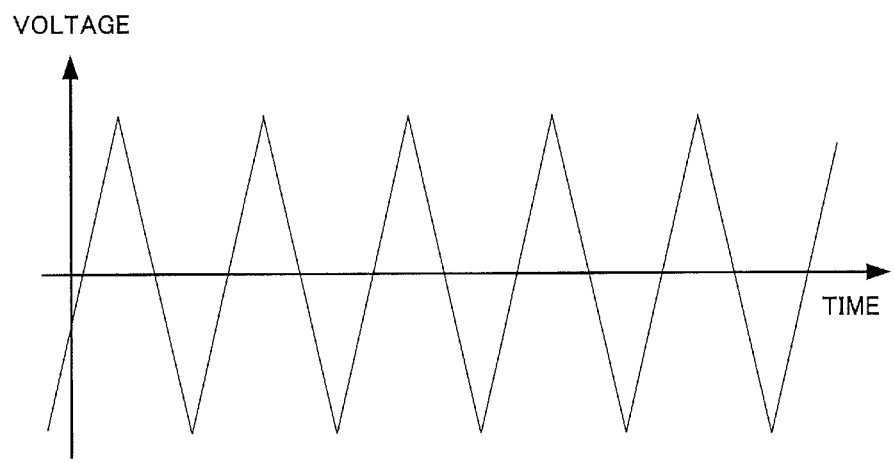
FIG. 15(a) is a diagram showing an example of a commonly used carrier wave.
Figure 15B:
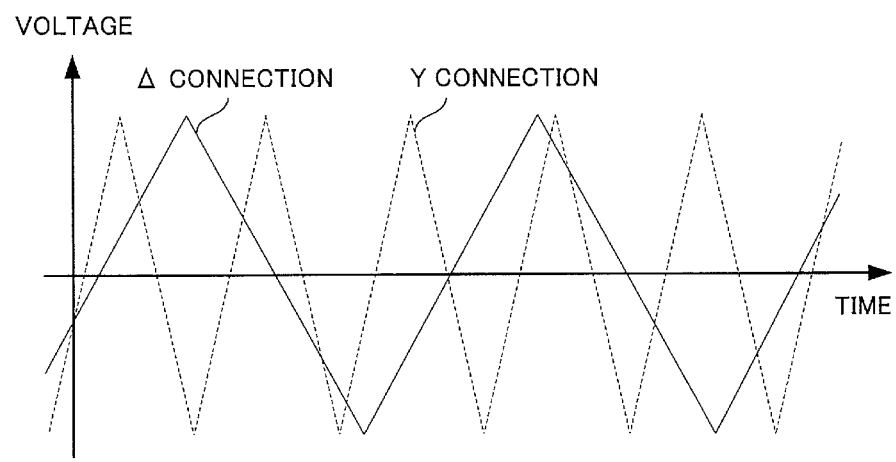
FIG. 15(b) is a diagram showing an example of a carrier wave when the connection condition of the coil 3 is the Y connection and an example of a carrier wave when the connection condition of the coil is the delta connection.

FIG. 15(*a*) is a diagram showing an example of a commonly used carrier wave, and FIG. 15(*b*) is a diagram showing an example of a carrier wave when the connection condition of the coil 3 is the Y connection and an example of a carrier wave when the connection condition of the coil 3 is the delta connection.

As shown in FIG. 15(*b*), the carrier frequency in the Y connection is set to be higher than the carrier frequency in the delta connection.

The delta connection is used at times of high speed rotation, and thus the induced voltage relative to the bus voltage is high and the voltage usage ratio is high. Thus, in the delta connection, the ratio of the harmonic iron loss is low compared to the Y connection and an efficiency optimum point exists on a low-carrier side.

The Y connection is used at times of low speed rotation. The Y connection is capable of increasing the voltage usage ratio compared to the delta connection if the rotation rate is the same, and has the advantage of reducing the harmonic iron loss. However, due to the difference in the driving rotation rate required in respective connection conditions, the Y connection is low in the voltage usage ratio and high in the ratio of the harmonic iron loss in the total loss in the motor 1 in comparison with the delta connection.

An example will be described below about a case where the connection condition of the coil 3 is set to the Y connection when an operating condition of the motor 1 used for a compressor of a 4.0 kw air conditioner is an intermediate condition (low speed operation) having a high degree of contribution to the efficiency of the motor 1 and the connection condition of the coil 3 is set to the delta connection when the operating condition of the motor 1 is a rated condition (high speed operation). In this case, when the rotation rate is set at 15 rps in the Y connection and set at 50 rps in the delta connection, the voltage usage ratio in the Y connection is 50% to 60% in the case where the voltage usage ratio in the delta connection is designed at 90% to 110%.

Figure 16:
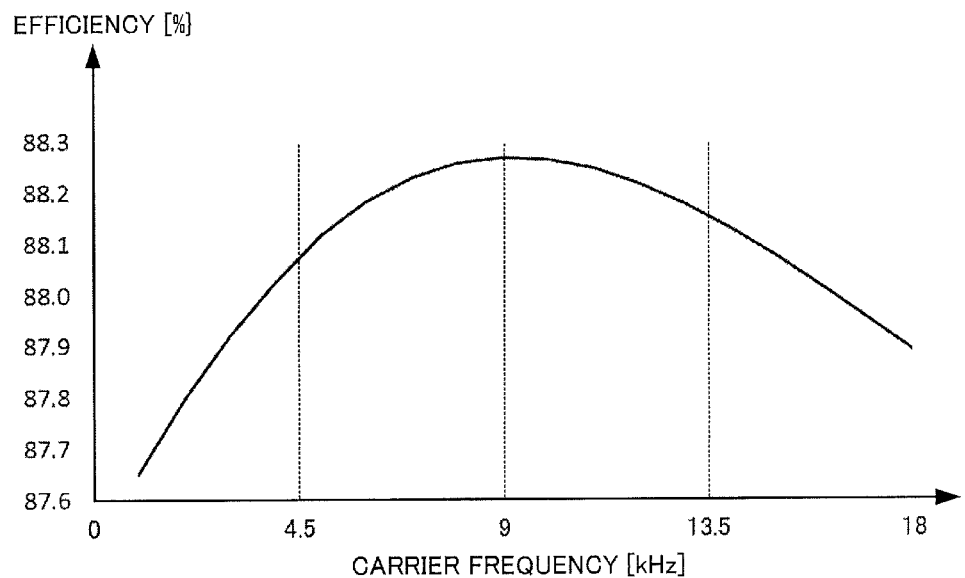
FIG. 16 is a diagram showing the relationship between the efficiency (circuit efficiency and motor efficiency) and the carrier frequency in the Y connection.

FIG. 16 is a diagram showing the relationship between the efficiency (circuit efficiency and motor efficiency) and the carrier frequency in the Y connection.

Figure 17:
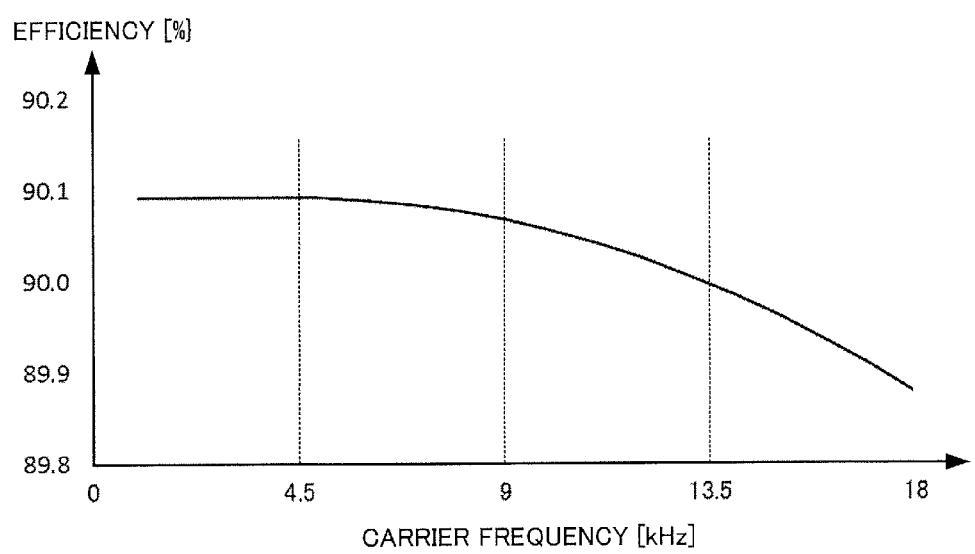
FIG. 17 is a diagram showing the relationship between the efficiency (circuit efficiency and motor efficiency) and the carrier frequency in the delta connection.

FIG. 17 is a diagram showing the relationship between the efficiency (circuit efficiency and motor efficiency) and the carrier frequency in the delta connection.

In the Y connection, the voltage usage ratio is low and thus the ratio of the harmonic iron loss is high. Accordingly, as shown in FIG. 16, in the Y connection, the optimum value of efficiency exists on a high carrier frequency side compared to the delta connection. In contrast, as shown in FIG. 17, in the delta connection, the optimum value of efficiency exists on a low carrier frequency side compared to the Y connection. The carrier frequency is set at f1 (first carrier frequency) when the connection condition of the coil 3 is the Y connection and at f2 (second carrier frequency) when the connection condition of the coil 3 is the delta connection. Specifically, it is desirable to set the carrier frequency so that the carrier frequency f1 in the Y connection is higher than the carrier frequency f2 in the delta connection. For example, the carrier frequency f1 is set at 9000 Hz and the carrier frequency f2 is set at 4500 Hz to be optimized for the intermediate condition and the rated condition of the motor 1.

Figure 18:
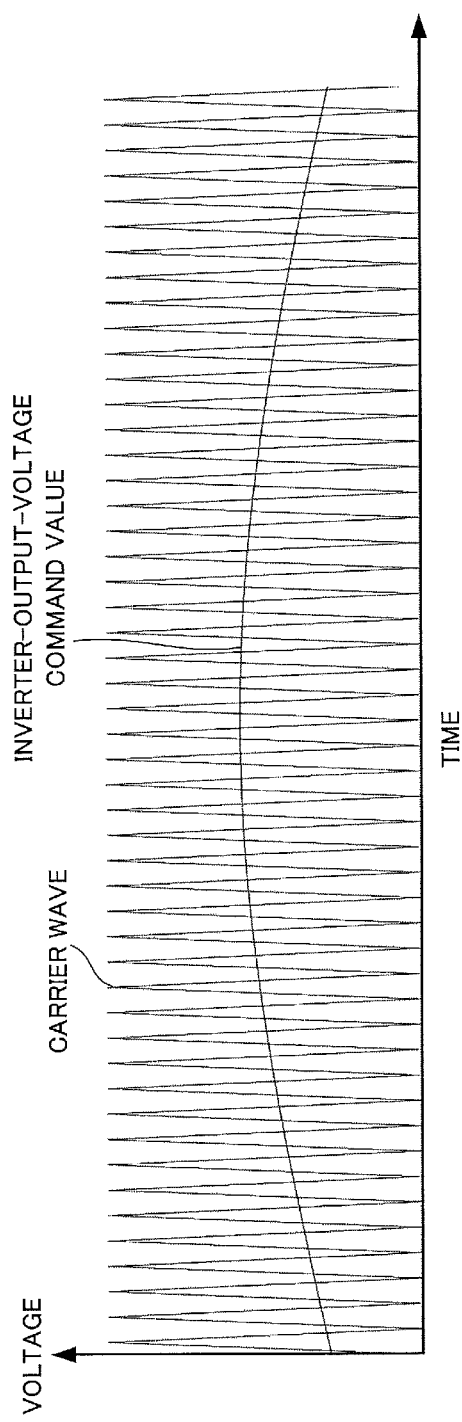
FIG. 18 is a diagram showing the carrier wave and the inverter-output-voltage command value in a motor setting 1.

FIG. 18 is a diagram showing the carrier wave and the inverter-output-voltage command value in a motor setting 1.

Figure 19:
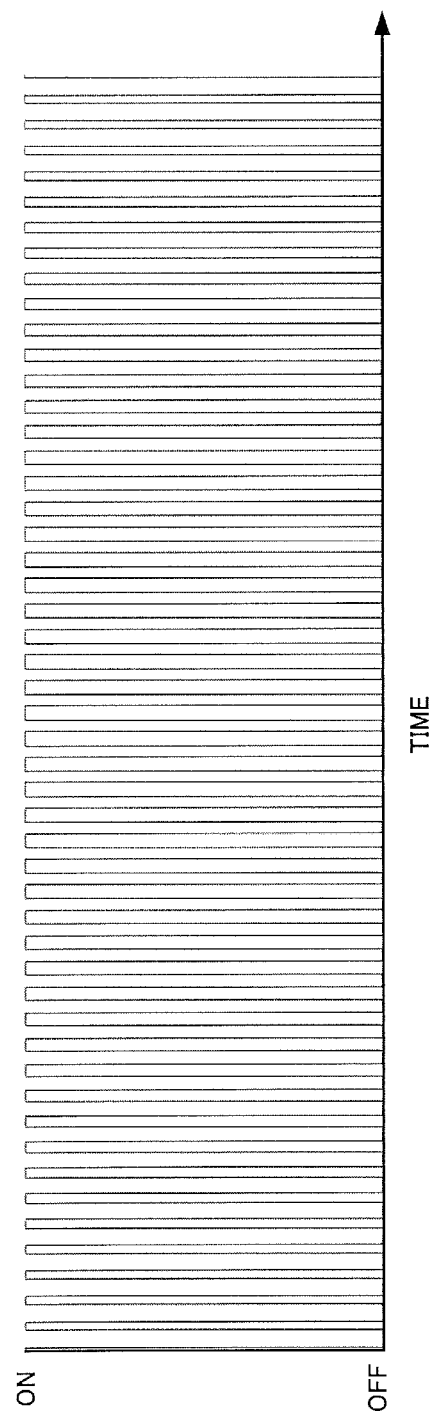
FIG. 19 is a diagram showing the waveform of the PWM control signal in the motor setting 1.

FIG. 19 is a diagram showing the waveform of the PWM control signal in the motor setting 1.

Figure 20:
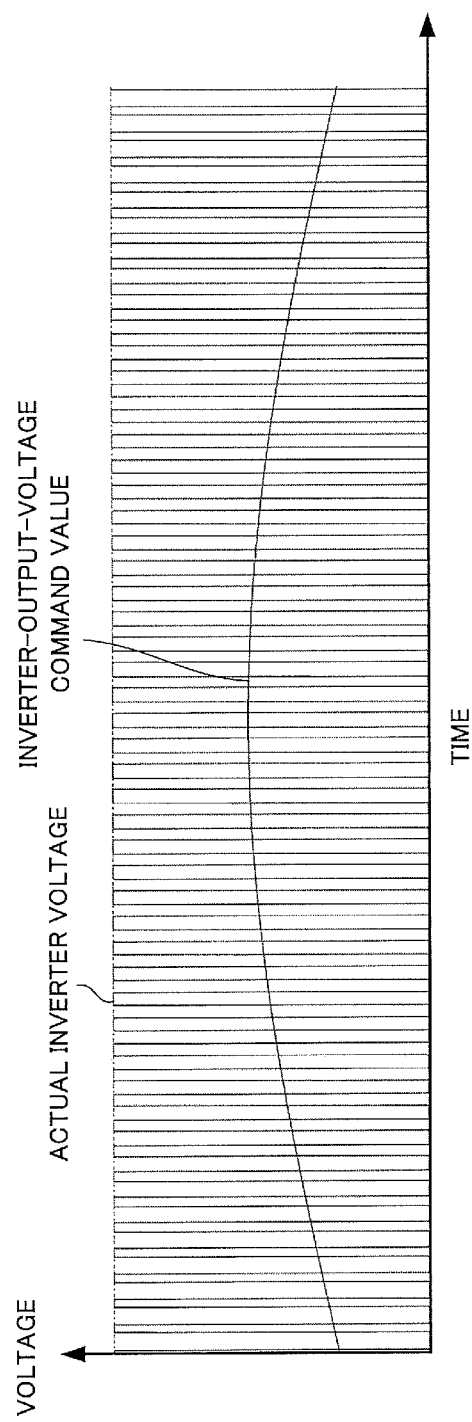
FIG. 20 is a diagram showing the inverter-output-voltage command value and actual inverter voltage in the motor setting 1.

FIG. 20 is a diagram showing the inverter-output-voltage command value and the actual inverter voltage in the motor setting 1.

Figure 21:
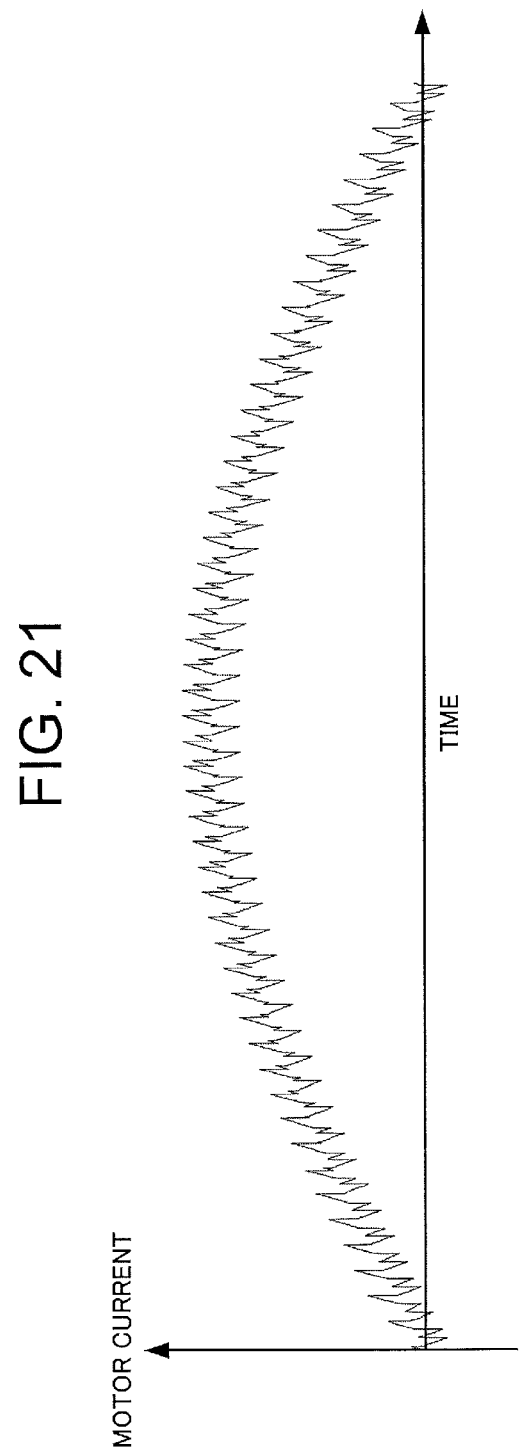
FIG. 21 is a diagram showing the waveform of the motor current in the motor setting 1.

FIG. 21 is a diagram showing the waveform of the motor current in the motor setting 1.

In the motor setting 1, the rotation rate of the motor 1 is 15 rps, the connection condition is the Y connection, the carrier frequency is 4500 Hz, and the voltage usage ratio is 57%.

Figure 22:
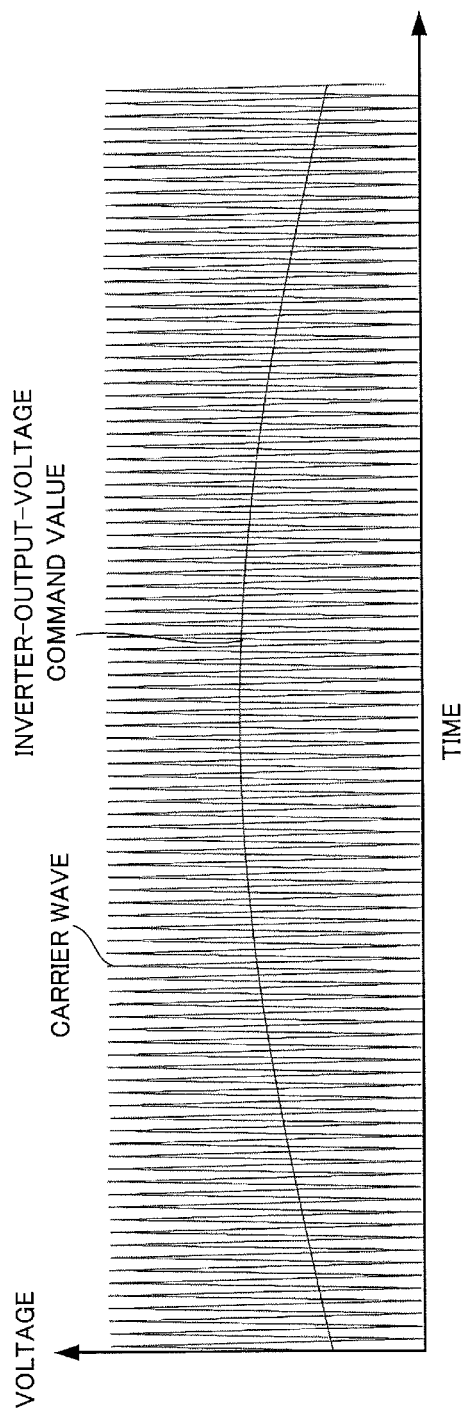
FIG. 22 is a diagram showing the carrier wave and the inverter-output-voltage command value in a motor setting 2.

FIG. 22 is a diagram showing the carrier wave and the inverter-output-voltage command value in a motor setting 2.

Figure 23:
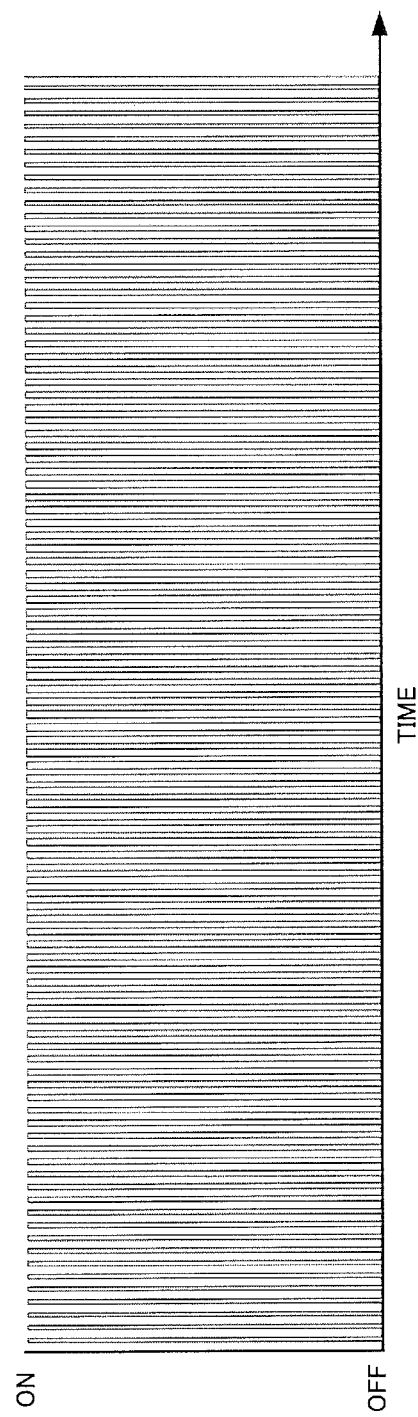
FIG. 23 is a diagram showing the waveform of the PWM control signal in the motor setting 2.

FIG. 23 is a diagram showing the waveform of the PWM control signal in the motor setting 2.

Figure 24:
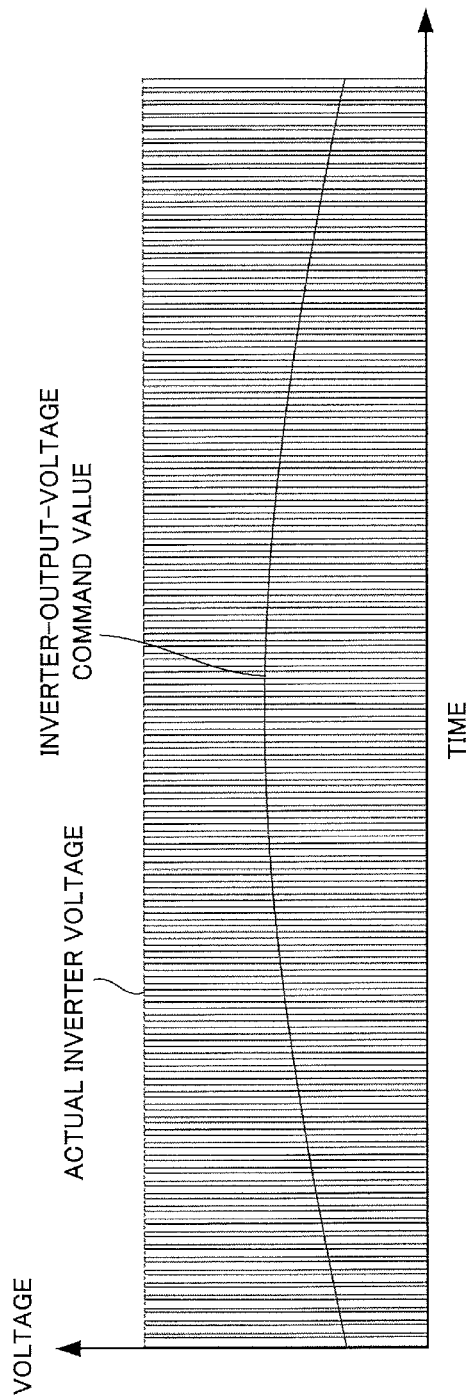
FIG. 24 is a diagram showing the inverter-output-voltage command value and the actual inverter voltage in the motor setting 2.

FIG. 24 is a diagram showing the inverter-output-voltage command value and the actual inverter voltage in the motor setting 2.

Figure 25:
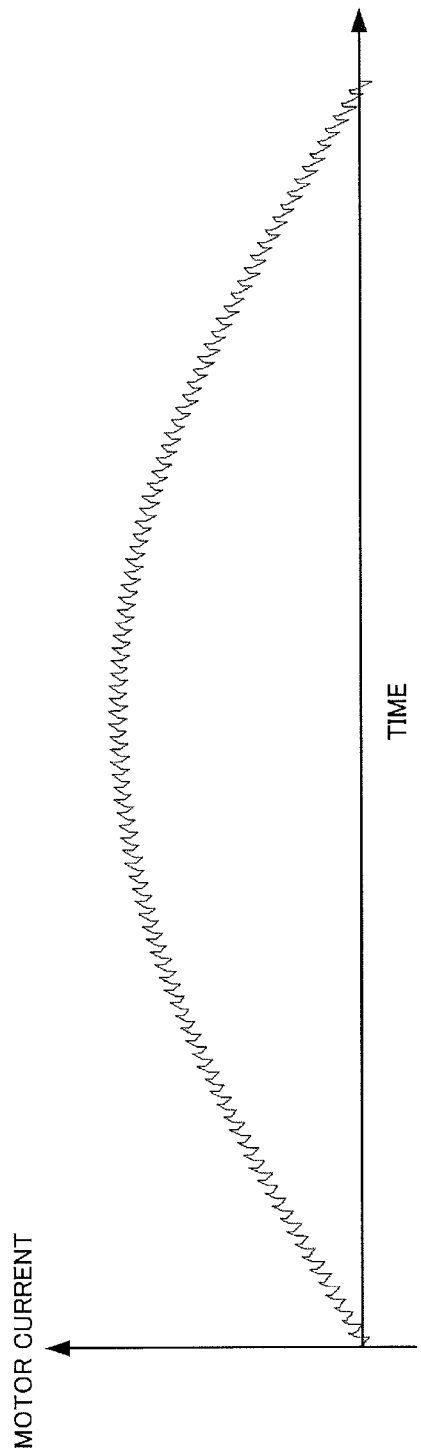
FIG. 25 is a diagram showing the waveform of the motor current in the motor setting 2.

FIG. 25 is a diagram showing the waveform of the motor current in the motor setting 2.

In the motor setting 2, the rotation rate of the motor 1 is 15 rps, the connection condition is the Y connection, the carrier frequency is 9000 Hz, and the voltage usage ratio is 57%.

As shown in FIG. 21, in the motor setting 1, the harmonic components of the motor current are high since the voltage usage ratio is low. In the motor setting 2, the carrier frequency is higher than that in the motor setting 1 while the voltage usage ratio is the same as that in the motor setting 1. As shown in FIG. 25, the harmonic components can be reduced by increasing the carrier frequency.

Figure 26:
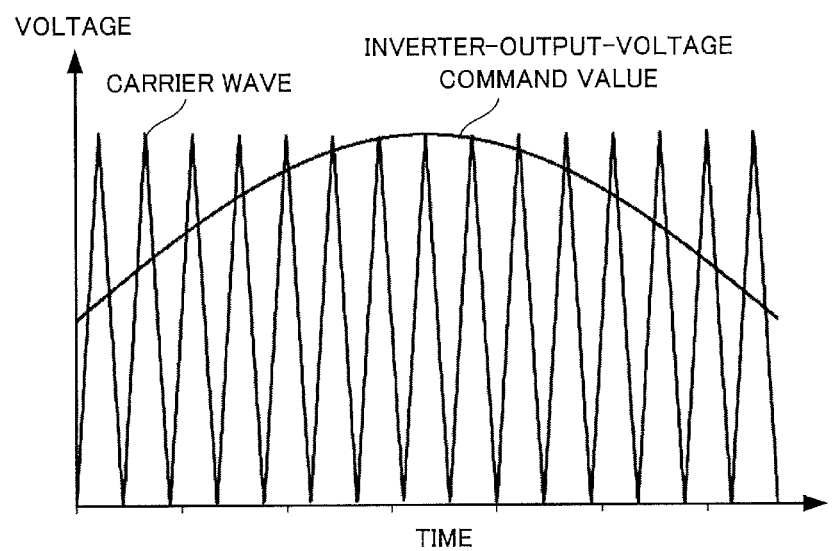
FIG. 26 is a diagram showing the carrier wave and the inverter-output-voltage command value in a motor setting 3.

FIG. 26 is a diagram showing the carrier wave and the inverter-output-voltage command value in a motor setting 3.

Figure 27:
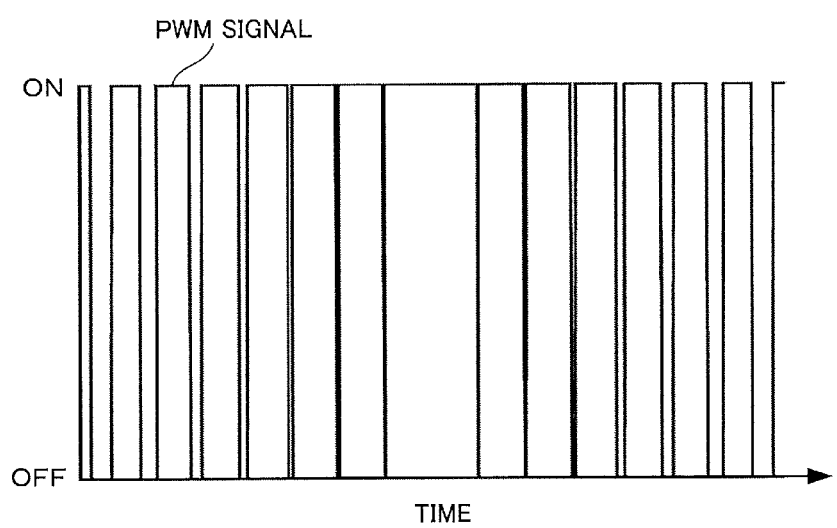
FIG. 27 is a diagram showing the waveform of the PWM control signal in the motor setting 3.

FIG. 27 is a diagram showing the waveform of the PWM control signal in the motor setting 3.

Figure 28:
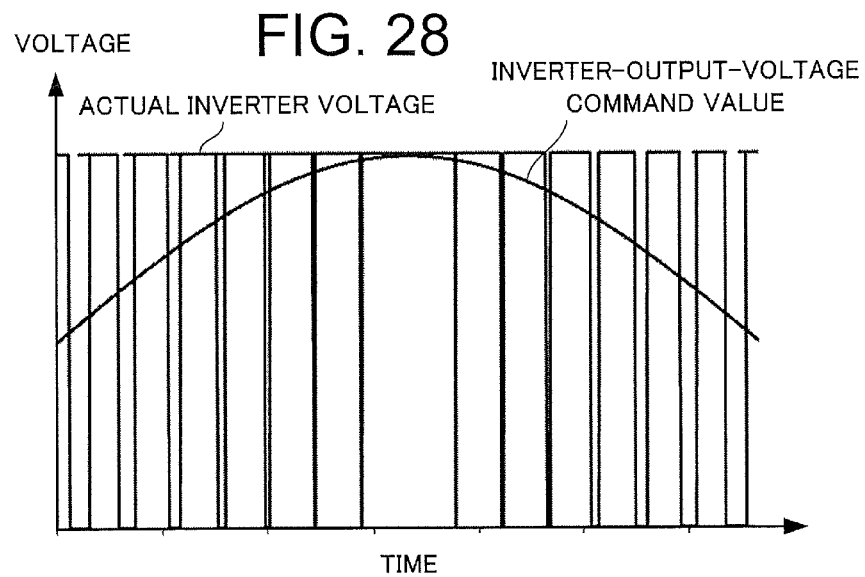
FIG. 28 is a diagram showing the inverter-output-voltage command value and the actual inverter voltage in the motor setting 3.

FIG. 28 is a diagram showing the inverter-output-voltage command value and the actual inverter voltage in the motor setting 3.

Figure 29:
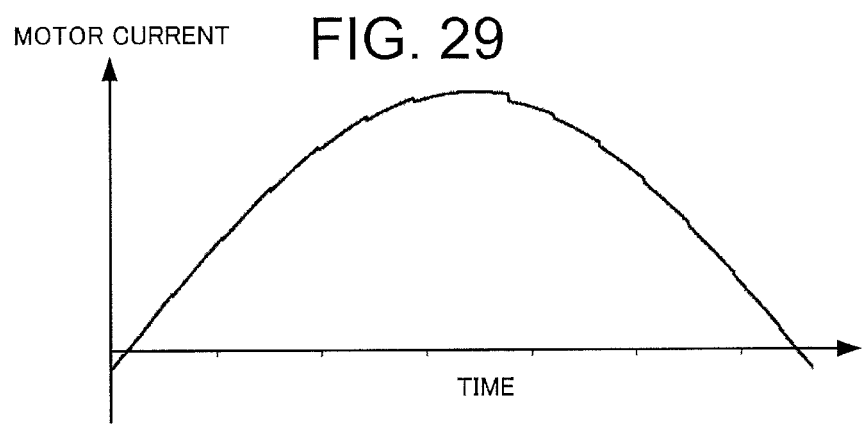
FIG. 29 is a diagram showing the waveform of the motor current in the motor setting 3.

FIG. 29 is a diagram showing the waveform of the motor current in the motor setting 3.

In the motor setting 3, the rotation rate of the motor 1 is 50 rps, the connection condition is the delta connection, the carrier frequency is 4500 Hz, and the voltage usage ratio is 98%.

In the motor setting 3, the connection condition is the delta connection and the motor 1 is in high speed rotation. Thus, with the high voltage usage ratio, the harmonic components of the motor current can be reduced.

The carrier frequency f1 may be set at values in multiple stages. In this case, the control device 50 switches the carrier frequency f1 stepwise. Specifically, the control device 50 controls the inverter 103 so that the carrier frequency f1 is switched stepwise. For example, the control device 50 switches the carrier frequency f1 according to the rotation rate of the motor 1. In other words, the control device 50 controls the inverter 103 so that the carrier frequency f1 is switched stepwise according to the rotation rate of the motor 1.

Similarly, the carrier frequency f2 may be set at values in multiple stages. In this case, the control device 50 switches the carrier frequency f2 stepwise. Specifically, the control device 50 controls the inverter 103 so that the carrier frequency f2 is switched stepwise. For example, the control device 50 switches the carrier frequency f2 according to the rotation rate of the motor 1. In other words, the control device 50 controls the inverter 103 so that the carrier frequency f2 is switched stepwise according to the rotation rate of the motor 1.

Since the carrier frequency optimizing the efficiency of the motor 1 varies depending on the voltage usage ratio changing in conjunction with the operation load, the carrier frequency may be set so that the efficiency is optimized for voltage usage ratios designed corresponding to the connection conditions of the coil 3.

Figure 30:
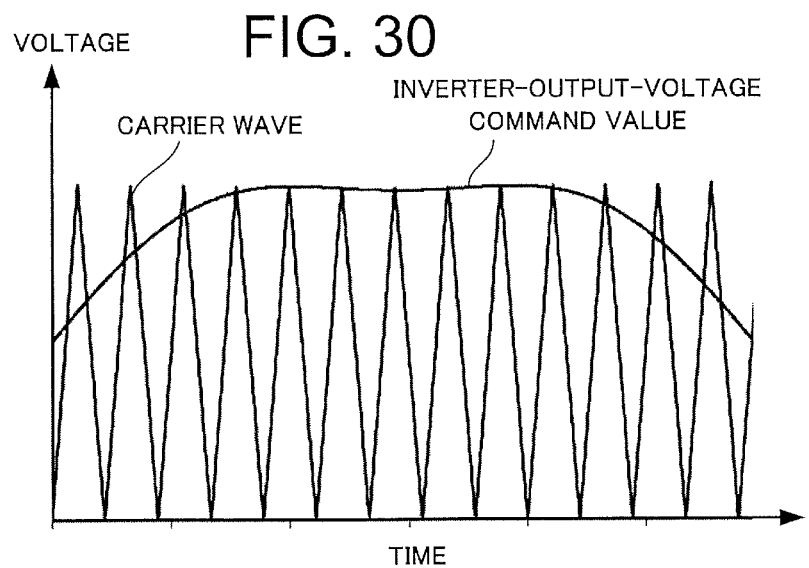
FIG. 30 is a diagram showing the carrier wave and the inverter-output-voltage command value in a motor setting 4.

FIG. 30 is a diagram showing the carrier wave and the inverter-output-voltage command value in a motor setting 4.

Figure 31:
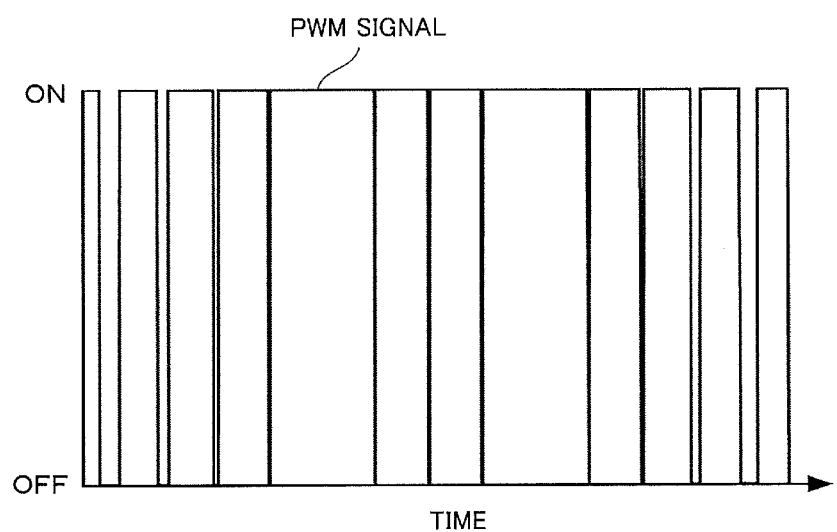
FIG. 31 is a diagram showing the waveform of the PWM control signal in the motor setting 4.

FIG. 31 is a diagram showing the waveform of the PWM control signal in the motor setting 4.

Figure 32:
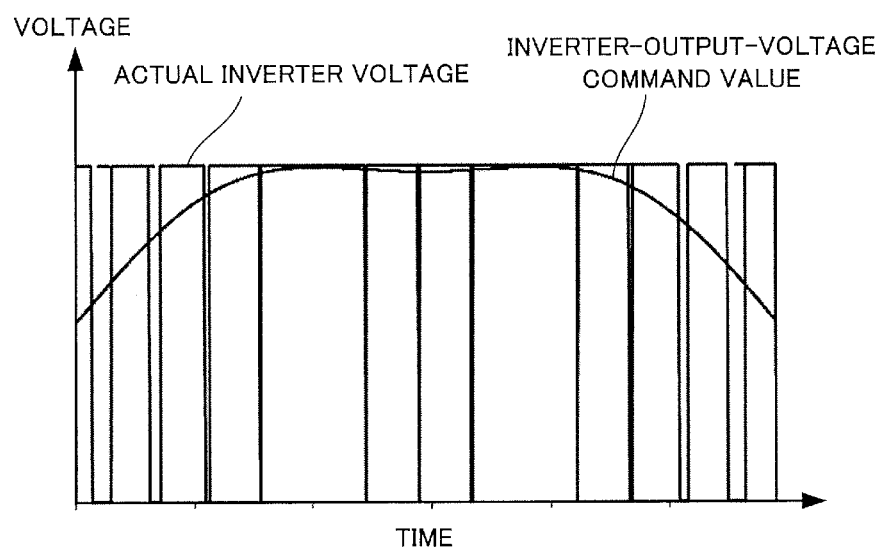
FIG. 32 is a diagram showing the inverter-output-voltage command value and the actual inverter voltage in the motor setting 4.

FIG. 32 is a diagram showing the inverter-output-voltage command value and the actual inverter voltage in the motor setting 4.

Figure 33:
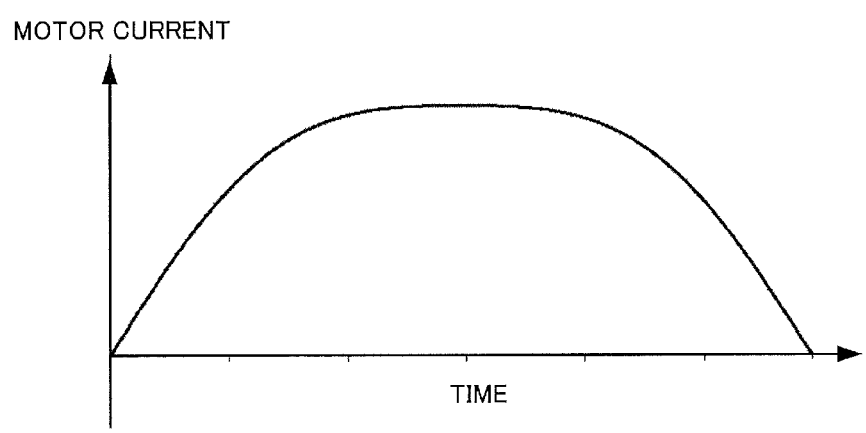
FIG. 33 is a diagram showing the waveform of the motor current in the motor setting 4.

FIG. 33 is a diagram showing the waveform of the motor current in the motor setting 4.

In the motor setting 4, the rotation rate of the motor 1 is 55 rps, the connection condition is the delta connection, the carrier frequency is 4500 Hz, and the voltage usage ratio is 106%.

As shown in FIG. 30 to FIG. 33, after the connection condition of the coil 3 is switched from the Y connection to the delta connection, the control device 50 may control the driving of the motor 1 by means of field-weakening control (motor setting 4). While the field-weakening control is in operation, the voltage usage ratio exceeds 100% since the induced voltage is saturated with respect to the bus voltage. Thus, with the high voltage usage ratio, the harmonic components of the motor current and the harmonic iron loss caused by the harmonic components can be restrained. In the delta connection, the carrier frequency optimizing the efficiency shifts to the low frequency side.

Therefore, when the motor 1 is controlled by the field-weakening control, the control device 50 is desired to set the carrier frequency f2 to be lower than the carrier frequency f2 before the field-weakening control is started. With this method, the harmonic iron loss and the switching loss can be reduced and the efficiency of the motor 1 can be increased. However, if the voltage usage ratio increases over 100%, the fundamental wave component of the inverter voltage increases and that causes an increase in copper loss. Accordingly, it is desirable to drive the motor 1 so that the voltage usage ratio reaches approximately 100%. Thus, it is also possible to boost the bus voltage so that the voltage usage ratio reaches 100%.

SiC (silicon carbide) elements or GaN (gallium nitride) elements may be used as the switching elements of the inverter 103. The system is configured so that the harmonic iron loss is reduced and the switching loss is dominant in the delta connection. Since the switching loss can be reduced by using SiC elements or GaN elements having low-loss characteristics as the switching elements of the inverter 103, a great effect of improving the efficiency of the motor 1 is achieved especially in the delta connection.

(Operation of Air Conditioner)

Figure 34:
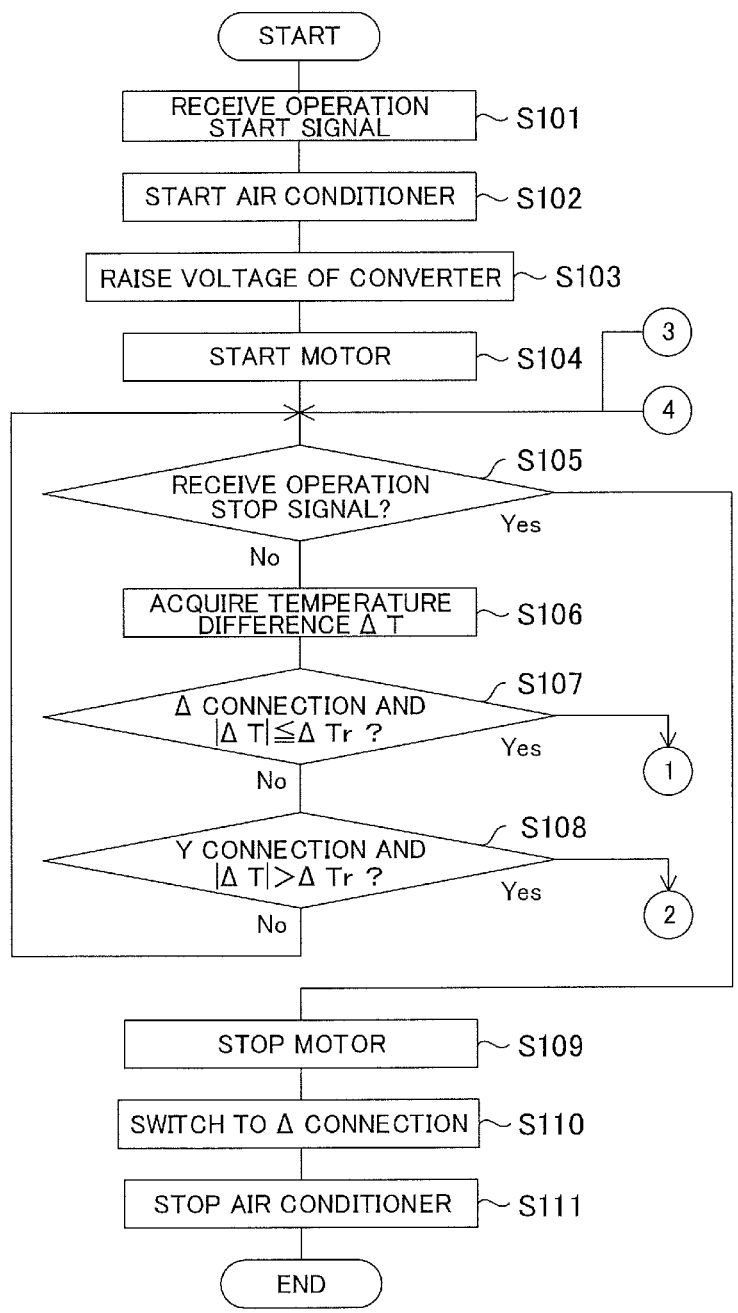
FIG. 34 is a flowchart showing the basic operation of the air conditioner according to the embodiment.
Figure 35:
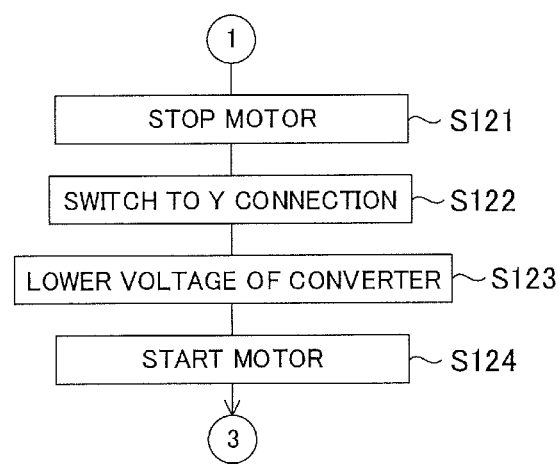
FIG. 35 is a flowchart showing a connection switching operation of the air conditioner according to the embodiment.
Figure 36:
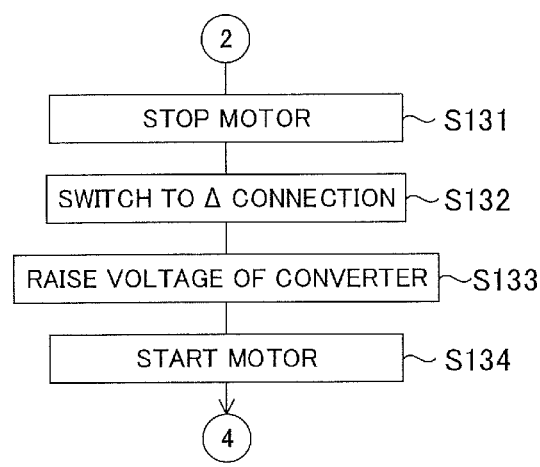
FIG. 36 is a flowchart showing a connection switching operation of the air conditioner according to the embodiment.

FIGS. 34 to 36 are flowcharts showing the basic operation of the air conditioner 5. The control device 50 of the air conditioner 5 starts the operation in response to reception of a start signal from the remote control 55 by the signal reception unit 56 (step S101). In this example, the CPU 57 of the control device 50 starts up. At the start of the operation (at startup), the connection condition of the coil 3 is the delta connection since the air conditioner 5 has switched the connection condition of the coil 3 to the delta connection at the end of the previous operation as will be described later.

Subsequently, the control device 50 performs a start process of the air conditioner 5 (step S102). Specifically, fan motors of the indoor fan 47 and the outdoor fan 46 are driven, for example.

Subsequently, the control device 50 outputs the voltage switching signal to the converter 102 and thereby raises the bus voltage of the converter 102 to a bus voltage corresponding to the delta connection (e.g., 390 V) (step S103). The bus voltage of the converter 102 is the maximum voltage applied from the inverter 103 to the motor 1.

Subsequently, the control device 50 starts the motor 1 (step S104). Accordingly, the motor 1 is started while the connection condition of the coil 3 is the delta connection. Further, the control device 50 controls the rotation rate of the motor 1 by controlling the output voltage of the inverter 103.

Specifically, the control device 50 raises the rotation rate of the motor 1 stepwise at a predetermined speed according to the temperature difference ΔT. The allowable maximum rotation rate of the rotation speed of the motor 1 is 130 rps, for example. By this control, the volume of refrigerant circulation by the compressor 41 is increased, cooling capacity is raised in the case of the cooling operation, and heating capacity is raised in the case of the heating operation.

Further, when the indoor temperature Ta approaches the set temperature Ts due to the air conditioning effect and the temperature difference ΔT shows a tendency to decrease, the control device 50 decreases the rotation rate of the motor 1 depending on the temperature difference ΔT. When the temperature difference ΔT decreases to a predetermined near-zero temperature (greater than 0), the control device 50 operates the motor 1 at an allowable minimum rotation rate (e.g., 20 rps).

When the indoor temperature Ta reaches the set temperature Ts (namely, when the temperature difference ΔT decreases to 0 or less), the control device 50 stops the rotation of the motor 1 to avoid excessive cooling (or excessive heating). Accordingly, the compressor 41 shifts to a stop state. Thereafter, when the temperature difference ΔT is greater than 0 again, the control device 50 restarts the rotation of the motor 1. Incidentally, the control device 50 regulates the restart of the rotation of the motor 1 in a short time so as not to repeat the rotation and stop of the motor 1 in a short time.

When the rotation rate of the motor 1 reaches a preset rotation rate, the inverter 103 starts the field-weakening control. The field-weakening control will be described later with reference to FIGS. 39 to 54.

The control device 50 determines whether or not an operation stop signal (operation stop signal of the air conditioner 5) is received from the remote control 55 via the signal reception unit 56 (step S105). When no operation stop signal is received, the control device 50 advances to step S106. In contrast, when the operation stop signal is received, the control device 50 advances to step S109.

The control device 50 acquires the temperature difference ΔT between the indoor temperature Ta detected by the indoor temperature sensor 54 and the set temperature Ts set through the remote control 55 (step S106) and determines whether the switching of the coil 3 from the delta connection to the Y connection is necessary or not based on the temperature difference ΔT. Specifically, the control device 50 determines whether or not the connection condition of the coil 3 is the delta connection and the absolute value of the aforementioned temperature difference ΔT is less than or equal to a threshold value ΔTr (step S107). The threshold value ΔTr is a temperature difference corresponding to an air conditioning load (also referred to simply as a "load") that is low to the extent that the switching to the Y connection is possible.

Since ΔT is represented as ΔT=Ts−Ta when the operation mode is the heating operation and represented as ΔT=Ta−Ts when the operation mode is the cooling operation as mentioned earlier, the determination on whether the switching to the Y connection is necessary or not is made in this example by comparing the absolute value of ΔT with the threshold value ΔTr.

When the connection condition of the coil 3 is the delta connection and the absolute value of the temperature difference ΔT is less than or equal to the threshold value ΔTr as the result of the comparison in the step S107, the process advances to step S121 (FIG. 35).

As shown in FIG. 35, in the step S121, the control device 50 stops the rotation of the motor 1 by outputting a stop signal to the inverter 103. Thereafter, the control device 50 switches the connection condition of the coil 3 from the delta connection to the Y connection by outputting the connection switching signal to the connection switching unit 60 (step S122). Subsequently, the control device 50 lowers the bus voltage of the converter 102 to a voltage corresponding to the Y connection (280 V) by outputting the voltage switching signal to the converter 102 (step S123) and restarts the rotation of the motor 1 (step S124). Thereafter, the process returns to the aforementioned step S105 (FIG. 34).

When the connection condition of the coil 3 is not the delta connection (when the connection condition is the Y connection) or the absolute value of the temperature difference ΔT is larger than the threshold value ΔTr as the result of the comparison in the step S107 (namely, when the switching to the Y connection is unnecessary), the process advances to step S108.

In the step S108, the control device 50 determines whether the switching from the Y connection to the delta connection is necessary or not. Specifically, the control device 50 determines whether or not the connection condition of the coil 3 is the Y connection and the absolute value of the aforementioned temperature difference ΔT is larger than the threshold value ΔTr.

When the connection condition of the coil 3 is the Y connection and the absolute value of the temperature difference ΔT is larger than the threshold value ΔTr as the result of the comparison in the step S108, the process advances to step S131 (FIG. 36).

As shown in FIG. 36, in the step S131, the control device 50 stops the rotation of the motor 1. Thereafter, the control device 50 switches the connection condition of the coil 3 from the Y connection to the delta connection by outputting the connection switching signal to the connection switching unit 60 (step S132). Subsequently, the control device 50 raises the bus voltage of the converter 102 to the voltage corresponding to the delta connection (390 V) by outputting the voltage switching signal to the converter 102 (step S133) and restarts the rotation of the motor 1 (step S134).

With the delta connection, the motor 1 can be driven to the higher rotation rate compared to the Y connection and that makes it possible to deal with higher loads. Accordingly, the temperature difference ΔT between the indoor temperature and the set temperature can be converged in a short time. Thereafter, the process returns to the aforementioned step S105 (FIG. 34).

When the connection condition of the coil 3 is not the Y connection (when the connection condition is the delta connection) or the absolute value of the temperature difference ΔT is less than or equal to the threshold value ΔTr as the result of the comparison in the step S108 (namely, when the switching to the delta connection is unnecessary), the process returns to the step S105.

When the operation stop signal is received in the aforementioned step S105, the rotation of the motor 1 is stopped (step S109). Thereafter, the control device 50 switches the connection condition of the coil 3 from the Y connection to the delta connection (step S110). When the connection condition of the coil 3 is already the delta connection, the connection condition is maintained. Incidentally, although not shown in FIG. 34, the process advances to the step S109 and the rotation of the motor 1 is stopped also when the operation stop signal is received in the steps S106 to S108.

Thereafter, the control device 50 performs a stop process of the air conditioner 5 (step S111). Specifically, the fan motors of the indoor fan 47 and the outdoor fan 46 are stopped. Thereafter, the CPU 57 of the control device 50 stops and the operation of the air conditioner 5 ends.

As above, the motor 1 is operated in the Y connection of high efficiency when the absolute value of the temperature difference ΔT between the indoor temperature Ta and the set temperature Ts is relatively small (namely, less than or equal to the threshold value ΔTr). When it is necessary to deal with a higher load, namely, when the absolute value of the temperature difference ΔT is larger than the threshold value ΔTr, the motor 1 is operated in the delta connection capable of dealing with higher loads. Accordingly, the operating efficiency of the air conditioner 5 can be increased.

Figure 37A:
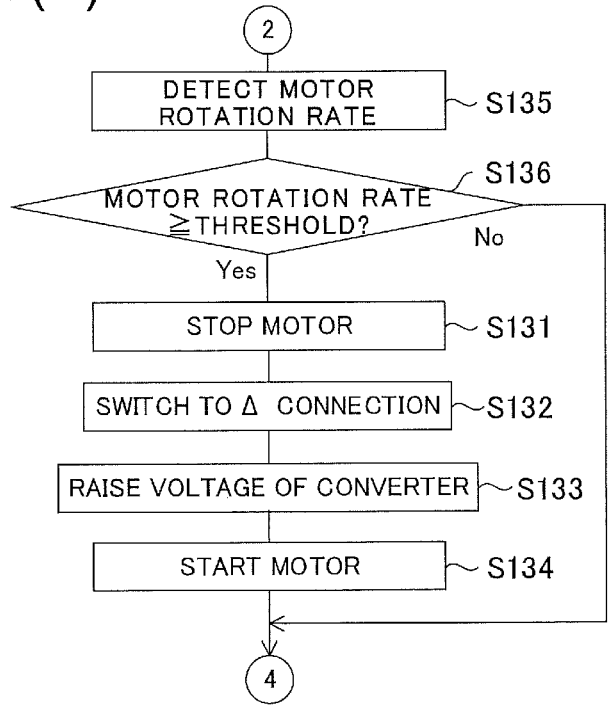
FIGS. 37(A) and 37(B) are flowcharts showing other examples of the connection switching operation of the air conditioner according to the embodiment.

Incidentally, in the switching operation from the Y connection to the delta connection (FIG. 36), it is also possible as shown in FIG. 37(A) to detect the rotation rate of the motor 1 (step S135) and determine whether or not the detected rotation rate is higher than or equal to a threshold value (reference value of the rotation rate) (step S136) before the step S131 of stopping the rotation of the motor 1. The rotation rate of the motor 1 is detected as the frequency of the output current of the inverter 103.

The threshold value for the rotation rate of the motor 1 used in the step S136 is 60 rps which is intermediate between 35 rps which is a rotation rate corresponding to a heating intermediate condition which will be described later and 85 rps which is a rotation rate corresponding to a heating rated condition which will be described later, for example. If the rotation rate of the motor 1 is higher than or equal to the threshold value, the rotation of the motor 1 is stopped, the switching to the delta connection is made, and the bus voltage of the converter 102 is raised (steps S131, S132 and S133). If the rotation rate of the motor 1 is less than the threshold value, the process returns to the step S105 in FIG. 34.

By making the connection switching necessity determination based on the rotation rate of the motor 1 as above in addition to the connection switching necessity determination based on the temperature difference ΔT (step S108), frequent repetition of the connection switching can be reliably inhibited.

Figure 37B:
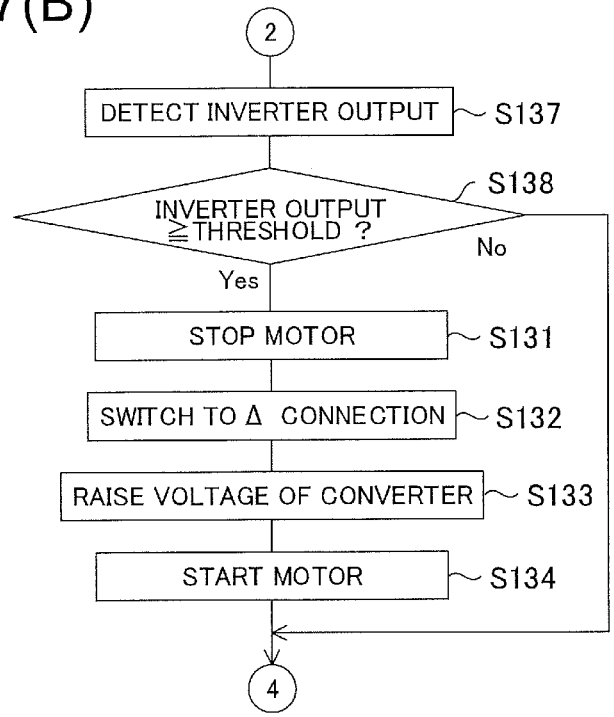

It is also possible as shown in FIG. 37(B) to detect the output voltage of the inverter 103 (step S137) and determine whether or not the detected output voltage is higher than or equal to a threshold value (reference value of the output voltage) (step S138) before the step S131 of stopping the rotation of the motor 1.

While the switching operations from the Y connection to the delta connection are shown in FIGS. 37(A) and 37(B), it is also possible to make a determination based on the rotation rate of the motor 1 or the output voltage of the inverter 103 at the time of switching from the delta connection to the Y connection.

Figure 38:
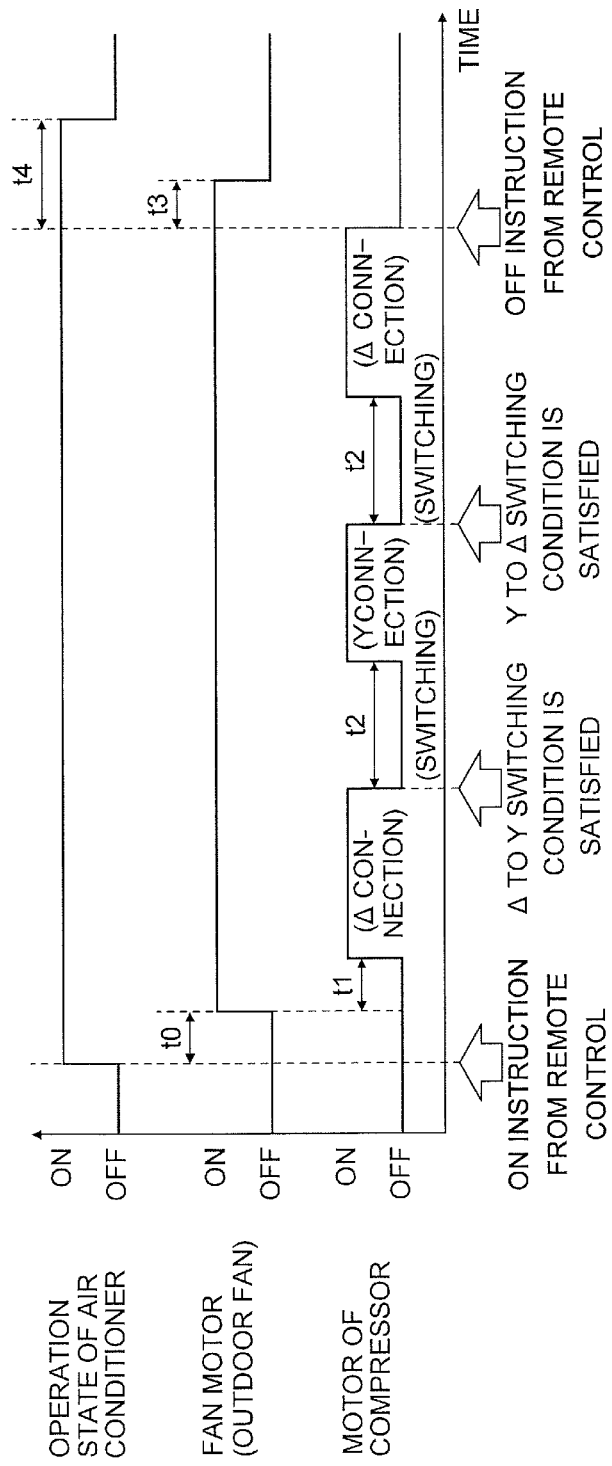
FIG. 38 is a timing chart showing an example of the operation of the air conditioner according to the embodiment.

FIG. 38 is a timing chart showing an example of the operation of the air conditioner 5. FIG. 38 shows operation state of the air conditioner 5 and drive status of the outdoor fan 46 and the motor 1 (compressor 41). The outdoor fan 46 is shown as an example of a component of the air conditioner 5 other than the motor 1.

When the signal reception unit 56 receives an operation start signal (ON command) from the remote control 55, the CPU 57 starts up and the air conditioner 5 shifts to an active state (ON state). When the air conditioner 5 shifts to the active state, the fan motor of the outdoor fan 46 starts rotating after the elapse of a time t0. The time t0 is a delay time due to the communication between the indoor unit 5A and the outdoor unit 5B.

After the startup of the air conditioner 5, the rotation of the motor 1 with the delta connection is started after the elapse of a time t1. The time t1 is a waiting time until the rotation of the fan motor of the outdoor fan 46 stabilizes. By rotating the outdoor fan 46 before starting the rotation of the motor 1, an excessive rise in the temperature of the refrigeration cycle is prevented.

In the example of FIG. 38, the switching from the delta connection to the Y connection is made, the switching from the Y connection to the delta connection is also made, and then the operation stop signal (OFF command) is received from the remote control 55. The time t2 necessary for the connection switching, as a waiting time necessary for the restart of the motor 1, is set at a time necessary until the refrigerant pressure in the refrigeration cycle becomes approximately uniform.

When the operation stop signal is received from the remote control 55, the rotation of the motor 1 stops, and then the rotation of the fan motor of the outdoor fan 46 stops after the elapse of a time t3. The time t3 is a waiting time necessary for sufficiently lowering the temperature of the refrigeration cycle. After the elapse of a time t4, the CPU 57 stops and the air conditioner 5 shifts to an operation stop state (OFF state). The time t4 is a preset waiting time.

(About Connection Switching Based on Temperature Detection)

In the above-described operation of the air conditioner 5, it is also possible to make the determination on the necessity of switching the connection condition of the coil 3 (steps S107 and S108) based on the rotation speed of the motor 1 or the inverter output voltage, for example. However, the rotation speed of the motor 1 can vary in a short time, and thus it is necessary to determine whether a state in which the rotation speed is lower than or equal to a threshold value (or higher than or equal to a threshold value) continues for a certain time or not. The same goes for the inverter output voltage.

Especially, when the set temperature set by using the remote control 55 is greatly changed or the load on the air conditioner 5 sharply changes because of opening a window of the room or the like, taking a long time for the determination on the necessity of switching the connection condition of the coil 3 leads to a delay in a response of the operation state of the compressor 41 to the load fluctuation. As a result, comfortability brought by the air conditioner 5 can deteriorate.

With regard to this, in this embodiment, the temperature difference ΔT (absolute value) between the indoor temperature Ta detected by the indoor temperature sensor 54 and the set temperature Ts is compared with the threshold value. Since fluctuation of temperature in a short time is small, it is not necessary to continue the detection of the temperature difference ΔT and the comparison with the threshold value, and thus the connection switching necessity determination can be made in a short time. Accordingly, it is possible to make the operation state of the compressor 41 quickly correspond to the load fluctuation and thereby increase the comfortability brought by the air conditioner 5.

Incidentally, in the above-described operation of the air conditioner 5, the necessity determination on the switching from the delta connection to the Y connection (step S107) and the necessity determination on the switching from the Y connection to the delta connection (step S108) are made successively. However, switching from the delta connection to the Y connection is made only in the case where the air conditioning load is dropping (the indoor temperature is approaching the set temperature), there is a low possibility that the air conditioning load suddenly rises thereafter, and thus a situation in which the connection switching is frequently performed hardly occurs.

Further, in the above-described operation of the air conditioner 5, the switching of the connection condition of the coil 3 (steps S122 and S132) is made in the state in which the rotation of the motor 1 is stopped (namely, in the state in which the output of the inverter 103 is stopped). Although it is also possible to switch the connection condition of the coil 3 while continuing the supply of electric power to the motor 1, it is desirable to make the switching in the state in which the supply of electric power to the motor 1 is stopped, from the viewpoint of reliability of relay contacts constituting the switches 61, 62 and 63 (FIG. 6) of the connection switching unit 60.

Incidentally, it is also possible to make the switching of the connection condition of the coil 3 in a state in which the rotation rate of the motor 1 is sufficiently lowered and thereafter return the rotation rate to the original rotation rate.

While the switches 61, 62 and 63 of the connection switching unit 60 are formed with relay contacts in this example, it is not necessary to stop the rotation of the motor 1 at the time of switching the connection condition of the coil 3 in the case where the switches 61, 62 and 63 are composed of semiconductor switches.

It is also possible to switch the connection condition of the coil 3 when the state in which the temperature difference ΔT (absolute value) between the indoor temperature Ta and the set temperature Ts falls to or below the threshold value ΔTr is repeated multiple times (preset number of times). With such a method, a repetition of the connection switching due to small temperature changes can be inhibited.

Incidentally, while the control device 50 stops the rotation of the motor 1 to avoid excessive cooling (or excessive heating) when the temperature difference ΔT between the indoor temperature and the set temperature decreases to 0 or less (ΔT≤0) as mentioned earlier, it is also possible to switch the connection condition of the coil 3 from the delta connection to the Y connection at this timing. Specifically, it is possible to make a determination on whether or not the temperature difference ΔT is 0 or less in the aforementioned step S107 and stop the rotation of the motor 1 and switch the connection condition of the coil 3 to the Y connection when the temperature difference ΔT is 0 or less.

Further, in the above-described operation of the air conditioner 5, the bus voltage of the converter 102 is boosted at the time of the switching from the Y connection to the delta connection, by which higher torque can be generated by the motor 1. Accordingly, the difference ΔT between the indoor temperature and the set temperature can be converged in a shorter time. The boosting of the bus voltage of the converter 102 will be described later.

(About Connection Condition at Startup)

As described earlier, when the operation start signal is received and the motor 1 is started, the air conditioner 5 in this embodiment starts the control while setting the connection condition of the coil 3 to the delta connection. Further, at the time of stopping the operation of the air conditioner 5, the connection condition of the coil 3 is switched to the delta connection.

At the start of the operation of the air conditioner 5, it is difficult to precisely detect the air conditioning load. Especially, at the start of the operation of the air conditioner 5, it is common that the difference between the indoor temperature and the set temperature is large and the air conditioning load is high. Therefore, in this embodiment, the motor 1 is started in the state in which the connection condition of the coil 3 has been set to the delta connection capable of dealing with higher loads (i.e., capable of rotating the motor to higher rotation rates). By this method, the difference ΔT between the indoor temperature Ta and the set temperature Ts can be converged in a shorter time at the start of the operation of the air conditioner 5.

Further, even when the air conditioner 5 is stopped for a long period and an abnormality in the connection switching unit 60 (e.g., a relay in the switches 61 to 63 getting stuck and being incapable of operating) occurs during the stop, the motor 1 can be started in the delta connection since the switching from the Y connection to the delta connection has already been made before the stop of the operation of the air conditioner 5. Accordingly, deterioration in the capacity of the air conditioner 5 can be prevented and the comfortability is not impaired.

Incidentally, in the case where the motor 1 is started with the connection condition of the coil 3 set to the delta connection and no switching to the Y connection is made, motor efficiency equivalent to that of an ordinary type of motor in which the connection condition of the coil is invariably the delta connection (motor without the connection switching function) can be obtained.

(Motor Efficiency and Motor Torque)

Next, improvement of motor efficiency and motor torque will be described below. In general, air conditioners for household use are subject to regulations under energy-saving laws and are obliged to reduce $CO_2$ emission in terms of global environment. With the advancement of technology, compression efficiency of compressors, operating efficiency of motors of compressors, the heat transfer rate of heat exchangers, etc. have been improved, energy consumption efficiency COP (Coefficient Of Performance) of air conditioners has increased year by year, and running costs (power consumption) and $CO_2$ emission are decreasing.

The COP is an index evaluating the performance when an air conditioner is operated under a certain temperature condition, in which an operating condition of the air conditioner for each season is not taken into account. Nevertheless, capacity and power consumption necessary for cooling or heating vary in actual use of the air conditioner due to variations in outside air temperature. Thus, in order to make an evaluation in a condition close to the actual use, APF (Annual Performance Factor: year-round energy consumption efficiency), as efficiency obtained by specifying a certain model case and calculating a total load and a total electric energy consumption throughout a year, is currently used as an index of energy saving.

Especially in inverter motors that are currently mainstream, the capacity changes depending on the rotation rate of the compressor, and thus there is a problem in making the evaluation close to the actual use by use of rated conditions alone.

In the APF of air conditioners for household use, the electric energy consumption corresponding to the total load throughout a year is calculated at five evaluation points of cooling rated, cooling intermediate, heating rated, heating intermediate and heating low temperature. With the increase in this value, energy saving performance is evaluated to be higher.

As for the details of the total load throughout a year, the ratio of the heating intermediate condition is extremely high (50%), and the ratio of the heating rated condition is the second highest (25%). Accordingly, increasing the motor efficiency in the heating intermediate condition and in the heating rated condition is effective for improving the energy saving performance of air conditioners.

The rotation rate of a motor of a compressor in the APF evaluation load conditions varies depending on the capacity of the air conditioner and the performance of the heat exchanger. For example, in a home air conditioner having a refrigeration capacity of 6.3 kW, a rotation rate N1 in the heating intermediate condition (first rotation rate) is 35 rps and a rotation rate N2 in the heating rated condition (second rotation rate) is 85 rps.

The motor 1 in this embodiment aims to obtain high motor efficiency and high motor torque at the rotation rate N1 corresponding to the heating intermediate condition and at the rotation rate N2 corresponding to the heating rated condition. Specifically, in the two load conditions as targets of performance improvement, the rotation rate on the low-speed side is N1 and the rotation rate on the high-speed side is N2.

When the motor 1 including the permanent magnet 25 installed in the rotor 20 rotates, magnetic flux of the permanent magnet 25 links with the coil 3 of the stator 10 and induced voltage occurs in the coil 3. The induced voltage is proportional to the rotation rate (rotation speed) of the rotor 20 and is also proportional to the number of turns of the coil 3. The induced voltage increases with the increase in the rotation rate of the motor 1 and the number of turns of the coil 3.

The line voltage outputted from the inverter 103 (motor voltage) equals the sum of the aforementioned induced voltage and voltage caused by resistance and inductance of the coil 3. The line voltage is practically governed by the induced voltage since the resistance and the inductance of the coil 3 are negligibly low as compared with the induced voltage. Further, magnet torque of the motor 1 is proportional to the product of the induced voltage and the current flowing through the coil 3.

The induced voltage increases with the increase in the number of turns of the coil 3. Thus, with the increase in the number of turns of the coil 3, the current for generating necessary magnet torque is allowed to be lower. As a result, the loss caused by the energization of the inverter 103 can be reduced and the operating efficiency of the motor 1 can be increased. On the other hand, due to the increase in the induced voltage, the line voltage governed by the induced voltage reaches inverter maximum output voltage (i.e., the bus voltage supplied from the converter 102 to the inverter 103) at a lower rotation rate and the rotation rate cannot be increased over that rotation rate.

If the number of turns of the coil 3 is decreased, the induced voltage decreases, and thus the line voltage governed by the induced voltage does not reach the inverter maximum output voltage until a higher rotation rate and high speed rotation becomes possible. However, since a current for generating the necessary magnet torque increases due to the decrease in the induced voltage, the loss caused by the energization of the inverter 103 increases and the operating efficiency of the motor 1 decreases.

Further, from the viewpoint of the switching frequency of the inverter 103, a harmonic component caused by an ON/OFF duty of switching of the inverter 103 decreases as the line voltage is closer to the inverter maximum output voltage, and thus the iron loss caused by the harmonic components of the current can be reduced.

Figure 39:
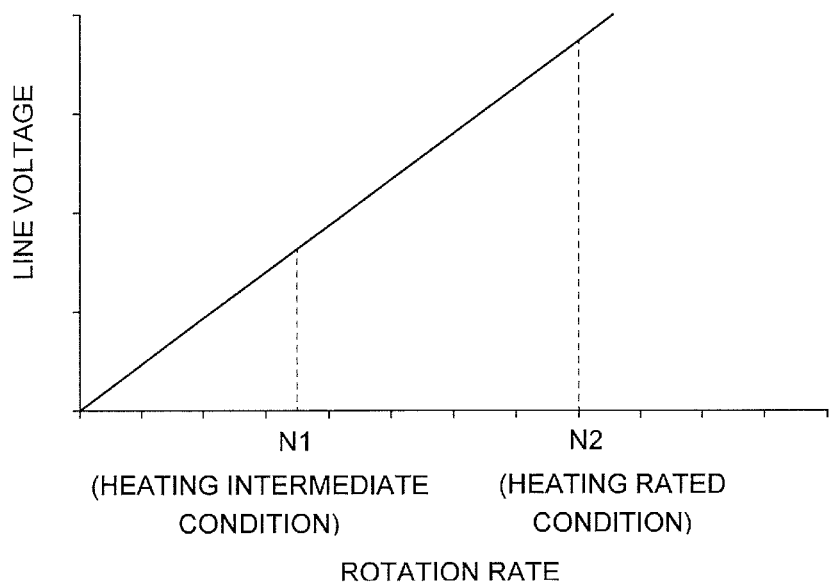
FIG. 39 is a graph showing the relationship between line voltage and the rotation rate when the coil in the motor is connected in the Y connection.
Figure 40:
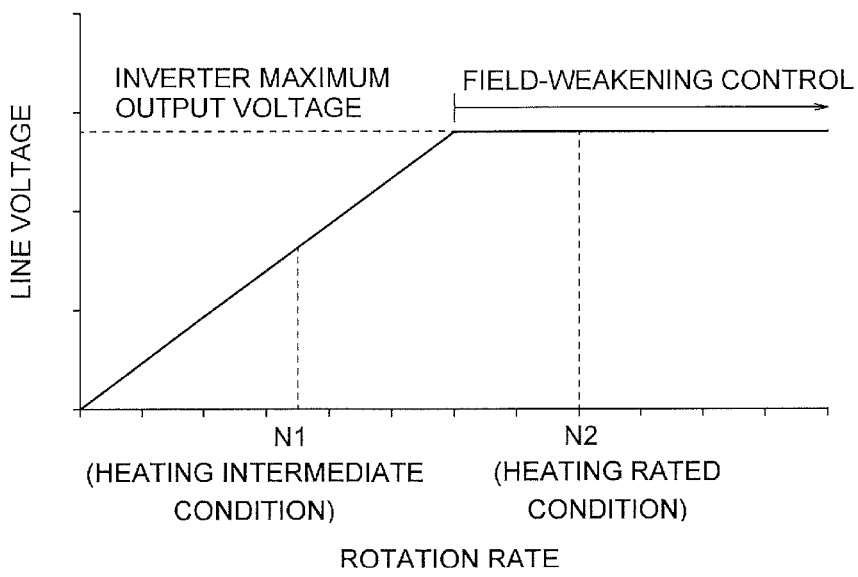
FIG. 40 is a graph showing the relationship between the line voltage and the rotation rate when the coil in the motor is connected in the Y connection and field-weakening control is performed.

FIG. 39 and FIG. 40 are graphs showing the relationship between the line voltage and the rotation rate of the motor 1. The connection condition of the coil 3 is assumed to be the Y connection. The line voltage is proportional to the product of the field-magnet magnetic field and the rotation rate. If the field-magnet magnetic field is constant, the line voltage is proportional to the rotation rate as shown in FIG. 39. Incidentally, in FIG. 39, the rotation rate N1 corresponds to the heating intermediate condition and the rotation rate N2 corresponds to the heating rated condition.

While the line voltage also increases with the increase in the rotation rate, the field-weakening control by the inverter 103 is started as shown in FIG. 40 when the line voltage reaches the inverter maximum output voltage since the line voltage cannot be increased over the inverter maximum output voltage. Here, it is assumed that the field-weakening control is started at a rotation rate between the rotation rates N1 and N2.

In the field-weakening control, the induced voltage is weakened by feeding current in a d-axis phase (in a direction of canceling the magnetic flux of the permanent magnet 25) through the coil 3. This current is referred to as weakening current. Since it is necessary to feed the weakening current in addition to the current for generating the normal motor torque, the copper loss caused by the resistance of the coil 3 increases and the energization loss of the inverter 103 also increases.

Figure 41:
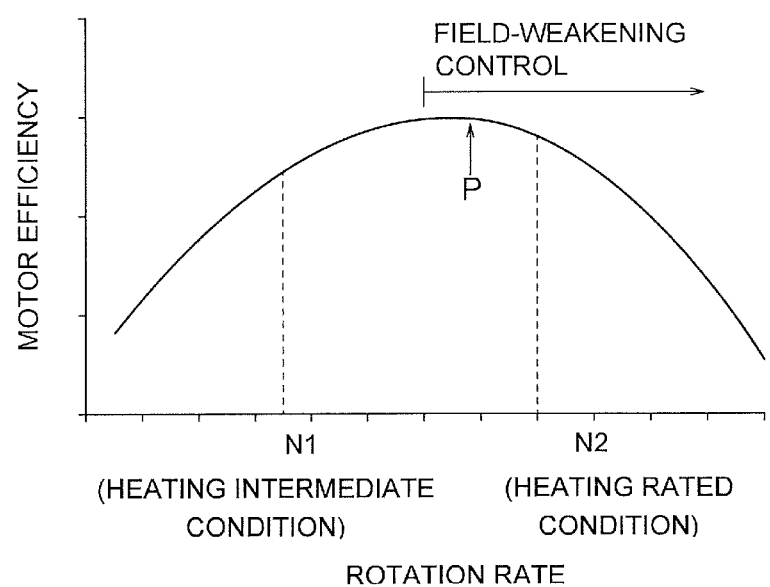
FIG. 41 is a graph showing the relationship between the motor efficiency and the rotation rate when the field-weakening control shown in FIG. 40 is performed.

FIG. 41 is a graph showing the relationship between the motor efficiency and the rotation rate when the field-weakening control shown in FIG. 40 is performed. As shown in FIG. 41, the motor efficiency increases together with the rotation rate and reaches a peak immediately after the start of the field-weakening control as indicated by the arrow P.

As the rotation rate increases further, the weakening current fed through the coil 3 also increases, and thus the copper loss caused by the weakening current increases and the motor efficiency decreases. Incidentally, overall efficiency as the product of the motor efficiency and the inverter efficiency also shows a change represented by a curved line similar to that in FIG. 41.

Figure 42:
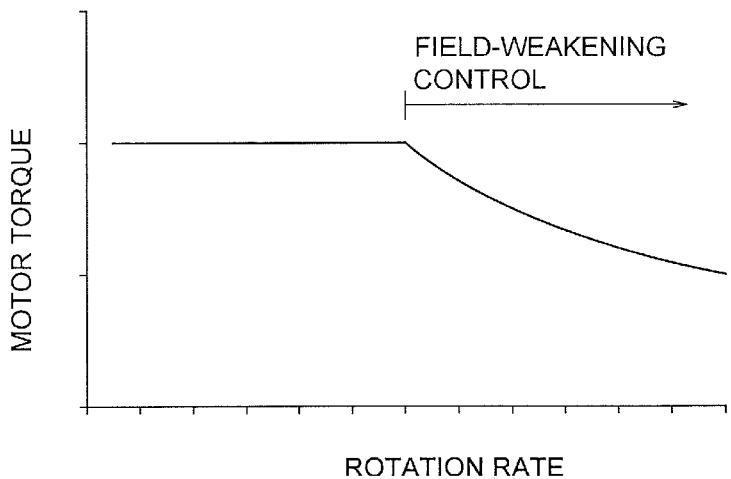
FIG. 42 is a graph showing the relationship between motor torque and the rotation rate when the field-weakening control shown in FIG. 40 is performed.

FIG. 42 is a graph showing the relationship between the maximum torque and the rotation rate of the motor when the field-weakening control shown in FIG. 40 is performed.

Before the field-weakening control is started, the maximum torque of the motor is constant (due to restriction by a current threshold value, for example). When the field-weakening control is started, the maximum torque of the motor 1 decreases with the increase in the rotation rate. The maximum torque of the motor 1 has been set to be higher than the load (necessary load) actually generated by the motor 1 when the product is used. The maximum torque of the motor will hereinafter be referred to as motor torque for convenience of explanation.

Figure 43:
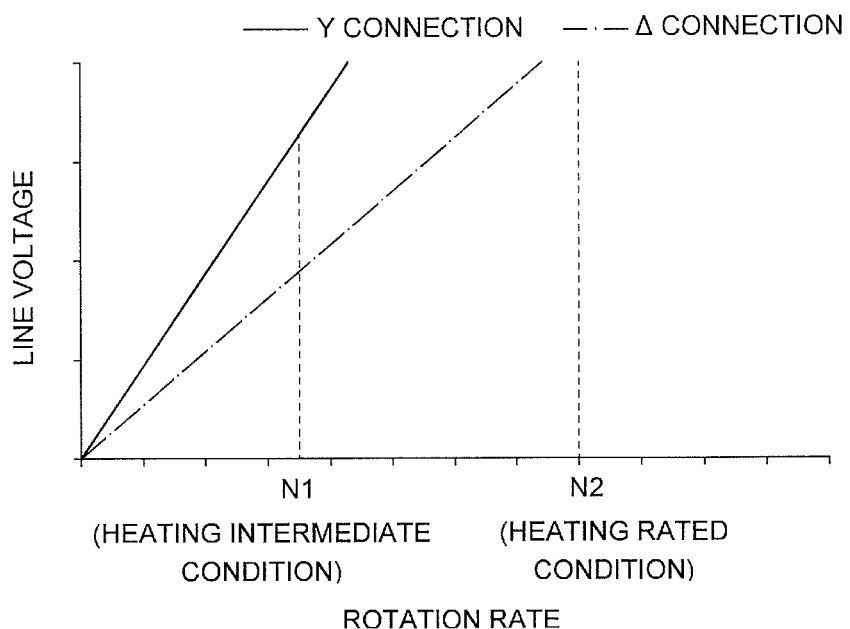
FIG. 43 is a graph showing the relationship between the line voltage and the rotation rate in each of the case where the connection condition of the coil is set to the Y connection and the case where the connection condition is set to the delta connection.

FIG. 43 is a graph showing the relationship between the line voltage and the rotation rate in regard to each of the Y connection and the delta connection. Phase impedance of the coil 3 when the connection condition of the coil 3 is the delta connection is $1/\sqrt{3}$ times that when the connection condition of the coil 3 is the Y connection assuming that the number of turns is the same. Accordingly, the line voltage when the connection condition of the coil 3 is the delta connection (chain line) is $1/\sqrt{3}$ times that when the connection condition of the coil 3 is the Y connection (solid line) assuming that the rotation rate is the same.

Thus, when the coil 3 is connected in the delta connection, if the number of turns is set at $\sqrt{3}$ times that in the case of the Y connection, the line voltage (motor voltage) becomes equivalent to that in the case of the Y connection for the same rotation rate N, and accordingly, the output current of the inverter 103 also becomes equivalent to that in the case of the Y connection.

In motors in which the number of turns of a coil around a tooth is some tens of turns or more, the Y connection is often employed rather than the delta connection for the following reasons: First, since the delta connection has a greater number of turns of the coil compared to the Y connection, it takes a long time for winding the coil in the manufacturing process. Second, in the case of the delta connection, there is a possibility of occurrence of circulating current.

In general, in motors employing the Y connection, the number of turns of a coil is adjusted so that the line voltage (motor voltage) reaches the inverter maximum output voltage at the rotation rate N2 (i.e., the rotation rate on the high-speed side in the rotation rates as targets of performance improvement). In this case, however, at the rotation rate N1 (i.e., the rotation rate on the low-speed side in the rotation rates as targets of performance improvement), the motor is operated in a state in which the line voltage is lower than the inverter maximum output voltage and it is difficult to obtain high motor efficiency.

Therefore, specific control is being performed in which the connection condition of the coil is set to the Y connection, the number of turns is adjusted so that the line voltage reaches the inverter maximum output voltage at a rotation rate slightly lower than the rotation rate N1, and the connection condition of the coil is switched to the delta connection before the rotation rate reaches the rotation rate N2.

Figure 44:
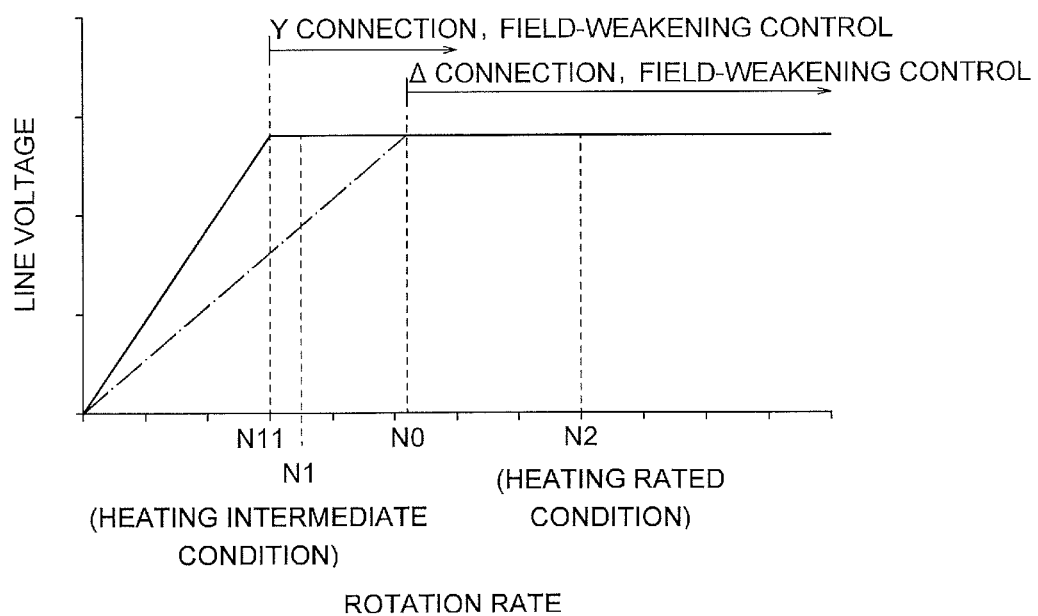
FIG. 44 is a graph showing the relationship between the line voltage and the rotation rate when the switching from the Y connection to the delta connection is made.

FIG. 44 is a graph showing the relationship between the line voltage and the rotation rate when the switching from the Y connection to the delta connection is made. In the example shown in FIG. 44, the aforementioned field-weakening control is started when the rotation rate reaches a rotation rate (referred to as a rotation rate N11) slightly lower than the rotation rate N1 (heating intermediate condition). When the rotation rate N increases further and reaches a rotation rate N0, the switching from the Y connection to the delta connection is made. In this example, the rotation rate N11 is a rotation rate that is 5% lower than the rotation rate N1 (namely, N11=N1×0.95).

Since the switching to the delta connection lowers the line voltage to 1/√3 times that in the Y connection, the level of the field weakening can be reduced to a low level (namely, the weakening current can be reduced). By this control, the copper loss caused by the weakening current can be reduced and the decrease in the motor efficiency and the motor torque can be inhibited.

Figure 45:
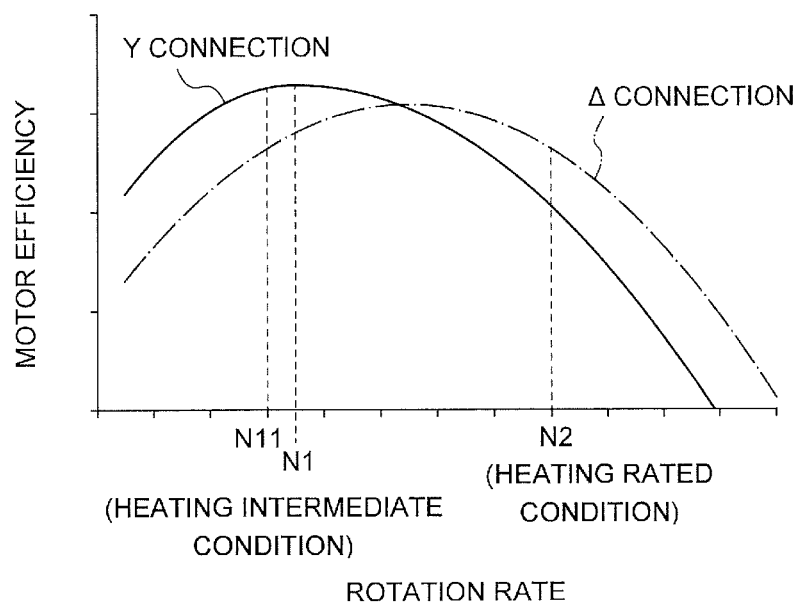
FIG. 45 is a graph showing the relationship between the motor efficiency and the rotation rate in each of the case where the connection condition of the coil is set to the Y connection and the case where the connection condition is set to the delta connection.

FIG. 45 is a graph showing the relationship between the motor efficiency and the rotation rate in regard to each of the Y connection and the delta connection. Since the connection condition of the coil 3 is set to the Y connection and the number of turns is adjusted so that the line voltage reaches the inverter maximum output voltage at the rotation rate N11 slightly lower than the rotation rate N1 as mentioned above, high motor efficiency is obtained at the rotation rate N1 as indicated by the solid line in FIG. 45.

In contrast, in the case of the delta connection, assuming that the number of turns of the coil 3 is the same, motor efficiency higher than that in the Y connection is obtained at the rotation rate N2 as indicated by the chain line in FIG. 45. Therefore, high motor efficiency can be obtained at both of the rotation rate N1 (heating intermediate condition) and the rotation rate N2 (heating rated condition) by switching the connection condition from the Y connection to the delta connection at the intersection point of the solid line and the chain line shown in FIG. 45.

Therefore, the control of setting the connection condition of the coil 3 to the Y connection, adjusting the number of turns so that the line voltage reaches the inverter maximum output voltage at the rotation rate N11 (rotation rate slightly lower than the rotation rate N1), and switching the connection condition from the Y connection to the delta connection at the rotation rate N0 higher than the rotation rate N1 is performed as described above with reference to FIG. 44.

However, the motor efficiency cannot be increased sufficiently just by switching the connection condition of the coil 3 from the Y connection to the delta connection. This point will be explained below.

Figure 46:
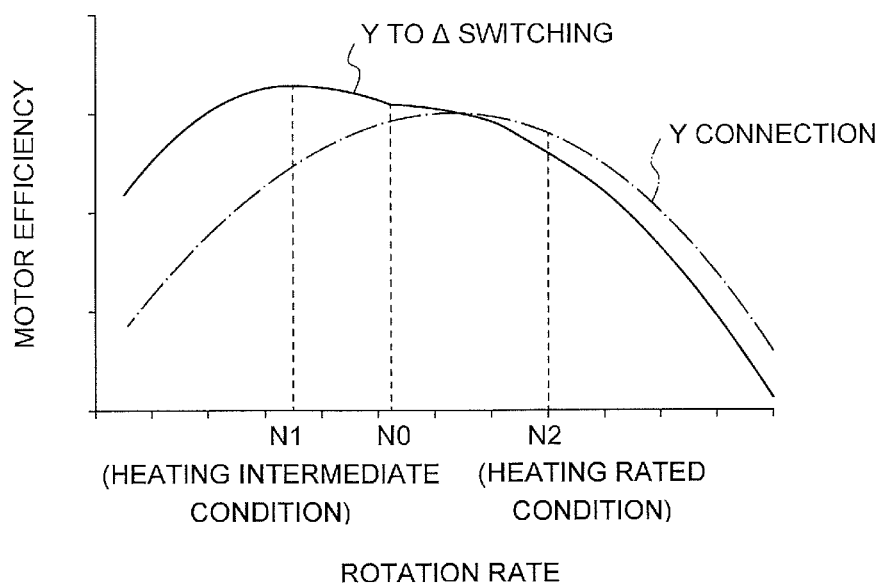
FIG. 46 is a graph showing the relationship between the motor efficiency and the rotation rate in a case where the connection condition of the coil is set to the Y connection, the number of turns is adjusted so that the line voltage reaches inverter maximum output voltage at a rotation rate slightly lower than a heating intermediate condition, and the connection condition is switched from the Y connection to the delta connection.

FIG. 46 is a graph showing the relationship between the motor efficiency and the rotation rate in the case where the connection condition of the coil 3 is set to the Y connection, the number of turns is adjusted so that the line voltage reaches the inverter maximum output voltage at the rotation rate N11, and the connection condition is switched from the Y connection to the delta connection at the rotation rate N0 (solid line). Incidentally, the broken line is a graph showing the relationship between the motor efficiency and the rotation rate in the case where the connection condition of the coil 3 is set to the Y connection and the field-weakening control is performed as shown in FIG. 41.

The line voltage is proportional to the rotation rate. For example, in the home air conditioner having a refrigeration capacity of 6.3 kW, the rotation rate N1 (the heating intermediate condition) is 35 rps and the rotation rate N2 (the heating rated condition) is 85 rps, and thus the line voltage in the heating rated condition is 2.4 times (=85/35) with reference to the line voltage in the heating intermediate condition.

The line voltage in the heating rated condition (rotation rate N2) after the connection condition of the coil 3 is switched to the delta connection is 1.4 times (=85/35/√3) compared to the inverter maximum output voltage. Since the line voltage cannot be increased over the inverter maximum output voltage, the field-weakening control is started.

In the field-weakening control, the weakening current necessary for weakening the magnetic field is fed through the coil 3, and thus the copper loss increases and the motor efficiency and the motor torque decrease. Therefore, the motor efficiency in the heating rated condition (rotation rate N2) cannot be improved as indicated by the solid line in FIG. 46.

In order to reduce the level of the field weakening (reduce the weakening current) in the heating rated condition (rotation rate N2), it is necessary to reduce the number of turns of the coil 3 and lower the line voltage. In this case, however, the line voltage in the heating intermediate condition (rotation rate N1) also decreases and the motor efficiency improvement effect achieved by the connection switching decreases.

Specifically, when there are two load conditions as targets of performance improvement and the rotation rate N1 on the low-speed side and the rotation rate N2 on the high-speed side satisfy (N2/N1)>√3, sufficient effect of improving the motor efficiency cannot be obtained just by switching the connection condition from the Y connection to the delta connection since the field-weakening control becomes necessary even if the switching from the Y connection to the delta connection is made.

Figure 47:
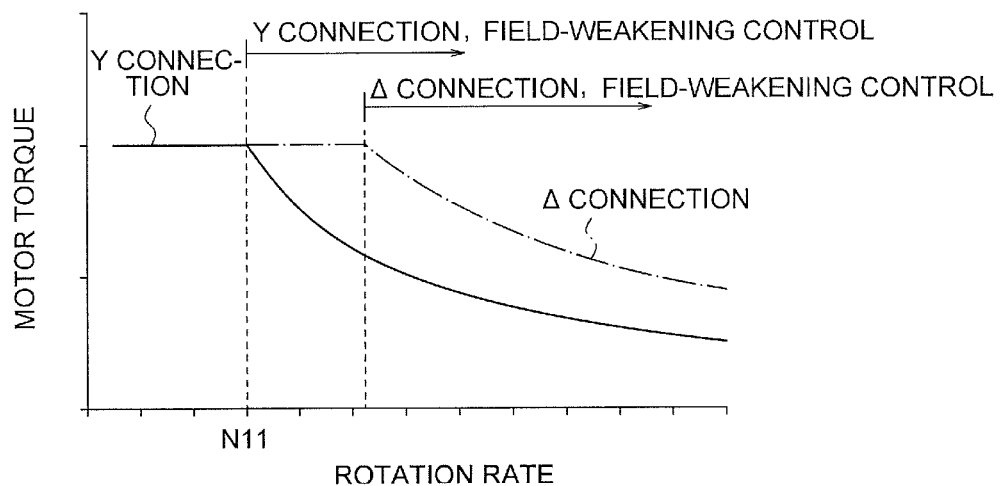
FIG. 47 is a graph showing the relationship between the motor torque and the rotation rate in each of the case where the connection condition of the coil is set to the Y connection and the case where the connection condition is set to the delta connection.

FIG. 47 is a graph showing the relationship between the motor torque and the rotation rate in regard to each of the Y connection and the delta connection. In the case of the Y connection, the motor torque is constant with the increase in the rotation rate N, but decreases with the increase in the rotation rate N after the field-weakening control is started as described earlier with reference to FIG. 42. In the case of the delta connection, the field-weakening control is started at a rotation rate higher than that (N11) in the case of the Y connection, and the motor torque decreases with the increase in the rotation rate N after the field-weakening control is started.

Figure 48:
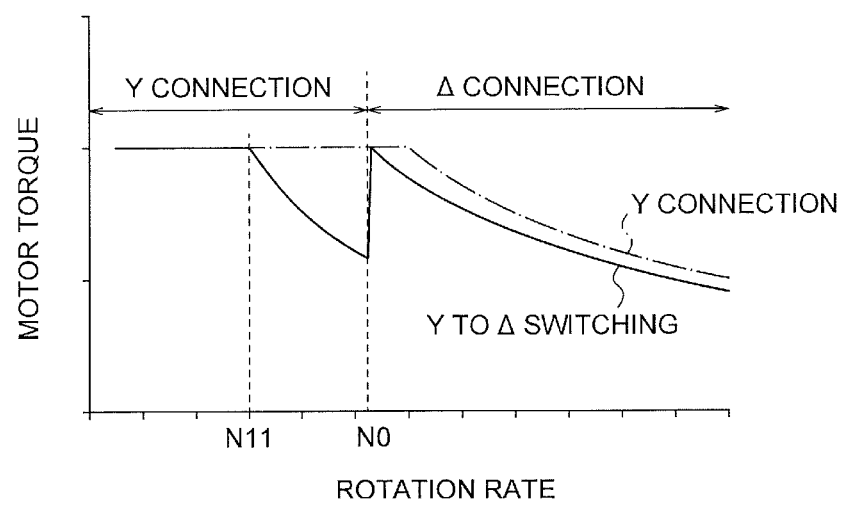
FIG. 48 is a graph showing the relationship between the motor torque and the rotation rate in the case where the connection condition of the coil is set to the Y connection, the number of turns is adjusted so that the line voltage reaches the inverter maximum output voltage at the rotation rate slightly lower than the heating intermediate condition, and the connection condition is switched from the Y connection to the delta connection.

FIG. 48 is a graph showing the relationship between the motor torque and the rotation rate in the case where the connection condition of the coil 3 is set to the Y connection, the number of turns is adjusted so that the line voltage reaches the inverter maximum output voltage at the rotation rate N11 (rotation rate slightly lower than the rotation rate N1), and the connection condition is switched from the Y connection to the delta connection at the rotation rate N0 higher than the rotation rate N1. As shown in FIG. 48, after the rotation rate reaches the rotation rate N11 and the field-weakening control is started, the motor torque decreases with the increase in the rotation rate N.

When the rotation rate increases further and reaches the rotation rate N0 and the switching from the Y connection to the delta connection is made, the motor torque rises since the field-weakening control is temporarily stopped. However, when the rotation rate N increases further and the field-weakening control is started, the motor torque decreases with the increase in the rotation rate N. As above, just switching the connection condition from the Y connection to the delta connection cannot inhibit the decrease in the motor torque especially in a high rotation rate range.

Therefore, the driving device 100 in this embodiment switches the bus voltage by use of the converter 102 in addition to the switching of the connection condition of the coil 3 by the connection switching unit 60. The converter 102 is supplied with power supply voltage (200 V) from the power supply 101 and supplies the bus voltage to the inverter 103. The converter 102 is desired to be formed with elements of low loss caused by a voltage rise (voltage boosting), such as SiC elements or GaN elements.

Specifically, bus voltage V1 (first bus voltage) when the connection condition of the coil 3 is the Y connection has been set at 280 V (DC). In contrast, bus voltage V2 (second bus voltage) when the connection condition of the coil 3 is the delta connection has been set at 390 V (DC). Thus, the bus voltage V2 in the case of the delta connection has been set at 1.4 times the bus voltage V1 in the case of the Y connection. Incidentally, it is permissible if the bus voltage V2 satisfies a relationship of V2≧(V1/√3)×N2/N1 with the bus voltage V1. The inverter 103 supplied with the bus voltage from the converter 102 supplies the line voltage to the coil 3. The inverter maximum output voltage is 1/√2 times the bus voltage.

Figure 49:
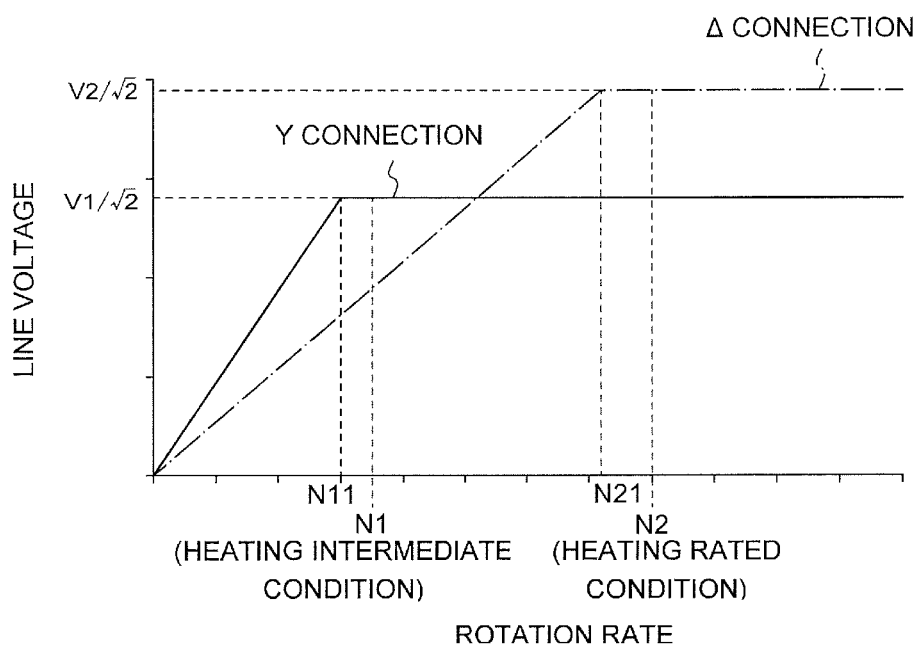
FIG. 49 is a graph showing the relationship between the line voltage and the rotation rate in a case where bus voltage is switched by use of a converter.

FIG. 49 is a graph showing the relationship between the line voltage and the rotation rate in regard to each of the Y connection and the delta connection in the case where the bus voltage is switched by use of the converter 102. As shown in FIG. 49, the line voltage when the connection condition of the coil 3 is the Y connection (solid line) is 1/√2 times the bus voltage V1 (i.e., V1×1/√2) at the maximum. The line voltage when the connection condition of the coil 3 is the delta connection (chain line) is 1/√2 times the bus voltage V2 (i.e., V2×1/√2) at the maximum.

Figure 50:
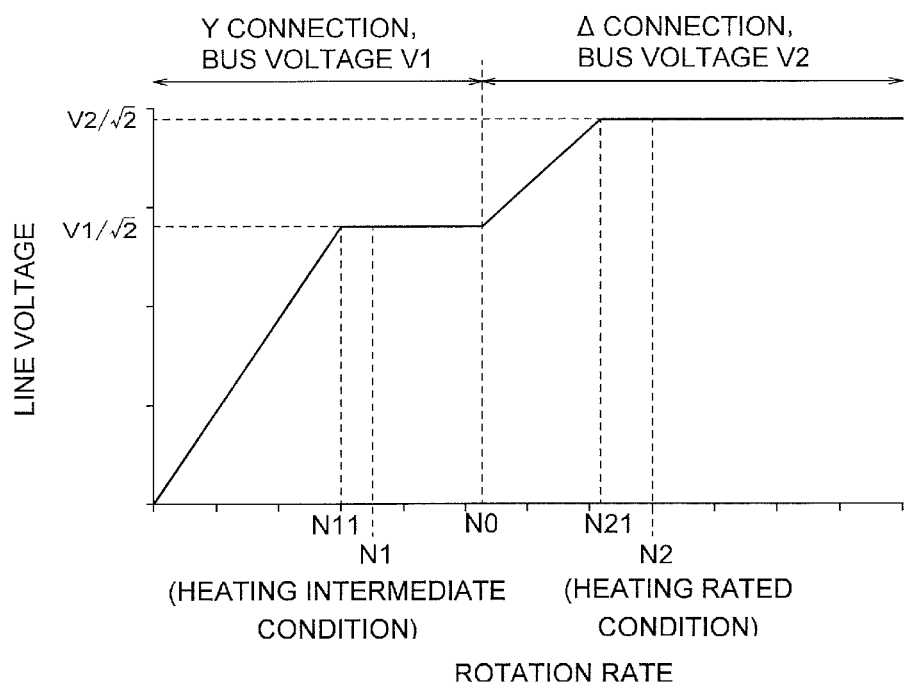
FIG. 50 is a graph showing the relationship between the line voltage and the rotation rate in a case where the switching of the connection condition of the coil and switching of the bus voltage of the converter are performed in the embodiment.

FIG. 50 is a graph showing the relationship between the line voltage and the rotation rate in the case where the switching of the connection condition by the connection switching unit 60 and the switching of the bus voltage by the converter 102 are performed. As shown in FIG. 50, the connection condition of the coil 3 is the Y connection in a rotation rate range including the rotation rate N1 (heating intermediate condition). With the increase in the rotation rate, the line voltage increases and reaches the inverter maximum output (V1×1/√2) at the rotation rate N11 slightly lower than the rotation rate N1. Accordingly, the field-weakening control is started.

When the rotation rate increases further and reaches the rotation rate N0, the connection switching unit 60 switches the connection condition of the coil 3 from the Y connection to the delta connection. At the same time, the converter 102 boosts the bus voltage from V1 to V2. By the boosting, the inverter maximum output changes to V2×1/√2. At this point, the field-weakening control is not performed since the line voltage is lower than the inverter maximum output.

Thereafter, the line voltage increases with the increase in the rotation rate N, and at a rotation rate N21 slightly lower than the rotation rate N2 (heating rated condition), the line voltage reaches the inverter maximum output (V2×1/√2) and accordingly the field-weakening control is started. Incidentally, the rotation rate N21 is a rotation rate that is 5% lower than the rotation rate N2 (namely, N21=N2×0.95).

In this embodiment, the connection condition of the coil 3 is switched based on the result of the comparison between the temperature difference ΔT between the indoor temperature Ta and the set temperature Ts and the threshold value ΔTr as mentioned earlier. The switching from the Y connection to the delta connection at the rotation rate N0 corresponds to the switching from the Y connection to the delta connection shown in the step S108 in FIG. 34 and the steps S131 to S134 in FIG. 36.

Figure 51:
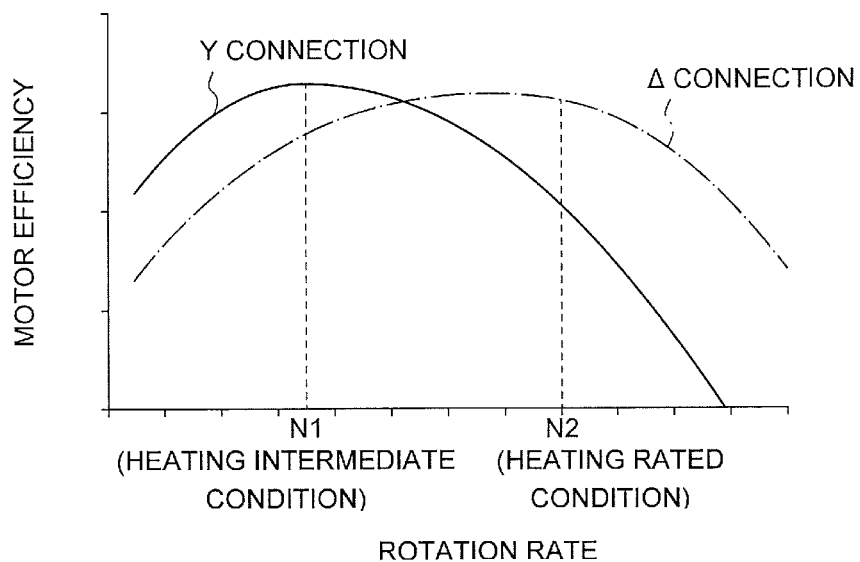
FIG. 51 is a graph showing the relationship between the motor efficiency and the rotation rate in each of the case where the connection condition of the coil is set to the Y connection and the case where the connection condition is set to the delta connection.

The motor efficiency improvement effect in this case will be described below. FIG. 51 is a graph showing the relationship between the motor efficiency and the rotation rate in regard to each of the Y connection and the delta connection. In FIG. 51, the motor efficiency when the connection condition of the coil 3 is the Y connection (solid line) is the same as the motor efficiency in the Y connection shown in FIG. 45. In contrast, the motor efficiency when the connection condition of the coil 3 is the delta connection (chain line) is higher than the motor efficiency in the delta connection shown in FIG. 45 since the bus voltage of the converter 102 rises.

Figure 52:
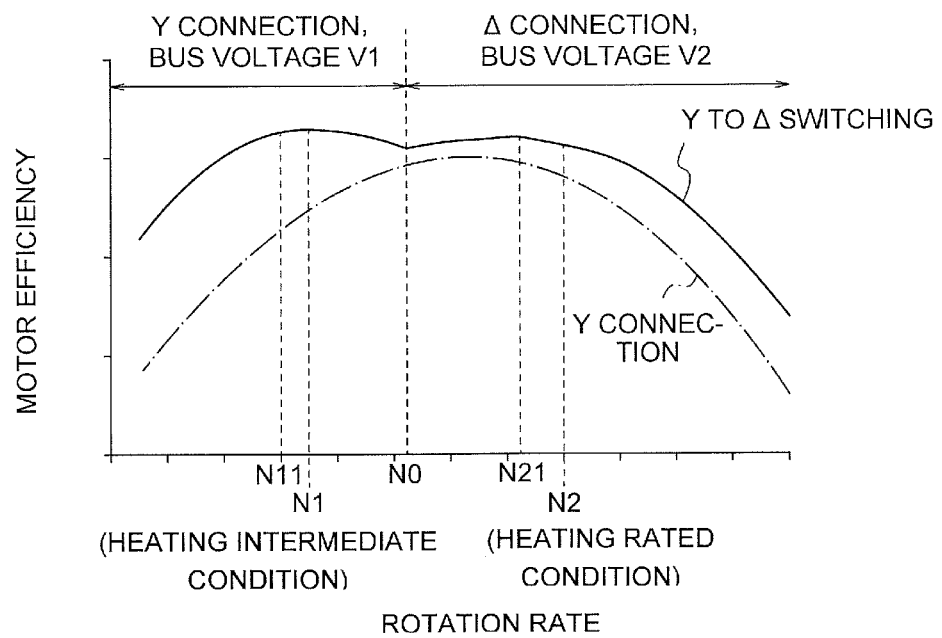
FIG. 52 is a graph showing the relationship between the motor efficiency and the rotation rate in the case where the switching of the connection condition of the coil and the switching of the bus voltage of the converter are performed in the embodiment.

FIG. 52 is a graph showing the relationship between the motor efficiency and the rotation rate in the case where the switching of the connection condition by the connection switching unit 60 and the switching of the bus voltage by the converter 102 are performed. High motor efficiency is obtained in the rotation rate range including the rotation rate N1 since the connection condition of the coil 3 is set to the Y connection and the number of turns is set so that the line voltage reaches the inverter maximum output voltage at the rotation rate N11 (rotation rate slightly lower than the rotation rate N1).

When the rotation rate reaches the aforementioned rotation rate N11, the field-weakening control is started. When the rotation rate further reaches the rotation rate N0, the connection condition of the coil 3 is switched from the Y connection to the delta connection and the bus voltage is raised by the converter 102.

Due to the rise in the bus voltage, the inverter maximum output voltage also rises, and thus the line voltage becomes lower than the inverter maximum output voltage and consequently the field-weakening control stops. By the stop of the field-weakening control, the copper loss caused by the weakening current decreases and accordingly the motor efficiency increases.

Further, when the rotation rate N reaches the rotation rate N21 slightly lower than the rotation rate N2 (heating rated condition), the line voltage reaches the inverter maximum output voltage and the field-weakening control is started. Although the copper loss increases due to the start of the field-weakening control, high motor efficiency is obtained since the bus voltage has been raised by the converter 102.

To sum up, high motor efficiency is obtained at both of the rotation rate N1 (heating intermediate condition) and the rotation rate N2 (heating rated condition) as indicated by the solid line in FIG. 52.

Figure 53:
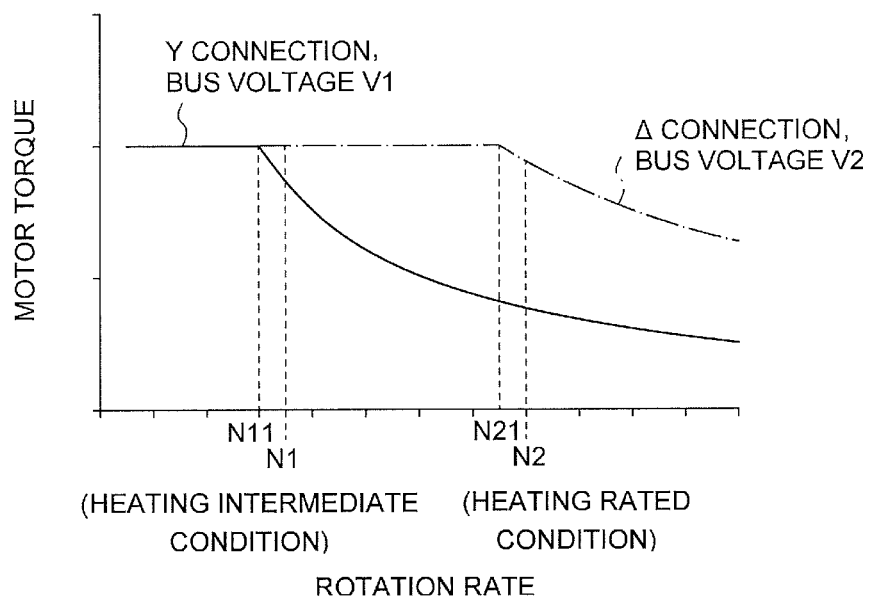
FIG. 53 is a graph showing the relationship between the motor torque and the rotation rate in each of the case where the connection condition of the coil is set to the Y connection and the case where the connection condition is set to the delta connection.

Next, a motor torque improvement effect will be described below. FIG. 53 is a graph showing the relationship between the motor torque and the rotation rate in each of the case where the connection condition of the coil 3 is the Y connection and the case where the connection condition is the delta connection. The motor torque in the case of the Y connection (solid line) is the same as that in FIG. 42. The motor torque in the case of the delta connection (chain line) decreases with the increase in the rotation rate N after the field-weakening control is started at the rotation rate N21 slightly lower than the rotation rate N2 (heating rated condition).

Figure 54:
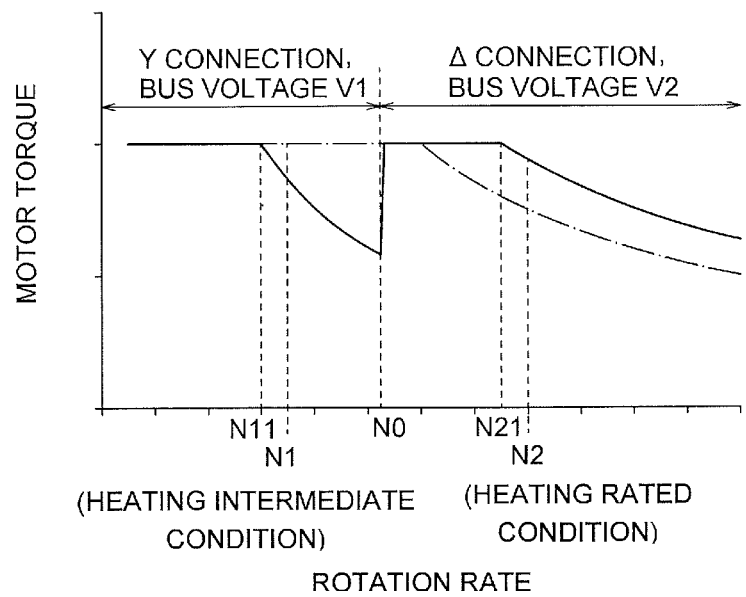
FIG. 54 is a graph showing the relationship between the motor efficiency and the rotation rate in the case where the switching of the connection condition of the coil and the switching of the bus voltage of the converter are performed in the embodiment.

FIG. 54 is a graph showing the relationship between the motor torque and the rotation rate in a case where the connection condition of the coil 3 is set to the Y connection, the number of turns is adjusted so that the line voltage reaches the inverter maximum output voltage at the rotation rate N11, and the connection condition is switched from the Y connection to the delta connection and the bus voltage is raised at the rotation rate N0 (>N1). As shown in FIG. 54, after the field-weakening control is started at the rotation rate N11 slightly lower than the rotation rate N1 (heating intermediate condition), the motor torque decreases with the increase in the rotation rate N.

When the rotation rate N increases further and reaches the rotation rate N0, the connection condition of the coil 3 is switched from the Y connection to the delta connection, and in addition, the bus voltage rises. Due to the switching to the delta connection and the rise in the bus voltage, the line voltage becomes lower than the inverter maximum output voltage and consequently the field-weakening control stops. Accordingly, the motor torque rises. Thereafter, when the field-weakening control is started at the rotation rate N21 slightly lower than the rotation rate N2 (heating rated condition), the motor torque decreases with the increase in the rotation rate N.

Since the field-weakening control is not performed after the switching to the delta connection until the rotation rate N reaches the rotation rate N21 (rotation rate slightly lower than the rotation rate N2) as described above, the decrease in the motor torque can be inhibited especially in a rotation rate range including the rotation rate N2 (heating rated condition).

To sum up, high motor torque is obtained at both of the rotation rate N1 (heating intermediate condition) and the rotation rate N2 (heating rated condition) as indicated by the solid line in FIG. 54. Namely, high performance (motor efficiency and motor torque) can be obtained in both of the heating intermediate condition and the heating rated condition of the air conditioner 5.

Incidentally, since a loss due to the boosting occurs when the voltage of the converter 102 is boosted, it is desirable to use the motor without raising the power supply voltage in the connection condition in the heating intermediate condition having the highest degree of contribution to the motor efficiency (namely, in the Y connection). The power supply voltage of the power supply 101 is 200 V (effective value) and its maximum value is 280 V (=200 V×$\sqrt{2}$). Thus, it can be said that the bus voltage of the converter 102 in the case of the Y connection (280 V) is equal to the maximum value of the power supply voltage.

Further, the switching of the bus voltage supplied to the inverter 103 may also be carried out by raising or lowering the power supply voltage.

Furthermore, while the Y connection is used at the rotation rate N1 (heating intermediate condition) and the delta connection is used at the rotation rate N2 (heating rated condition) in the above-described operation control of the air conditioner 5, it is also possible, in the case where specific load conditions have not been determined, to adjust the voltage level while using the rotation rate N1 as the maximum rotation rate for the operation in the Y connection and using the rotation rate N2 as the maximum rotation rate for the operation in the delta connection. Also with such control, the efficiency of the motor 1 can be increased.

As described above, in the air conditioner 5 for household use, the efficiency of the motor 1 can be increased by using the rotation rate N1 as the rotation rate for the heating intermediate condition and using the rotation rate N2 as the rotation rate for the heating rated condition.

(Effect of Embodiment)

As described above, in this embodiment, the connection condition of the coil 3 is switched based on the indoor temperature Ta, and thus the connection condition can be switched in a short time. Accordingly, it is possible to make the operation state of the compressor 41 quickly correspond to sharp fluctuation of the load on the air conditioner 5 in the case like when a window of the room is opened, for example, and thereby increase the comfortability.

Further, since the rotation of the motor 1 is stopped before switching the connection condition of the coil 3, high reliability of the connection switching operation can be secured even in the case where the connection switching unit 60 is formed with relay contacts.

Furthermore, since the connection condition of the coil 3 is switched between the Y connection (first connection condition) and the delta connection (second connection condition) in which the line voltage is lower than that in the first connection condition, a connection condition suitable for the rotation rate of the motor 1 can be selected.

Since the connection condition of the coil 3 is switched to the delta connection (second connection condition) when the absolute value of the difference (temperature difference $\Delta T$) between the indoor temperature Ta detected by the indoor temperature sensor 54 and the set temperature Ts is larger than the threshold value $\Delta Tr$, it is possible to increase the rotation rate of the motor 1 and thereby generate high output power when the air conditioning load is high.

Since the connection condition of the coil 3 is switched to the Y connection (first connection condition) when the absolute value of the temperature difference $\Delta T$ is less than or equal to the threshold value $\Delta Tr$, the operating efficiency when the air conditioning load is low can be increased.

Since the field-weakening control is performed depending on the rotation rate of the motor 1 in each of the Y connection (first connection condition) and the delta connection (second connection condition), the rotation rate of the motor 1 can be raised even when the line voltage reaches the inverter maximum output voltage.

Since the converter 102 changes the magnitude of the bus voltage according to the switching of the connection condition of the coil 3 by the connection switching unit 60, high motor efficiency and high motor torque can be obtained both before and after the switching of the connection condition.

By comparing the rotation rate of the motor 1 with a reference value in addition to the comparison of the difference between the indoor temperature Ta and the set temperature Ts with the threshold value and by switching the connection condition of the coil 3 based on the result of the comparisons, frequent repetition of the connection switching can be inhibited effectively.

By comparing the output voltage of the inverter 103 with a reference value in addition to the comparison of the indoor temperature Ta and the set temperature Ts and by switching the connection condition of the coil 3 based on the result of the comparisons, frequent repetition of the connection switching can be inhibited effectively.

When the control device 50 receives the operation stop signal from the remote control 55 via the signal reception unit 56, the control device 50 ends the operation of the air conditioner 5 after the connection condition of the coil 3 is switched from the Y connection to the delta connection. When the connection condition of the coil 3 is already the delta connection, the connection condition is maintained. Therefore, at the start of the operation (at startup) of the air conditioner 5, the operation of the air conditioner 5 can be started in the state in which the connection condition of the coil 3 is the delta connection. Accordingly, even when the temperature difference $\Delta T$ between the indoor temperature Ta and the set temperature Ts is large, the operation of the air conditioner 5 can be started in the state of the delta connection and the indoor temperature Ta can be quickly brought close to the set temperature Ts.

Moreover, according to this embodiment, the efficiency of the motor 1 can be increased by driving the motor 1 at a carrier frequency suitable for the connection condition of the coil 3.

First Modification

Next, a first modification of the embodiment will be described below. While the rotation rate N0 at which the connection condition of the coil is switched from the Y connection to the delta connection (i.e., the rotation rate at which the temperature difference $\Delta T$ becomes equal to the threshold value ΔTr) and the rotation rate N0 at which the connection condition is switched from the delta connection to the Y connection (temperature difference) are the same as each other in the above-described embodiment, the rotation rates may also be different from each other.

Figure 55A:
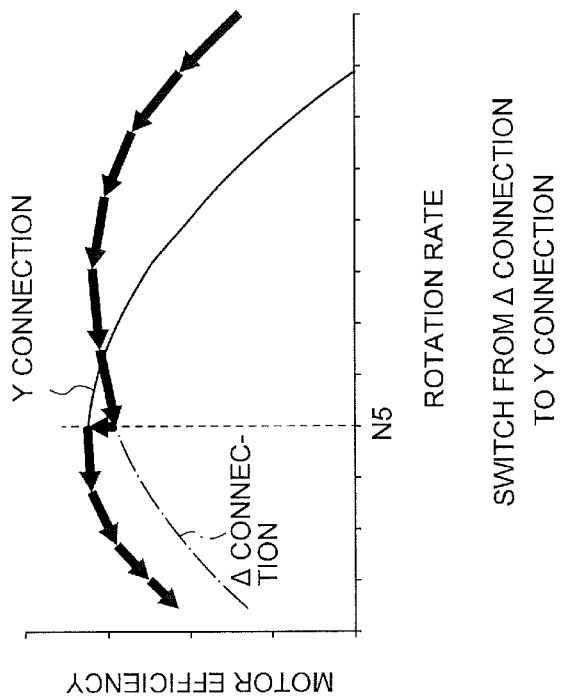
FIGS. 55(A) and 55(B) are graphs showing the relationship between the motor efficiency and the rotation rate in a first modification of the embodiment.
Figure 55B:
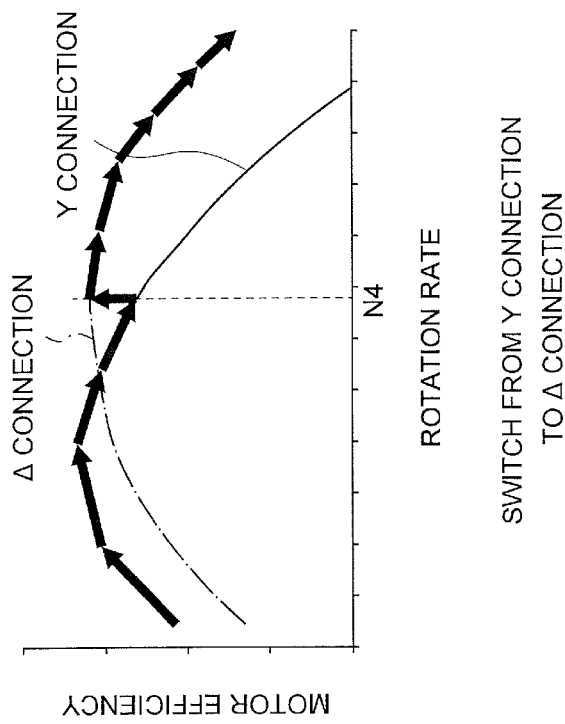

FIGS. 55(A) and 55(B) are graphs showing the relationship between the motor efficiency and the rotation rate in the case where the switching of the connection condition by the connection switching unit 60 and the switching of the bus voltage by the converter 102 are performed. As shown in FIGS. 55(A) and 55(B), the rotation rate N4 at which the connection condition of the coil 3 is switched from the Y connection to the delta connection and the rotation rate N5 at which the connection condition is switched from the delta connection to the Y connection are different from each other.

Further, the switching of the bus voltage by the converter 102 is performed concurrently with the switching of the connection condition of the coil 3. Specifically, the bus voltage is raised at the rotation rate N4 at which the Y connection is switched to the delta connection. Conversely, the bus voltage is lowered at the rotation rate N5 at which the delta connection is switched to the Y connection.

Such control can be carried out by setting the threshold value ΔTr in the step S107 and the threshold value ΔTr in the step S108 in FIG. 34 at values different from each other, for example. While the rotation rate N4 at which the Y connection is switched to the delta connection is higher than the rotation rate N5 at which the delta connection is switched to the Y connection in the example shown in FIGS. 55(A) and 55(B), the magnitude relationship of the rotation rates N4 and N5 may be inverted. The rest of the operation and configuration in the first modification is the same as that in the above-described embodiment.

Also in this first modification, it is possible to make the operation state of the compressor 41 quickly correspond to sharp fluctuation of the load on the air conditioner 5 by switching the connection condition of the coil 3 based on the indoor temperature Ta. Further, high motor efficiency can be obtained by switching the bus voltage of the converter 102 according to the switching of the connection condition of the coil 3.

Second Modification

Next, a second modification of the embodiment will be described below. While the bus voltage of the converter 102 is switched between two stages (V1/V2) in the above-described embodiment, the bus voltage of the converter 102 may be switched among three stages as shown in FIG. 56.

Figure 56:
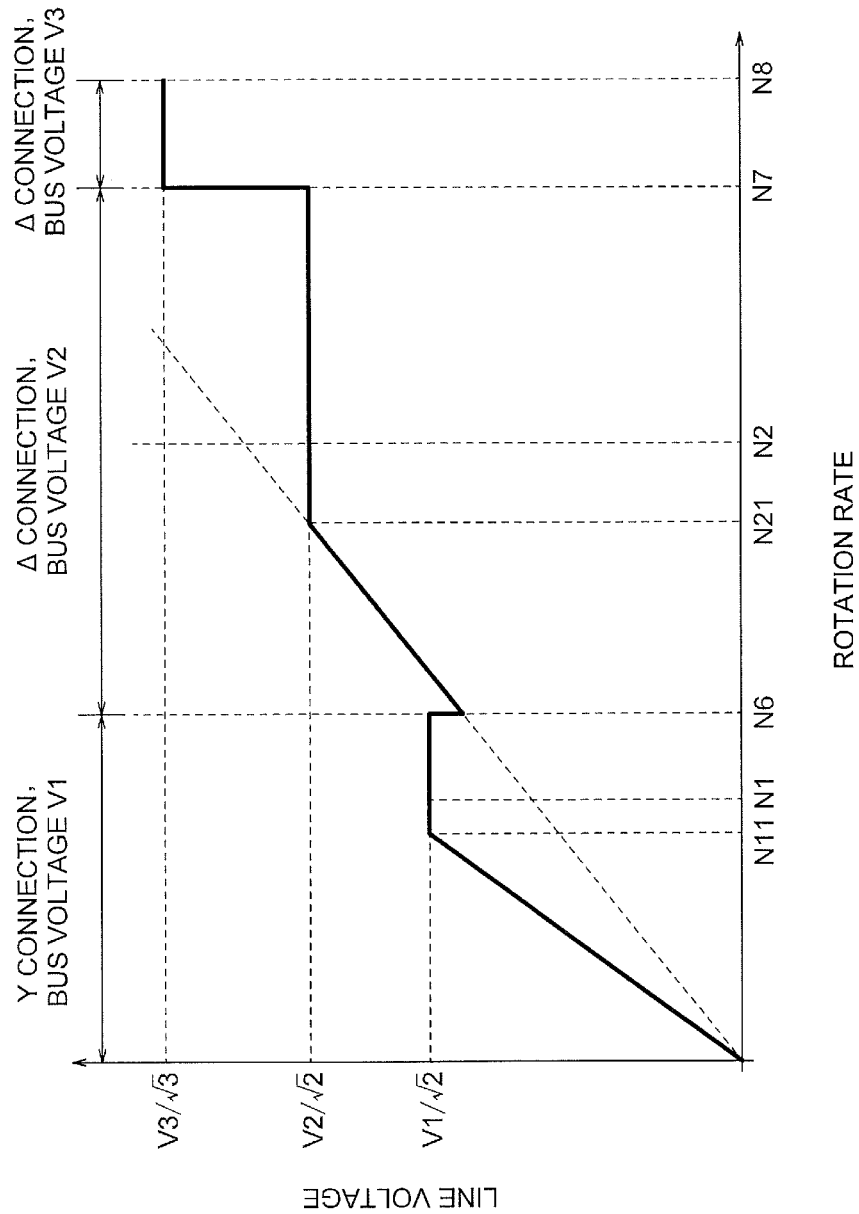
FIG. 56 is a graph showing the relationship between the line voltage and the rotation rate in a second modification of the embodiment.

FIG. 56 is a graph showing the relationship between the line voltage and the rotation rate in a case where the switching of the connection condition and the switching of the bus voltage of the converter 102 are performed in the second modification. In the example of FIG. 56, the bus voltage of the converter 102 is set at V1 at the rotation rate N1 corresponding to the heating intermediate condition (Y connection), and at a rotation rate N6 between the rotation rate N1 and the rotation rate N2 (heating rated condition), the connection condition is switched from the Y connection to the delta connection and concurrently the bus voltage is raised to V2.

Further, at a rotation rate N7 higher than the rotation rate N2, the bus voltage of the converter 102 is raised to V3 while the connection condition is maintained. From this rotation rate N7 to a maximum rotation rate N8, the bus voltage of the converter 102 is V3. The rest of the operation and configuration in the second modification is the same as that in the embodiment.

As above, in the second modification, the bus voltage of the converter 102 is switched among three stages of V1, V2 and V3, by which high motor efficiency and high motor torque can be obtained especially in a high rotation speed range.

Incidentally, the switching of the bus voltage is not limited to two stages or three stages but can also be performed among four or more stages. It is also possible to switch the bus voltage of the converter 102 among three or more stages in the first modification (FIG. 55).

Third Modification

Next, a third modification of the embodiment will be described below. In the embodiment described earlier, the connection condition of the coil 3 is switched between the Y connection and the delta connection. However, it is also possible to switch the connection condition of the coil 3 between a series connection as a first connection condition and a parallel connection as a second connection condition.

Figure 57A:
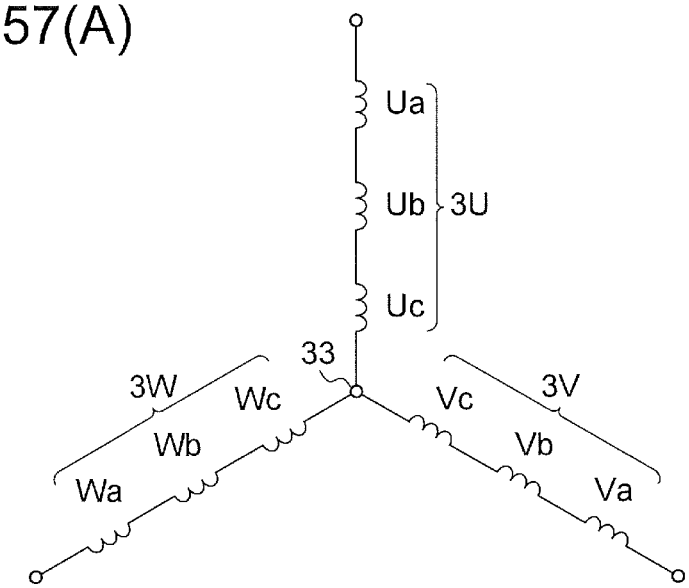
FIGS. 57(A) and 57(B) are schematic diagrams for explaining the coil connection condition switching operation in a third modification of the embodiment.
Figure 57B:
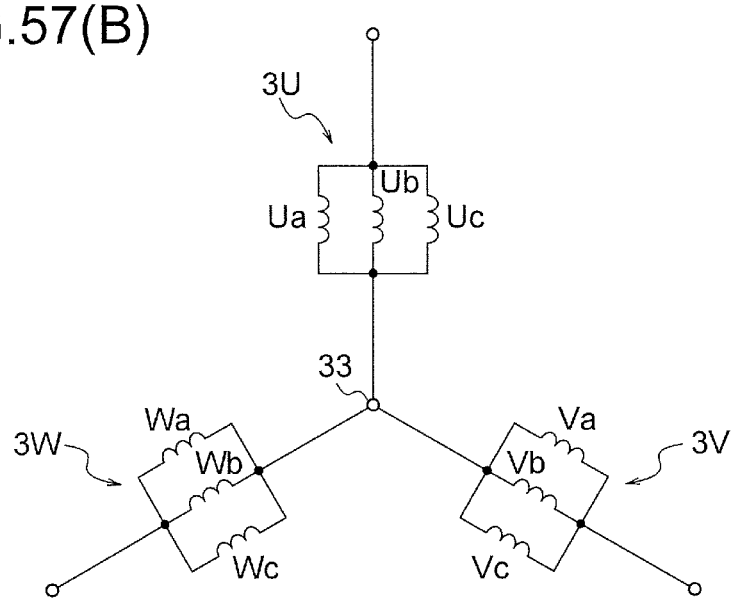

FIGS. 57(A) and 57(B) are schematic diagrams for explaining the switching of the connection condition of the coil 3 in the third modification. In FIG. 57(A), the three-phase coils 3U, 3V and 3W are connected in the Y connection. Further, coil parts Ua, Ub and Uc of the coil 3U are connected in series, coil parts Va, Vb and Vc of the coil 3V are connected in series, and coil parts Wa, Wb and Wc of the coil 3W are connected in series. Namely, the coil 3 as a three-phase coil is connected in series in regard to each phase.

In contrast, in FIG. 57(B), while the three-phase coils 3U, 3V and 3W are connected in the Y connection, the coil parts Ua, Ub and Uc of the coil 3U are connected in parallel, the coil parts Va, Vb and Vc of the coil 3V are connected in parallel, and the coil parts Wa, Wb and Wc of the coil 3W are connected in parallel. Namely, the coil 3 as a three-phase coil is connected in parallel in regard to each phase. The switching of the connection condition of the coil 3 shown in FIGS. 57(A) and 57(B) can be implemented by providing each coil part of the coils 3U, 3V and 3W with a selector switch, for example.

Assuming that the number of coil parts (i.e., the number of lines) connected in parallel in each phase is n, the line voltage decreases to 1/n times when the connection condition is switched from the series connection (FIG. 57(A)) to the parallel connection (FIG. 57(B)). Therefore, the level of the field weakening can be reduced to a low level (namely, the weakening current can be reduced) by switching the connection condition of the coil 3 from the series connection to the parallel connection when the line voltage approaches the inverter maximum output voltage.

When there are two load conditions as targets of performance improvement and the rotation rate N1 on the low-speed side and the rotation rate N2 on the high-speed side satisfy (N2/N1)>n, the field-weakening control becomes necessary since the line voltage exceeds the inverter maximum output voltage when the method of just switching the connection condition of the coil 3 from the series connection to the parallel connection is employed. Therefore, similarly to the method described in the embodiment, the bus voltage of the converter 102 is raised concurrently with the switching of the connection condition of the coil 3 from the series connection to the parallel connection. With this method, high motor efficiency and high motor torque are obtained in both of a rotation rate range including the rotation rate N1 and a rotation rate range including the rotation rate N2.

Figure 58A:
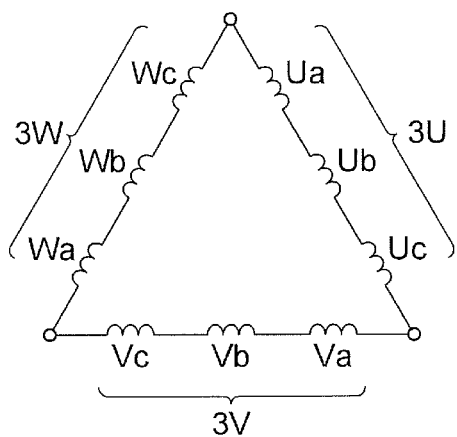
FIGS. 58(A) and 58(B) are schematic diagrams for explaining another example of the coil connection condition switching operation in the third modification of the embodiment.
Figure 58B:
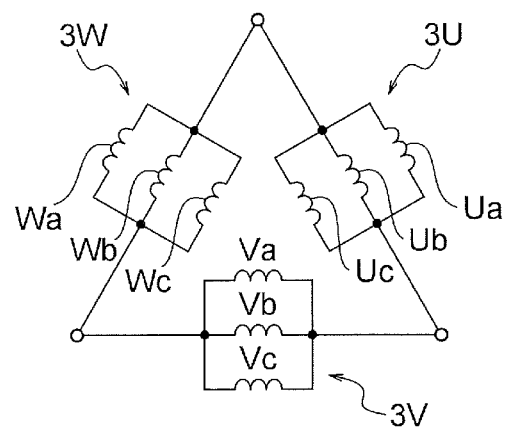

FIGS. 58(A) and 58(B) are schematic diagrams for explaining another configuration example of the third modification. In FIG. 58(A), the three-phase coils 3U, 3V and 3W are connected in the delta connection. Further, coil parts Ua, Ub and Uc of the coil 3U are connected in series, coil parts Va, Vb and Vc of the coil 3V are connected in series, and coil parts Wa, Wb and Wc of the coil 3W are connected in series. Namely, coil parts of each phase of the coil 3 are connected in series.

In contrast, in FIG. 58(B), while the three-phase coils 3U, 3V and 3W are connected in the delta connection, the coil parts Ua, Ub and Uc of the coil 3U are connected in parallel, the coil parts Va, Vb and Vc of the coil 3V are connected in parallel, and the coil parts Wa, Wb and Wc of the coil 3W are connected in parallel. Namely, coil parts of each phase of the coil 3 are connected in parallel.

Also in this case, similarly to the example shown in FIGS. 57(A) and 57(B), when the rotation rate N1 on the low-speed side and the rotation rate N2 on the high-speed side in the two load conditions as targets of performance improvement satisfy (N2/N1)>n, the connection condition of the coil 3 is switched from the series connection (FIG. 58(A)) to the parallel connection (FIG. 58(B)) and concurrently the bus voltage of the converter 102 is boosted. The rest of the operation and configuration in the third modification is the same as that in the embodiment. It is permissible if the bus voltage V2 after the boosting satisfies V2≥(V1/n)×N2/N1 relative to the bus voltage V1 before the boosting.

As above, in the third modification, the level of the field weakening can be reduced to a low level and the motor efficiency can be increased by switching the connection condition of the coil 3 between the series connection and the parallel connection. Further, with the bus voltages V1 and V2 and the rotation rates N1 and N2 satisfying V2≥(V1/n)× N2/N1, high motor efficiency and high motor torque can be obtained at the rotation rates N1 and N2.

Incidentally, it is also possible to make the switching between the series connection (first connection condition) and the parallel connection (second connection condition) in the first modification and the second modification.

Fourth Modification

While the connection condition of the coil 3 and the bus voltage of the converter 102 are switched based on the comparison of the absolute value of the difference ΔT between the indoor temperature Ta detected by the indoor temperature sensor 54 and the set temperature Ts with the threshold value ΔTr in the embodiment described earlier, it is also possible to calculate the air conditioning load based on the indoor temperature Ta and make the switching of the connection condition of the coil 3 and the bus voltage of the converter 102 based on the air conditioning load.

Figure 59:
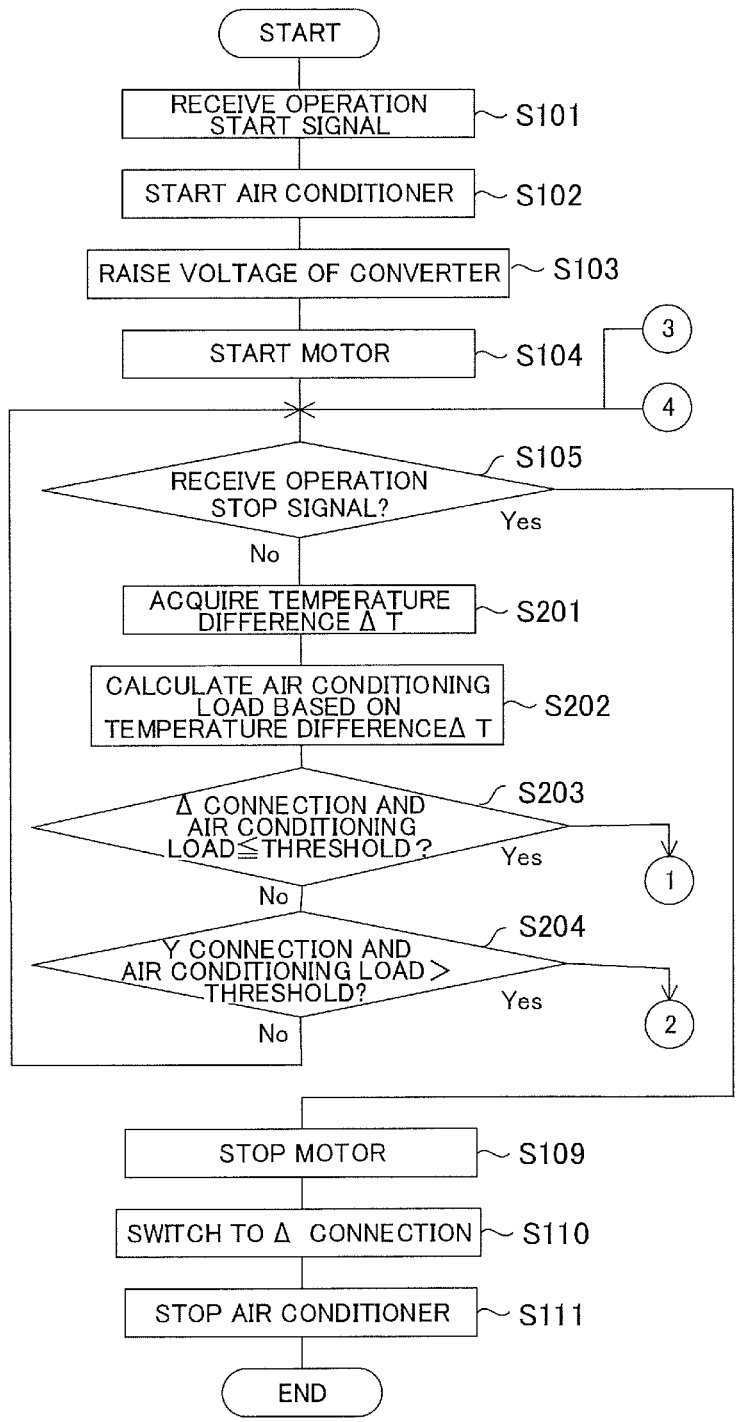
FIG. 59 is a flowchart showing the connection switching operation in a fourth modification of the embodiment.

FIG. 59 is a flowchart showing the basic operation of an air conditioner according to a fourth modification. The steps S101 to S105 are the same as those in the embodiment. After starting the motor 1 in the step S104, if the operation stop signal is not received (step S105), the control device 50 acquires the temperature difference ΔT between the indoor temperature Ta detected by the indoor temperature sensor 54 and the set temperature Ts set through the remote control 55 (step S201) and calculates the air conditioning load based on the temperature difference ΔT (step S202).

Subsequently, based on the calculated air conditioning load, whether the switching of the coil 3 from the delta connection to the Y connection is necessary or not is determined. Specifically, it is determined whether or not the connection condition of the coil 3 is the delta connection and the air conditioning load calculated in the step S202 is less than or equal to a threshold value (reference value of the air conditioning load) (step S203).

When the connection condition of the coil 3 is the delta connection and the air conditioning load is less than or equal to the threshold value as the result of the comparison in the step S203, the processing of the steps S121 to S124 shown in FIG. 35 is performed. In the steps S121 to S124 in FIG. 35, the switching from the delta connection to the Y connection and the lowering of the bus voltage by the converter 102 are carried out as described in the embodiment.

When the connection condition of the coil 3 is not the delta connection (when the connection condition is the Y connection) or the air conditioning load is higher than the threshold value as the result of the comparison in the step S203 (namely, when the switching to the Y connection is unnecessary), the process advances to step S204.

In the step S204, whether the switching from the Y connection to the delta connection is necessary or not is determined. Specifically, it is determined whether or not the connection condition of the coil 3 is the Y connection and the air conditioning load calculated in the step S202 is higher than the threshold value.

When the connection condition of the coil 3 is the Y connection and the air conditioning load is higher than the threshold value as the result of the comparison in the step S204, the processing of the steps S131 to S134 shown in FIG. 36 is performed. In the steps S131 to S134 in FIG. 36, the switching from the Y connection to the delta connection and the raising of the bus voltage by the converter 102 are carried out as described in the embodiment.

When the connection condition of the coil 3 is not the Y connection (when the connection condition is the delta connection) or the air conditioning load is lower than the threshold value as the result of the comparison in the step S204 (namely, when the switching to the delta connection is unnecessary), the process returns to the step S105. The processing performed when the operation stop signal is received (steps S109 to S111) is the same as that in the embodiment. The rest of the operation and configuration in the fourth modification is the same as that in the embodiment.

As above, in the fourth modification, the air conditioning load is calculated based on the indoor temperature Ta and the connection condition of the coil 3 and the bus voltage of the converter 102 are switched based on the calculated air conditioning load, by which the operation state of the compressor 41 can be made to quickly correspond to the fluctuation of the load on the air conditioner 5 and the comfortability can be increased.

Incidentally, it is also possible to make the switching of the connection condition of the coil 3 and the bus voltage of the converter 102 based on the air conditioning load in the first modification, the second modification and the third modification.

Fifth Modification

While the connection condition of the coil 3 and the bus voltage of the converter 102 are switched based on the temperature difference ΔT between the indoor temperature Ta detected by the indoor temperature sensor 54 and the set temperature Ts in the embodiment described earlier, it is also possible to make the switching of the connection condition of the coil 3 and the bus voltage of the converter 102 based on the rotation rate of the motor 1.

Figure 60:
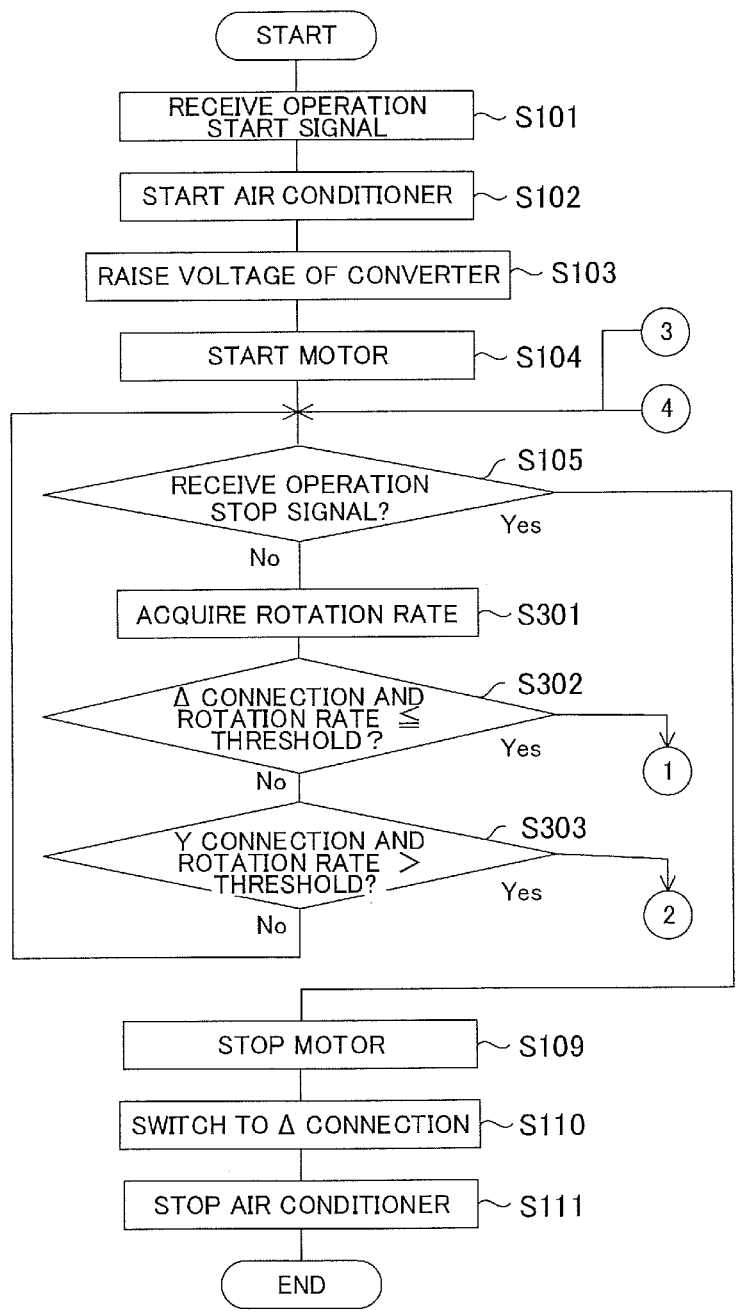
FIG. 60 is a flowchart showing the connection switching operation in a fifth modification of the embodiment.

FIG. 60 is a flowchart showing the basic operation of an air conditioner according to a fifth modification. The steps S101 to S105 are the same as those in the embodiment. After starting the motor 1 in the step S104, if the operation stop signal is not received (step S105), the control device 50 acquires the rotation rate of the motor 1 (step S301). The rotation rate of the motor 1 is the frequency of the output current of the inverter 103 and can be detected by using a current sensor or the like attached to the motor 1.

Subsequently, based on the rotation rate of the motor 1, whether the switching of the coil 3 from the delta connection to the Y connection is necessary or not is determined. Specifically, it is determined whether or not the connection condition of the coil 3 is the delta connection and the rotation rate of the motor 1 is less than or equal to a threshold value (reference value of the rotation rate) (step S302).

In cases of the heating operation, the threshold value used in the step S302 is desired to be a value (more desirably, the intermediate value) between the rotation rate N1 corresponding to the heating intermediate condition and the rotation rate N2 corresponding to the heating rated condition. In cases of the cooling operation, the threshold value used in the step S302 is desired to be a value (more desirably, the intermediate value) between the rotation rate N1 corresponding to the cooling intermediate condition and the rotation rate N2 corresponding to the cooling rated condition.

For example, in the case of the home air conditioner having a refrigeration capacity of 6.3 kW, the rotation rate N1 corresponding to the heating intermediate condition is 35 rps and the rotation rate N2 corresponding to the heating rated condition is 85 rps, and thus the threshold value used in the step S302 is desired to be 60 rps as the intermediate value between the rotation rate N1 and the rotation rate N2.

However, the rotation rate of the motor 1 can fluctuate. Therefore, in this step S302, it is determined whether the state in which the rotation rate of the motor 1 is higher than or equal to the threshold value continues for a preset time or not.

When the connection condition of the coil 3 is the delta connection and the rotation rate of the motor 1 is less than or equal to the threshold value as the result of the comparison in the step S302, the processing of the steps S121 to S124 shown in FIG. 35 is performed. In the steps S121 to S124 in FIG. 35, the switching from the delta connection to the Y connection and the lowering of the bus voltage of the converter 102 are carried out as described in the embodiment.

When the connection condition of the coil 3 is not the delta connection (when the connection condition is the Y connection) or the rotation rate of the motor 1 is higher than the threshold value as the result of the comparison in the step S302 (namely, when the switching to the Y connection is unnecessary), the process advances to step S303.

In the step S303, whether the switching from the Y connection to the delta connection is necessary or not is determined. Specifically, it is determined whether or not the connection condition of the coil 3 is the Y connection and the rotation rate of the motor 1 is higher than the threshold value.

When the connection condition of the coil 3 is the Y connection and the rotation rate of the motor 1 is higher than the threshold value as the result of the comparison in the step S303, the processing of the steps S131 to S134 shown in FIG. 36 is performed. In the steps S131 to S134 in FIG. 36, the switching from the Y connection to the delta connection and the raising of the bus voltage of the converter 102 are carried out as described in the embodiment.

When the connection condition of the coil 3 is not the Y connection (when the connection condition is the delta connection) or the rotation rate of the motor 1 is lower than the threshold value as the result of the comparison in the step S303 (namely, when the switching to the delta connection is unnecessary), the process returns to the step S105. The processing performed when the operation stop signal is received (steps S109 to S111) is the same as that in the embodiment. The rest of the operation and configuration in the fifth modification is the same as that in the embodiment.

As above, in the fifth modification, high motor efficiency and high motor torque can be obtained by switching the connection condition of the coil 3 and the bus voltage of the converter 102 based on the rotation rate of the motor 1.

Incidentally, it is also possible to make the switching of the connection condition of the coil 3 and the bus voltage of the converter 102 based on the rotation rate of the motor 1 in the first modification, the second modification and the third modification.

While the rotary compressor 8 has been described as an example of the compressor in this description, the motor in each embodiment may be employed for compressors other than the rotary compressor 8.

Features in the embodiment and the modifications described above can be appropriately combined with each other.

While a preferred embodiment of the present invention has been specifically described above, the present invention is not restricted to the above-described embodiment and a variety of improvement or modification can be made within the range not departing from the gist of the present invention.

What is claimed is:

1. A driving device to drive an interior permanent magnet motor including a coil, comprising:
   a connection switching unit to switch connection condition of the coil between first connection condition and second connection condition, the second connection condition lowering line voltage of the coil compared to the first connection condition;
   an inverter to apply voltage to the coil; and
   a control device to control a carrier frequency of the inverter for adjusting a control frequency of the voltage applied to the coil, wherein
   the carrier frequency is set at a first carrier frequency when the connection condition of the coil is the first connection condition, and
   the carrier frequency is set at a second carrier frequency different from the first carrier frequency when the connection condition of the coil is the second connection condition.

2. The driving device according to claim 1, wherein the first carrier frequency is higher than the second carrier frequency.

3. The driving device according to claim 1, wherein a silicon carbide element is used for the inverter.

4. The driving device according to claim 1, wherein a gallium nitride element is used for the inverter.

5. The driving device according to claim 1, wherein when the connection switching unit switches the connection condition of the coil, the control device controls the inverter so that rotation of the interior permanent magnet motor temporarily stops before completion of the switching.

6. The driving device according to claim 1, wherein the control device controls the carrier frequency after the interior permanent magnet motor drives again so that the carrier frequency after the interior permanent magnet motor drives again differs from the carrier frequency before the interior permanent magnet motor temporarily stops.

7. The driving device according to claim 1, wherein the control device switches the second carrier frequency stepwise.

8. The driving device according to claim 1, wherein the control device switches the second carrier frequency according to a rotation rate of the interior permanent magnet motor.

9. The driving device according to claim 1, wherein the control device controls the driving of the interior permanent magnet motor by means of field-weakening control after the connection condition of the coil is switched from the first connection condition to the second connection condition.

10. The driving device according to claim 9, wherein when the interior permanent magnet motor is controlled by means of the field-weakening control, the control device sets the second carrier frequency lower than the second carrier frequency before the field-weakening control is started.

11. The driving device according to claim 1, wherein the control device switches the first carrier frequency stepwise.

12. The driving device according to claim 1, wherein the control device switches the first carrier frequency according to a rotation rate of the interior permanent magnet motor.

13. A compressor comprising:
an interior permanent magnet motor including a coil;
a compression mechanism driven by the interior permanent magnet motor;
a connection switching unit to switch connection condition of the coil between first connection condition and second connection condition, the second connection condition lowering line voltage of the coil compared to the first connection condition;
an inverter to apply voltage to the coil; and
a control device to control a carrier frequency of the inverter for adjusting a control frequency of the voltage applied to the coil, wherein
the carrier frequency is set at a first carrier frequency when the connection condition of the coil is the first connection condition, and
the carrier frequency is set at a second carrier frequency different from the first carrier frequency when the connection condition of the coil is the second connection condition.

14. An air conditioner comprising:
an indoor unit; and
an outdoor unit connected to the indoor unit, wherein
at least one of the indoor unit or the outdoor unit includes the driving device according claim 1.

15. A method of driving an interior permanent magnet motor including a coil, comprising:
switching connection condition of the coil between first connection condition and second connection condition, the second connection condition lowering line voltage of the coil compared to the first connection condition;
setting a carrier frequency of an inverter for adjusting a control frequency of voltage applied to the coil at a first carrier frequency when the connection condition of the coil is the first connection condition; and
setting the carrier frequency at a second carrier frequency different from the first carrier frequency when the connection condition of the coil is the second connection condition.

* * * * *